(12) United States Patent
Ishihara et al.

(10) Patent No.: US 8,974,592 B2
(45) Date of Patent: Mar. 10, 2015

(54) COATING COMPOSITION CONTAINING HIGH-REFRACTIVE-INDEX METAL OXIDE FINE PARTICLES, AND CURABLE COATING FILM OBTAINED BY APPLYING THE COATING COMPOSITION ONTO BASE

(75) Inventors: Yoichi Ishihara, Kitakyushu (JP); Sachio Murai, Nagoya (JP); Toshiharu Hirai, Fukuoka (JP); Michio Komatsu, Kawasaki (JP)

(73) Assignee: JGC Catalysts and Chemicals, Ltd., Kanagawa (JP)

( * ) Notice: Subject to any disclaimer, the term of this patent is extended or adjusted under 35 U.S.C. 154(b) by 491 days.

(21) Appl. No.: 13/141,725

(22) PCT Filed: Aug. 12, 2009

(86) PCT No.: PCT/JP2009/064221

§ 371 (c)(1),
(2), (4) Date: Jun. 23, 2011

(87) PCT Pub. No.: WO2010/073772

PCT Pub. Date: Jul. 1, 2010

(65) Prior Publication Data

US 2011/0257298 A1    Oct. 20, 2011

(30) Foreign Application Priority Data

Dec. 27, 2008    (JP) .................... 2008-335588

(51) Int. Cl.

| C09C 1/36 | (2006.01) |
|---|---|
| C09D 163/00 | (2006.01) |
| C09D 183/04 | (2006.01) |
| C09D 175/04 | (2006.01) |
| C09D 7/12 | (2006.01) |
| C08K 3/22 | (2006.01) |
| C08K 9/02 | (2006.01) |
| C01G 23/04 | (2006.01) |
| C01G 23/08 | (2006.01) |
| C01G 19/02 | (2006.01) |
| C01B 33/113 | (2006.01) |
| G02B 1/10 | (2006.01) |
| B82Y 30/00 | (2011.01) |

(52) U.S. Cl.
CPC .............. *C09C 1/3661* (2013.01); *C01G 23/08* (2013.01); *C09C 1/3684* (2013.01); *C09D 175/04* (2013.01); *C09D 163/00* (2013.01); *B82Y 30/00* (2013.01); *C01P 2002/72* (2013.01); *C01P 2002/74* (2013.01); *C01P 2002/78* (2013.01); *C01P 2004/64* (2013.01); *C01P 2006/12* (2013.01); *C08K 3/22* (2013.01); *C08K 9/02* (2013.01); *C09D 7/1225* (2013.01); *C09D 7/1266* (2013.01); *C09D 183/04* (2013.01); *G02B 1/105* (2013.01)
USPC ........... 106/436; 523/442; 106/441; 106/446; 524/497; 524/847; 423/609; 423/610; 359/580

(58) Field of Classification Search
CPC .. C09C 1/3661; C09D 7/1266; C09D 7/1225; C09D 183/04; G02B 1/105; B82Y 30/00; C01P 2006/12; C01P 2002/72; C01P 2004/64; C01P 2002/78; C01P 2002/74; C08K 3/22; C08K 9/02
USPC .......................... 523/442; 524/413
See application file for complete search history.

(56) References Cited

U.S. PATENT DOCUMENTS

| 7,575,731 | B2 * | 8/2009 | Iijima et al. .................. 423/69 |
| 7,978,409 | B2 * | 7/2011 | Tanaka et al. ................ 359/581 |
| 2005/0232851 | A1 * | 10/2005 | Prochazka et al. ........... 423/610 |
| 2005/0233146 | A1 * | 10/2005 | Nonninger .................. 428/402 |
| 2006/0251884 | A1 | 11/2006 | Naito et al. |
| 2008/0026210 | A1 | 1/2008 | Iijima et al. |
| 2009/0136746 | A1 | 5/2009 | Murai et al. |
| 2010/0058955 | A1 | 3/2010 | Tanaka et al. |
| 2010/0148135 | A1 | 6/2010 | Yokoyama |

FOREIGN PATENT DOCUMENTS

| EP | 1 726 974 A2 | 11/2006 |
| EP | 2 138 462 A1 | 12/2009 |
| JP | 6-118203 A | 4/1994 |
| JP | 6-337376 A | 12/1994 |
| JP | 7-325201 A | 12/1995 |
| JP | 8-48940 A | 2/1996 |
| JP | 8-113760 A | 5/1996 |
| JP | 9-202864 A | 8/1997 |
| JP | 11-310755 A | 11/1999 |
| JP | 200-204301 * | 7/2000 |
| JP | 2000-204301 A | 7/2000 |
| JP | 2001-89706 A | 4/2001 |
| JP | 2001-279178 A | 10/2001 |
| JP | 2004-204175 A | 7/2004 |
| JP | 2004-238418 A * | 8/2004 |
| JP | 2006-159853 A | 6/2006 |
| JP | 2006-342311 A | 12/2006 |
| JP | 2008-94956 A | 4/2008 |
| JP | 2009-155496 A | 7/2009 |
| WO | WO 2006/001487 A1 * | 1/2006 |
| WO | WO 2007/026529 A1 | 3/2007 |
| WO | WO 2007/046357 A1 * | 4/2007 |
| WO | WO 2008/129693 A1 | 10/2008 |

* cited by examiner

OTHER PUBLICATIONS

Japanese Patent Office, International Search Report in International Patent Application No. PCT/JP2009/064221 (Nov. 2, 2009).
European Patent Office, Extended European Search Report in European Patent Application No. 09 83 4578 (May 10, 2013).

*Primary Examiner* — Randy Gulakowski
*Assistant Examiner* — Ha Nguyen
(74) *Attorney, Agent, or Firm* — Leydig, Voit & Mayer, Ltd.

(57) ABSTRACT

The present invention relates to a coating composition containing metal oxide particles with a high refractive index and low photocatalytic activity and a coating film obtained by applying the coating composition onto a substrate. The coating composition contains metal oxide particles with a high refractive index obtained by coating the specific fine particles of the titanium-based oxide on their surfaces with at least a silica-based oxide or a silica-based composite oxide, and the coating film is obtained by applying the coating composition onto a substrate. The metal oxide particles with not only a high refractive index but also low photocatalytic activity, and therefore a coating film with excellent weathering resistance and light resistance can be formed on a substrate.

21 Claims, 5 Drawing Sheets

COATING COMPOSITION CONTAINING HIGH-REFRACTIVE-INDEX METAL OXIDE FINE PARTICLES, AND CURABLE COATING FILM OBTAINED BY APPLYING THE COATING COMPOSITION ONTO BASE

TECHNICAL FIELD

The present invention relates to fine particles of metal oxide with a high refractive index, and more particularly relates to a coating composition containing metal oxide particles with a high refractive index constituted with fine particles of a titanium-based oxide with a rutile-type crystal structure and a coating layer formed on a surface each of the fine particles of the titanium-based oxide with a silica-based oxide or a silica-based composite oxide and also relates to a coating film obtained by applying the coating composition onto a substrate.

BACKGROUND ART

As materials of optical substrates such as spectacle lenses, plastic substrates have been increasingly used instead of inorganic glass substrates in recent years. This is because the plastic substrates have excellent properties in respects of lightweight properties, impact resistance, processability, dyeing properties, and the like. The plastic substrates, however, have a defect that they are liable to be damaged as compared with the inorganic glass substrates.

In order to avoid this defect, a silicone-based coating film, namely, a film of a hard coat layer, is usually provided on a surface of an optical lens which is a plastic substrate. Moreover, when a plastic substrate with a relatively high refractive index is used as a material of an optical lens, such a treatment that metal oxide particles are incorporated into the film of the hard coat layer to adjust a refractive index of the film of the hard coat layer to a refractive index of the plastic substrate has been carried out in order to avoid interference of light (appearing as interference fringes) occurring between the plastic substrate and the film of the hard coat layer.

As for a coating liquid for forming a silicone-based coating film having such properties on a plastic substrate as, for example, a film of a hard coat layer, various developments have been made, and a large number of applications have been made.

In the production of optical substrates, in particular plastic lens substrates such as spectacle lenses, there have been desires for a coating liquid for forming a coating film with a high refractive index and transparent colorless, which is excellent in properties, such as scratch resistance, abrasion resistance, impact resistance, weathering resistance, light resistance, perspiration resistance, hot water resistance, adhesion properties and dyeing properties, and there have been also desires for a sol of a water dispersion or a sol of an organic solvent containing metal oxide particles, which is a composition as a raw material of the coating liquid. A large number of applications relating to those also have been made so far.

For example, Patent literature 1 discloses a coating composition with a high-refractive index, which contains: metal oxide particles containing at least one selected from silica, iron oxide, titanium oxide, cerium oxide, zirconium oxide, antimony oxide, zinc oxide and tin oxide, or a mixture thereof, or metal oxide particles constituted with a composite oxide of the metal oxide as described above; and an organosilicon compound. A coating film formed by use of a coating liquid containing these metal oxide particles has a relatively high refractive index, but is far from excellent weather resistance.

This has a background as follows. In the optical substrates such as spectacle lenses, the thickness of a plastic lens or the like has been decreased in order to meet a demand for weight saving. Decrease of the thickness has prompted the refractive index of the coating film to be higher. As a result, the content of titanium oxide with high refractive index properties tends to be increased. On the other hand, the titanium oxide has a photocatalytic activity and therefore has impaired weathering resistance of the coating film.

Then, the present inventors have developed a dispersion sol containing fine particles constituted with core particles containing a titanium-based oxide and a coating layer formed on a surface each of the core particles containing a titanium-based oxide with a composite oxide of silicon and zirconium and/or aluminum, and have also developed a coating liquid for forming a coating film containing the fine particles and an organosilicon compound. The present inventors have applied for patent on the dispersion sol and the coating liquid. In detail, by coating the core particles containing a titanium-based oxide with the composite oxide, photocatalytic activity of the titanium oxide contained in the core particles is restrained.

For example, Patent literature 2 discloses a dispersion sol containing (1) fine particles constituted with fine particles (as core particles) of titanium oxide and a coating layer formed on a surface each of the fine particles of titanium oxide with zirconium oxide and silicon oxide, (2) fine particles constituted with fine particles (as core particles) of composite oxide made from a solid solution of titanium oxide and zirconium oxide and a coating layer formed on a surface each of the fine particles of composite oxide with silicon oxide, (3) fine particles constituted with fine particles (as core particles) of composite oxide of titanium and silicon and a coating layer formed on a surface each of the fine particles of composite oxide of titanium and silicon with silicon oxide and zirconium oxide and/or aluminum oxide, or (4) fine particles constituted with fine particles (as core particles) of composite oxide of titanium, silicon and zirconium and a coating layer formed on a surface each of the fine particles of composite oxide of titanium, silicon and zirconium with at least one of silicon oxide, zirconium oxide and aluminum oxide. Patent literature 2 also discloses a coating liquid for forming a coating film containing the above fine particles and an organosilicon compound. In detail, the invention disclosed in Patent literature 2 involves use of metal oxide particles with a core-shell structure constituted with titanium-containing core particles with an anatase-type crystal structure and a coating layer formed on a surface each of the titanium-containing core particles with at least one selected from silicon oxide, zirconium oxide and aluminum oxide.

Patent literature 3 discloses a dispersion sol containing fine particles of composite oxide constituted with a composite oxide (as core particles) of solid solution of titanium and tin and a coating layer formed on a surface each of composite oxide (as core particles) of solid solution of titanium and tin with a composite oxide of silicon oxide and an oxide of zirconium and/or aluminum. Patent literature 3 also discloses a coating liquid for forming a coating film containing the above fine particles and an organosilicon compound. In detail, the invention disclosed in Patent literature 3 involves use of metal oxide particles with a core-shell structure constituted with titanium-containing core particles with a rutile-type crystal structure and a coating layer formed on a surface each of titanium-containing core particles with a composite oxide of silicon oxide and an oxide of zirconium and/or aluminum.

Use of the metal oxide particles described in Patent literature 2 or Patent literature 3 allows a coating film to be given with not only excellent weathering resistance but also excellent other properties, such as scratch resistance, abrasion resistance, impact resistance, light resistance, perspiration resistance, hot water resistance, adhesion properties, transparency and dyeing properties, provided that the refractive index is in the range of 1.52 to 1.67.

However, an optical substrate (in particular, a plastic lens substrate) with a refractive index of 1.70 or more, more particularly 1.71 to 1.81, has been developed recently, and there have been demands for a coating liquid for forming a coating film appropriate for this optical substrate and a composition as a raw material (i.e., a dispersion sol containing metal oxide particles) for the coating liquid. In order to raise the refractive index of the coating film, it is necessary to further increase the titanium content in the core particles or further decrease the thickness of the coating layers (i.e., coating layers on the surfaces of the titanium-containing core particles). As a result, a coating film with a relatively high refractive index of about 1.70 has been obtained, but the weathering resistance and light resistance thereof tend to be impaired. Moreover, it is difficult to obtain a coating film with a refractive index higher than about 1.70.

In addition, a defect of inferior impact resistance arises in the case of an optical lens such as a spectacle lens, which is obtained by forming the aforesaid film of the hard coat layer on a surface of a plastic substrate and further forming an antireflection film thereon.

As means to overcome this defect, there are known methods such as (1) a method of forming a film of a primer layer containing a thermosetting urethane resin and metal oxide particles containing titanium oxide (e.g., as shown in Patent literature 4), (2) a method of forming a film of a primer layer containing a polyurethane resin and metal oxide particles of zinc oxide, silicon dioxide, aluminum oxide, titanium oxide, zirconium oxide, tin oxide, beryllium oxide, antimony oxide, tungsten oxide, cerium oxide or the like (e.g., as shown in Patent literature 5). In these methods, the metal oxide particles are added in order to control refractive index of the coating film (restraint of interference of light) or in order to enhance strength of the coating film. If the titanium content in the fine particles is increased for the purpose of making the refractive index of the optical lens higher, there occurs a problem that the weathering resistance and the light resistance of the coating film are deteriorated, similarly to the case of the aforesaid film of the hard coat layer.

LIST OF CITED DOCUMENTS

Patent Literature

Patent literature 1: Japanese Patent Laid-Open Publication No. 325201/1995
Patent literature 2: Japanese Patent Laid-Open Publication No. 048940/1996
Patent literature 3: Japanese Patent Laid-Open Publication No. 204301/2000
Patent literature 4: Japanese Patent Laid-Open Publication No. 118203/1994
Patent literature 5: Japanese Patent Laid-Open Publication No. 337376/1994

DISCLOSURE OF INVENTION

Technical Problems to be Solved

The present inventors have earnestly studied whether or not a coating liquid for forming a coating film with not only high refractive index but also weathering resistance and light resistance is obtained by solving the problems described above. As a result, they have found that it is good to use a coating composition containing metal oxide particles constituted with fine particles (as core particles) of a titanium-based oxide having a rutile-type crystal structure produced with particular producing steps and a coating layer formed on a surface each of the fine particles of the titanium-based oxide with a silica-based oxide or a silica-based composite oxide. They have thus accomplished the present invention.

That is to say, it is an object of the present invention to provide a coating composition containing metal oxide particles constituted with specific fine particles of a titanium-based oxide with a rutile-type crystal structure and a coating layer formed on a surface each of the fine particles of the titanium-based oxide with a silica-based oxide or a silica-based composite oxide. Moreover, it is another object of the present invention to provide a coating film obtained by applying the coating composition onto a substrate.

Means for Solving the Problems

The coating composition of the present invention comprises:

(1) metal oxide particles with a high-refractive index constituted with (a) fine particles of a titanium-based oxide with an average particle diameter, as measured by a dynamic light scattering method, in the range of 15 to 60 nm, and (b) a coating layer formed on a surface each of the fine particles of the titanium-based oxide with at least a silica-based oxide or a silica-based composite oxide, wherein said fine particles of the titanium-based oxide are crystalline particles with a rutile-type crystal structure and have a crystallite diameter, as determined by X-ray diffraction, in the range of 7.5 to 14.0 nm, a specific surface area in the range of 70 to 155 m$^2$/g and a refractive index in the range of 2.2 to 2.7, (b) said coating layer has a refractive index which is lower than the refractive index of the fine particles as described above by 0.2 or more, and said metal oxide particles each having the above coating layer have a refractive index in the range of 2.0 to 2.5, and (2) a binder component.

In the coating composition, the fine particles of the titanium-based oxide are preferably those obtained by calcining particles of composite oxide containing titanium and tin and/or silicon, and then pulverizing thus calcined particles.

The silica-based oxide is preferably silicon dioxide.

The silica-based composite oxide is preferably a composite oxide containing silicon and at least one metal element selected from zirconium, antimony, tin and aluminum.

In a frequency distribution of particle diameters obtainable when the fine particles of the titanium-based oxide are measured by a dynamic light scattering method, the distribution frequency of relatively coarse fine particles of the titanium-based oxide larger than 100 nm in the particle diameter is preferably not more than 1%.

A spacing $d^1$ of the (310) crystal face, as determined by X-ray diffraction of the fine particles of the titanium-based oxide, is preferably in the range of 0.1440 to 0.1460 nm, and a spacing $d^2$ of the (301) crystal face, as determined by X-ray diffraction, is preferably in the range of 0.1355 to 0.1370 nm.

A relative ratio ($P^1/P^2$) of a peak intensity $P^1$ of the (310) crystal face to a peak intensity $P^2$ of the (110) crystal face, as determined by X-ray diffraction of the fine particles of the titanium-based oxide, is preferably in the range of 6/100 to 20/100.

The particles of composite oxide are preferably those obtained by placing a mixed aqueous solution containing peroxotitanic acid and potassium stannate and/or a silicon compound in an autoclave, subjecting the solution to hydrothermal treatment at a temperature of 150 to 250° C. to form a composite oxide containing titanium and tin and/or silicon, and then after drying, granulating the composite oxide thus obtained.

The silicon compound is preferably at least one selected from a silica fine particle, silicic acid and a silicon alkoxide.

The particles of composite oxide are preferably those obtained by subjecting the mixed aqueous solution containing the composite oxide to a spray dryer, and then spray-drying the solution to perform drying and granulating of the composite oxide at the same time.

The fine particles of the titanium-based oxide are preferably those obtained by calcining the dried particles of the composite oxide at a temperature of 300 to 800° C. in an oxygen-containing atmosphere to form calcined particles of the composite oxide having a crystallite diameter, as determined by X-ray diffraction, in the range of 7.5 to 14.0 nm, and then subjecting the calcined particles of the composite oxide to a pulverization apparatus to obtain the pulverized particles thereof.

The fine particles of the titanium-based oxide are preferably those contained in a sol of water dispersion obtained by dispersing fine particles of the composite oxide obtained from the pulverization apparatus as described above in pure water or ultrapure water, and then subjecting the water dispersion sol to a wet classification apparatus to separate and remove the coarse particles of the titanium-based oxide larger than 100 nm in the particle diameter as measured by a dynamic light scattering method.

The metal oxide particles are preferably fine particles contained in a sol of water dispersion obtained by mixing the water dispersion sol containing the fine particles of the titanium-based oxide as described above with at least one silicon compound selected from a silicon alkoxide and silicic acid, and then hydrolyzing the silicon compound to coat the fine particles of the titanium-based oxide on their surfaces with a silica-based oxide.

The metal oxide particles are preferably fine particles contained in a sol of water dispersion obtained by mixing the water dispersion sol containing the fine particles of the titanium-based oxide as described above with at least one silicon compound selected from a silicon alkoxide and silicic acid and at least one metal compound selected from a peroxozirconate, an antimonate, and an aluminate, and then hydrolyzing the silicon compound and the metal compound to coat the fine particles of the titanium-based oxide on their surfaces with a silica-based composite oxide.

The silicon alkoxide is preferably tetramethoxysilane or a hydrolysate thereof, or tetraethoxysilane or hydrolysate thereof.

The metal oxide particles are preferably fine particles obtained by coating the fine particles of the titanium-based oxide on their surfaces with the silica-based oxide or the silica-based composite oxide in such a manner that when the weight of the fine particles of the titanium-based oxide is expressed as "C" and the weight of the coating layers is expressed as "S", the weight ratio (S/C) is 1/100 to 50/100 in terms of the respective metal oxides.

In the coating composition, the binder component is preferably an organosilicon compound.

The organosilicon compound is preferably a compound represented by the following formula (I) and/or a hydrolyzate thereof,

$$R^1_a R^2_b Si(OR^3)_{4-(a+b)} \tag{I}$$

wherein $R^1$ is an alkyl group of 1 to 6 carbon atoms, an organic group having 8 or less carbon atoms and containing a vinyl group, an organic group having 8 or less carbon atoms and containing an epoxy group, an organic group having 8 or less carbon atoms and containing a methacryloxy group, an organic group having 1 to 5 carbon atoms and containing a mercapto group or an organic group having 1 to 5 carbon atoms and containing an amino group, $R^2$ is an alkyl group of 1 to 3 carbon atoms, an alkylene group, a cycloalkyl group or a halogenated alkyl or allyl group, $R^3$ is an alkyl group of 1 to 3 carbon atoms, alkylene group or a cycloalkyl group, a is an integer of 0 or 1, and b is an integer of 0, 1 or 2.

The organosilicon compound is preferably contained in such an amount that when the weight of a tin constituent in terms of $SiO_2$ is expressed as "X" and the weight of the metal oxide particles in terms of the respective metal oxide is expressed as "Y", the weight ratio (X/Y) is 30/70 to 90/10.

In the coating composition, the binder component is preferably a thermosetting organic resin or a thermoplastic organic resin.

The thermosetting organic resin is preferably at least one selected from a urethane-based resin, an epoxy-based resin and a melamine-based resin.

The thermoplastic organic resin is preferably at least one selected from an acrylic-based resin, a urethane-based resin and an ester-based resin.

The thermosetting organic resin or the thermoplastic organic resin is preferably contained in such an amount that when the weight of the resin is expressed as "A" and the weight of the metal oxide particles in terms of the respective metal oxides is expressed as "B", the weight ratio (A/B) is 90/10 to 30/70.

The coating composition is preferably used for applying onto an optical substrate.

The coating composition to be used for the optical substrate is preferably a coating composition for forming a film of a hard coat layer on the optical substrate. The coating composition to be used for the optical substrate is preferably a coating composition for forming a film of a primer layer on the optical substrate.

The coating film of the present invention is a coating film obtained by applying the coating composition onto a substrate.

The substrate is preferable to be a plastic lens substrate.

The coating film is preferable to be a film of a hard coat layer or a film of a primer layer.

Advantageous Effects of Invention

The metal oxide particles with a high refractive index contained in the coating composition of the present invention, themselves, have a high refractive index of 2.0 to 2.5, and besides, their photocatalytic activity is considerably low. Therefore, the fine particles have advantages that not only the possibility of deterioration of a coating film which is formed by using a coating composition containing the fine particles, and/or a plastic substrate is extremely low, but also the possibility of occurrence of coloration (color change) of the coating film to blue (namely, bluing) is extremely low. This is attributable to the fact that the fine particles of the titanium-based oxide contained in the metal oxide particles are crystalline fine particles having special physical properties. That is to say, the fine particles of the titanium-based oxide have an average particle diameter, as measured by a dynamic light scattering method, in the range of 15 to 60 nm, and they themselves have a refractive index in the range of 2.2 to 2.7. Moreover, the fine particles of the titanium-based oxide with a rutile-type crystal structure having a crystallite diameter, as measured by X-ray diffractometry, of 7.5 to 14.0 nm and have a specific surface area in the range of 70 to 155 m$^2$/g.

In more detail, since the fine particles of the titanium-based oxide have been calcined at a relatively high temperature, i.e., a temperature of 300 to 800° C., the crystallinity (expressed by "crystallite diameter, as determined by X-ray diffraction" in the present invention) is increased, and as a result, the refractive index of the fine particles is raised. Moreover, with increase of the crystallinity, the specific surface area of the fine particles is decreased, and therefore the amount of OH groups present on the surfaces of the fine particles is decreased. With this decrease, the amount of OH groups that become free radicals (e.g., .OH) when the particles are exposed to ultraviolet rays is decreased, and as a result, the photocatalytic activity as described above is weakened.

However, the fine particles of the titanium-based oxide, as described above, obtained by pulverizing particles calcinated to have a raised refractive index has a disadvantage that the light reflectance on the surfaces of the particle is also raised to thereby make light scattering increased. Therefore in the present invention, the surfaces of the fine particles of the titanium-based oxide are coated with a silica-based oxide or a silica-based composite oxide to restrain the increase of the light scattering. The restraint effect can be evaluated by measuring turbidity of a water dispersion sol containing the fine particles of the titanium-based oxide each having such a coating layer (i.e., metal oxide particles with a high refractive index). That is to say, a water dispersion sol containing metal oxide particles with a high refractive index which are almost free from light scattering has a little turbidity and is almost transparent or close to such a state.

Furthermore, the presence of the coating layers, namely, coating layers composed of the silica-based oxide or the silica-based composite oxide exerts an effect of further restraining the photocatalytic activity of the fine particles of the titanium-based oxide.

When a coating composition containing such metal oxide particles with a high refractive index is used as a coating material for an optical substrate (e.g., coating liquid for forming a film of a hard coat layer), a coating film having been strongly desired in the recent plastic lens industry can be readily formed on a substrate, which film has a high refractive index of 1.70 or more, particularly 1.71 to 1.81, and has excellent weathering resistance and light resistance. In more detail, even if a plastic lens substrate with a high refractive index of 1.71 to 1.81 is used as the substrate, interference of light (appearing as interference fringes) that occurs between the plastic lens substrate and the coating film can be readily restrained by use of the coating composition. Besides, in spite that the refractive index is such a high value, a coating film with excellent weathering resistance and light resistance, which cannot be obtained by use of conventional metal oxide particles, can be readily formed on a substrate by use of the coating composition.

Since the coating composition contains metal oxide particles with a high refractive index having a low light scattering ratio, a transparent colorless coating film having a haze of not more than 0.5% can be formed on a substrate. Moreover, the coating composition is capable of readily forming a coating film with excellent properties on a substrate, which properties are such as scratch resistance, abrasion resistance, impact resistance, perspiration resistance, hot water resistance, adhesion properties, dyeing properties and fade resistance.

Accordingly, by use of the coating composition of the present invention, a coating film to be the film of a hard coat layer or the film of a primer layer as described above or the like can be readily formed on an optical substrate such as a plastic lens substrate.

The coating film of the present invention obtained as above has the following properties.

(1) The coating film formed by use of a coating composition having a content of the metal oxide particles with a high refractive index ranging from 10 to 20% by weight has a high refractive index of 1.70 or more, more particularly 1.71 to 1.81. Therefore, even if the coating film is applied to, for example, a plastic lens substrate with a high refractive index of 1.70 or more, particularly 1.71 to 1.81, the aforesaid interference fringes and the like are not observed.

(2) Since a coating composition containing metal oxide particles with a high refractive index having a relatively low photocatalytic activity is used, the coating film is extremely excellent in properties of weathering resistance and light resistance. The "weathering resistance" referred to herein means resistance to deterioration of an organic substance contained in the coating film or deterioration of a plastic lens substrate due to the aforesaid photocatalytic activity. The "light resistance" referred to herein means resistance to change in color of the coating film such as a film of a hard coat layer to blue (so-called bluing) due to the aforesaid photocatalytic activity, which is usually activated when it is exposed to ultraviolet rays. In the coating film as described above, such deterioration or bluing as above hardly occurs.

(3) Since a coating composition containing metal oxide particles with a high refractive index and a relatively low light scattering ratio is used, the coating film is a transparent colorless film having a haze of not more than 0.5%.

(4) In addition, the coating film is excellent also in properties, such as scratch resistance, abrasion resistance, impact resistance, perspiration resistance, dyeing properties, hot water resistance, adhesion properties, and fade resistance.

DESCRIPTION OF EMBODIMENTS

Figure 1:
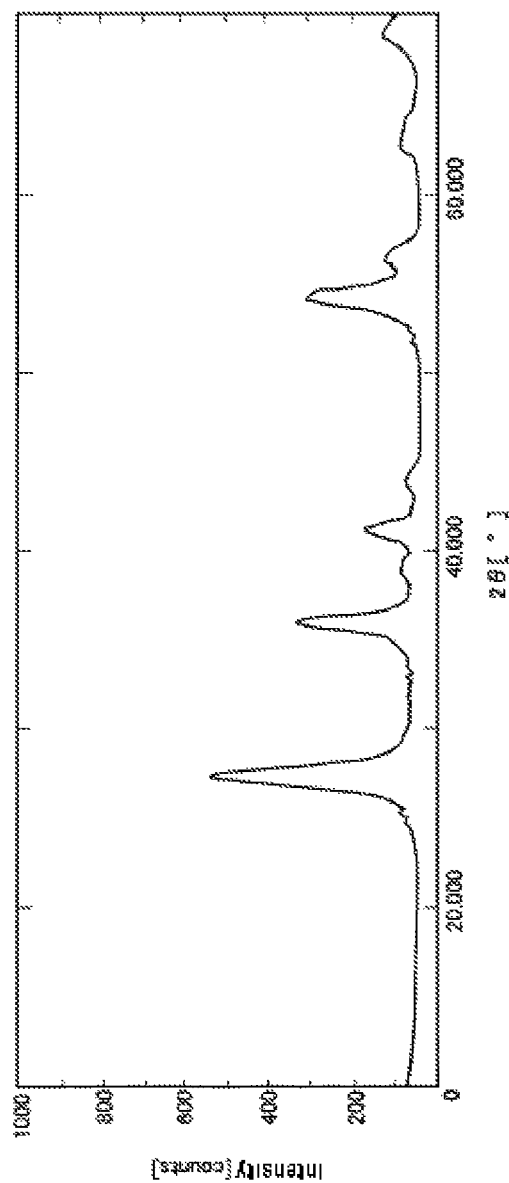
FIG. 1 shows an X-ray diffraction chart obtained by subjecting calcined particles of a composite oxide (i.e., particles of a titanium-based oxide) used in Preparation Example 2 to X-ray diffraction with an X-ray diffraction apparatus.

Hereinafter, the coating composition of the present invention, namely, a coating composition comprising metal oxide particles with a high refractive index and a binder component, is described in detail.

The metal oxide particles with a high refractive index are contained in the coating composition which is a water dispersion sol of the fine particles or an organic solvent dispersion sol that is usually obtained from the water dispersion sol with a solvent substitution. Therefore, properties and the like of the metal oxide particles with a high refractive index are described below based on the values adopted or measured in the preparation steps of those dispersion sols (particularly a preparation step of the water dispersion sol). This is because it is not easy to directly measure the properties and the like of the metal oxide particles with a high refractive index having been added to the coating composition.

Coating Composition

The coating composition of the present invention comprises:

(1) metal oxide particles with a high refractive index constituted with (a) fine particles of a titanium-based oxide having an average particle diameter, as measured by a dynamic light scattering method, in the range of 15 to 60 nm and (b) a coating layer formed on a surface each of the fine particles of the titanium-based oxide with at least a silica-based oxide or a silica-based composite oxide, wherein said fine particles of the titanium-based oxide are crystalline particles with a rutile-type crystal structure and have a crystallite diameter, as determined by X-ray diffraction, in the range of 7.5 to 14.0 nm, a specific surface area in the range of 70 to 155 $m^2/g$ and a refractive index in the range of 2.2 to 2.7, and said coating layers has a refractive index which is lower than the refractive index of the fine particles as described above by 0.2 or more, and said metal oxide particles each having the above coating layer has a refractive index in the range of 2.0 to 2.5; and (2) a binder component.

Next, the metal oxide particles with a high refractive index and the binder component are described in detail.

(1) Metal oxide particles with a high refractive index

In the metal oxide particles with a high refractive index for use in the invention, the fine particles of the titanium-based oxide are preferably those obtained by calcining particles of a composite oxide containing titanium and tin and/or silicon and then pulverizing thus calcined particles.

The "particles of a composite oxide" referred to herein means particles of a composite oxide containing titanium and tin, particles of a composite oxide containing titanium, tin and silicon, or the like, and a part of each compound is schematically shown below.

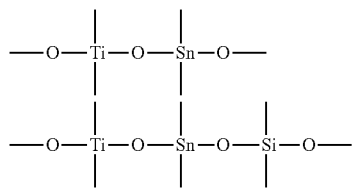

The particles of the composite oxide are not specifically restricted, but are preferably those obtained by placing a mixed aqueous solution containing peroxotitanic acid and potassium stannate and/or a silicon compound in an autoclave, subjecting the solution to hydrothermal treatment at a temperature of 150 to 250° C. to form a composite oxide containing titanium and tin and/or silicon, then adjusting pH of the mixed aqueous solution containing the composite oxide to 3 to 10, subjecting the mixed aqueous solution to a spray dryer, and then spray-drying the solution. The silicon compound is preferably at least one selected from a silica fine particle, silicic acid and a silicon alkoxide.

If the hydrothermal treatment is carried out at a temperature lower than 150° C., crystallization of the composite oxide hardly proceeds, and therefore, crystallinity of the resulting particles (i.e., primary particles) is low. If the hydrothermal treatment is carried out at a temperature higher than 250° C., not only does crystallization of the composite oxide excessively proceed, but the resulting particles are also liable to be aggregated. Therefore, such temperatures are undesirable.

If the pH of the mixed aqueous solution is less than 3, not only is a fear of equipment corrosion increased, but storage stability of the mixed aqueous solution is also liable to be lowered. If the pH exceeds 10, capillary force acting among particles during drying is increased, whereby rigid dry particles (i.e., dried particles that are hardly pulverized in the pulverization step of the later stage) are liable to be formed. Therefore, such pH values are undesirable. However, when the pH of the mixed aqueous solution is in the range of 3 to 10, adjustment of the pH does not necessarily have to be carried out.

It is preferable that the composite oxide has already been crystalline particles with a rutile-type crystal structure in the step of hydrothermal treatment.

The particles of the composite oxide can be prepared also by subjecting the mixed aqueous solution to a general hot air drying apparatus to obtain a dry product (usually obtained as a massive solid) of a composite oxide contained in the mixed aqueous solution, without using a spray dryer, and then subjecting the dry product to a pulverization apparatus to appropriately pulverize the dry product. However, the operations are complicated, and it is difficult to efficiently obtain particles of the composite oxide having uniform particle diameters. Therefore, in the preparation of the particles of the composite oxide, the mixed aqueous solution is preferably spray dried by use of a spray dryer to perform drying and granulating of a composite oxide contained in the mixed solution at the same time. The particles of the composite oxide may be freeze dried by use of freeze drying equipment or the like.

Next, the particles of the composite oxide are preferably calcined at a temperature of 300 to 800° C. in an oxygen-containing atmosphere to form particles of a composite oxide having a crystallite diameter, as determined by X-ray diffraction, in the range of 7.5 to 14.0 nm, preferably 8.0 to 12.0 nm. This makes the crystallinity of the particles of the composite oxide higher, and therefore leads to give particles (secondary particles) of a titanium-based oxide with such a high refractive index and low photocatalytic activity as shown below and with a rutile-type crystal structure.

If the calcining temperature is lower than 300° C., crystallization inside the particles hardly proceeds and this makes difficult to obtain particles having a desired crystallite diameter, as determined by X-ray diffraction. Besides, the specific surface area of the particles is relatively large, and therefore the dispersibility of the particles in water or the like is deteriorated. If the calcining temperature exceeds 800° C., sintering of particles with one another (particularly, sintering of primary particles with one another) rapidly proceeds, and as a result, the specific surface area on the surfaces of the particles is extremely reduced. Therefore, such calcining temperatures are undesirable. If the crystallite diameter, as determined by X-ray diffraction, is less than 7.5 nm, the crystallinity of the particles is lowered, and a desired refractive index is not obtained. If the crystallite diameter, as determined by X-ray diffraction, exceeds 14.0 nm, the refractive index of the particles is too high, and light scattering on the surfaces of the particles is increased. Therefore, such crystallite diameters are undesirable.

The particles of the titanium-based oxide is required to be processed into fine particles having such small particle diameters as to be able to form a sol. Therefore, the particles of the titanium-based oxide are preferably subjected to a pulverization apparatus such as a sand mill and preferably pulverized in the presence of an inorganic dispersing agent such as potassium hydroxide and/or an organic dispersing agent such as a carboxylic acid compound. Such a process is performed to give fine particles of a titanium-based oxide (i.e., crystalline fine particles of a titanium-based oxide) having an average particle diameter, as measured by a dynamic light scattering method, in the range of 15 to 60 nm.

If the average particle diameter is less than 15 nm, the viscosity of a sol is liable to increase when the concentration of solid matters (i.e., fine particles of a titanium-based oxide) contained in the sol is raised. Therefore, such an average particle diameter is undesirable. If the average particle diameter exceeds 60 nm, light scattering on the surfaces of the particles is increased, and as a result, the turbidity of a water dispersion sol containing metal oxide particles obtained by use of the fine particles of the titanium-based oxide is sometimes raised, and this sometimes leads to a high haze of a coating film obtained from a coating composition prepared by use of the water dispersion sol. Therefore, such an average particle diameter is undesirable.

The fine particles of the titanium-based oxide having such properties as above are not commercially available at present, but when they are available from a third person in future, they may be used. That is to say, in the present invention, use of the fine particles of the titanium-based oxide having a possibility of being provided or sold by a third person in future is also included in the scope of the present invention.

Since the fine particles of the titanium-based oxide are those prepared by such pulverization or pulverization and peptization as above, coarse particles having a relatively large particle diameter are sometimes contained in the particle assemblage.

Then, in the present invention, at least coarse particles larger than 100 nm in the particle diameter, as measured by a dynamic light scattering method, are desirably separated and removed from the fine particles of the titanium-based oxide obtained by the above pulverization (i.e., fine particles of a composite oxide), by dispersing the fine particles of the titanium-based oxide in pure water or ultrapure water, and then subjecting the resulting water dispersion to a wet classification apparatus.

That is to say, in a frequency distribution of particle diameter obtainable when the fine particles of the titanium-based oxide are measured by a dynamic light scattering method, the distribution frequency of relatively coarse fine particles of a titanium-based oxide larger than 100 nm in the particle diameter is preferably not more than 1%, more preferably not more than 0.2%.

If the distribution frequency of the coarse particles exceeds 1%, the water dispersion sol containing metal oxide particles obtained from fine particles of a titanium-based oxide containing such coarse particles sometimes has a turbidity of more than 10 cm$^{-1}$, and this sometimes leads to lowering of transparency of a coating film obtained from a coating composition prepared by use of the water dispersion sol. Therefore, such a distribution frequency is undesirable.

Through the above operation, fine particles of a titanium-based oxide (i.e., crystalline fine particles of a titanium-based oxide) are obtained with an average particle diameter, as measured by a dynamic light scattering method, in the range of 15 to 60 nm, preferably 15 to 45 nm.

In addition, the particles of the composite oxide obtained by spray-drying with the spray dryer are spherical particles composed of agglomerates of primary particles having a small particle diameter. The fine particles of a titanium-based oxide provide fine particles of a titanium-based oxide having an average particle diameter in the range of 15 to 60 nm by being subjected to a pulverization apparatus such as a sand mill, even if calcined. Moreover, particles of the composite oxide obtained by spray-drying with a spray dryer are relatively easily pulverized, and have a low probability of formation of coarse particles larger than 100 nm in the particle diameter, as measured by a dynamic light scattering method. Therefore, particles obtained by spray-drying with a spray dryer are preferably used as the particles of the composite oxide.

In the metal oxide particles with a high refractive index for use in the present invention, the fine particles of the titanium-based oxide are crystalline fine particles with a rutile-type crystal structure. The metal oxide particles desirably have a crystallite diameter, as determined by X-ray diffraction, in the range of 7.5 to 14.0 nm, a specific surface area in the range of 70 to 155 m$^2$/g, preferably 90 to 130 m$^2$/g, and a refractive index in the range of 2.2 to 2.7, preferably 2.3 to 2.6.

If the specific surface area is less than 70 m$^2$/g, the particle diameters are large because sintering of the primary particles with one another has proceeded. As a result, light scattering on the surfaces of the particles are sometimes increased, or the later-described coating of the surfaces of the particles is sometimes difficult. If the specific surface area exceeds 155 m$^2$/g, the amount of OH groups present on the surfaces of the particles is increased. As a result, the aforesaid photocatalytic activity is strengthened. Therefore, such specific surface areas are undesirable. If the refractive index is less than 2.2, a desired refractive index of the later-described metal oxide particles cannot be obtained because the fine particles of the titanium-based oxide are coated with a silica-based oxide or a silica-based composite oxide to thereby further lower the refractive index. If the refractive index exceeds 2.7, light scattering on the surfaces of the particles is increased. Therefore, such refractive indexes are undesirable. The crystallite diameter, as determined by X-ray diffraction, is as described above.

In the fine particles of the titanium-based oxide, a spacing $d^1$ of the (310) crystal face, as determined by X-ray diffraction of the fine particles of the titanium-based oxide, is in the range of 0.1440 to 0.1460 nm, preferably 0.1445 to 0.1455 nm, and a spacing $d^2$ of the (301) crystal face, as determined by the same X-ray diffraction, is in the range of 0.1355 to 0.1370 nm, preferably 0.1356 to 0.1368 nm.

If the spacing $d^1$ of the (310) crystal face is less than 0.1440 nm, the photocatalytic activity tends to be strengthened, and if the spacing $d^1$ of this crystal face exceeds 0.1460 nm, the photocatalytic activity tends to be strengthened likewise. Therefore, such spacings are undesirable. Details of mechanism of occurrence of such a phenomenon are not clear at present. However, in the former case, the possible reason why the photocatalytic activity tends to be strengthened is that the spacing of the (310) crystal face that is possibly involved in the restraint of photocatalytic reaction is narrowed, and thereby diffusion of electrons and positive holes (holes) onto surfaces of particles is liable to be promoted. In the latter case, the possible reason why the photocatalytic activity tends to be strengthened is that the spacing of the (310) crystal face that is possibly involved in the restraint of photocatalytic reaction is widened contrary to the above, and hence the density of the (310) crystal face is liable to be lowered. If the spacing $d^2$ of the (301) crystal face is less than 0.1355 nm, the photocatalytic activity tends to be strengthened, and if the spacing $d^2$ of this crystal face exceeds 0.1370 nm, the photocatalytic activity tends to be strengthened likewise. Therefore, such spacings are undesirable. Details of mechanism of occurrence of such a phenomenon are not clear at present. However, similarly to the above (310) crystal face, the possible reason why the photocatalytic activity tends to be strengthened is that the spacing of the (301) crystal face that is possibly involved in the restraint of photocatalytic reaction is narrowed, and hence diffusion of electrons and positive holes onto surfaces of particles is liable to be promoted. In the latter case, the possible reason why the photocatalytic activity tends to be strengthened is that the spacing of the (301) crystal face that is possibly involved in the restraint of photocatalytic reaction is widened contrary to the above, and hence the density of the (301) crystal face is liable to be lowered.

In the fine particles of the titanium-based oxide, a relative ratio ($P^1/P^2$) of a peak intensity $P^1$ of the (310) crystal face to a peak intensity $P^2$ of the (110) crystal face, as determined by X-ray diffraction of the fine particles of the titanium-based oxide, is desired to be in the range of 9/100 to 20/100, preferably 12/100 to 14/100.

If the relative ratio ($P^1/P^2$) is less than 9/100, the photocatalytic activity tends to be strengthened, and if the relative ratio exceeds 20/100, the photocatalytic activity tends to be strengthened likewise. Therefore, such relative ratios are undesirable. Details of mechanism of occurrence of such a phenomenon are not clear at present. However, in the former case, the possible reason why the photocatalytic activity tends to be strengthened is that the number of the (110) crystal face that is possibly involved in the acceleration of photocatalytic reaction is relatively larger than the number of the (310) crystal face that is possibly involved in the restraint of photocatalytic reaction. In the latter case, the number of the (110) crystal face that is possibly involved in the acceleration of photocatalytic reaction is relatively smaller than the number of the (310) crystal face that is possibly involved in the restraint of photocatalytic reaction. Based on this, it seems that the photocatalytic activity should be restrained. However contrary to this, the photocatalytic activity tends to be strengthened. The reason has not been clarified yet. However, the possible reason is that, for example, a relatively large number of OH groups (including .OH of free radicals) to be photocatalytic active sites are present at the surface positions called Kink or Corner where reaction activity is enhanced.

In the metal oxide particles with a high refractive index for use in the present invention, the silica-based oxide used to coat the fine particles of the titanium-based oxide contains silicon dioxide represented by the chemical formula $SiO_2$, and preferably substantially consists of silicon dioxide. The silica-based composite oxide that is used similarly to the above is a compound containing silicon and at least one metal element selected from zirconium, antimony, tin and aluminum, and a part of each compound is schematically shown below.

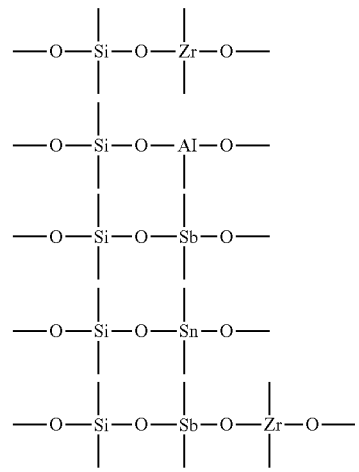

The silica-based oxide or a silica-based composite oxide as above is coated on the surfaces of the fine particles of the titanium-based oxide to give metal oxide particles for use in the present invention.

The metal oxide particles are not specifically restricted, and are preferably fine particles obtained by mixing a water dispersion sol containing the fine particles of the titanium-based oxide with at least one silicon compound selected from a silicon alkoxide and silicic acid, and then hydrolyzing the silicon compound to coat the fine particles of the titanium-based oxide on their surface with a silica-based oxide.

The metal oxide particles are not specifically restricted as described above, and are preferably metal oxide particles obtained by mixing the water dispersion sol containing the fine particles of the titanium-based oxide with at least one silicon compound selected from a silicon alkoxide and silicic acid and at least one metal compound selected from a peroxozirconate, an antimonate, and an aluminate, and then hydrolyzing the silicon compound and the metal compound to coat the fine particles of the titanium-based oxide on their surfaces with a silica-based composite oxide.

The silicon alkoxide is preferably tetramethoxysilane or a hydrolysate thereof, or tetraethoxysilane or a hydrolysate thereof. The hydrolysate of tetramethoxysilane is, for example, Methyl Silicate 51™ represented by the formula, $Si_nO_{n-1}(OCH_3)_{2n+2}$, and the hydrolysate of tetraethoxysilane is, for example, Ethyl Silicate 40™ represented by the formula, $Si_nO_{n-1}(OC_2H_5)_{2n+2}$, or Ethyl Silicate 45™.

The metal oxide particles are preferably fine particles obtained by coating the fine particles of the titanium-based oxide and a coating layer formed on their surfaces with the silica-based oxide or the silica-based composite oxide in such a manner that when the weight of the fine particles of the titanium-based oxide is expressed as "C" and the weight of their coating layers is expressed as "S", the weight ratio (S/C) is 1/100 to 50/100 in terms of the respective metal oxides.

If the weight ratio is less than 1/100 in terms of the respective metal oxides, the photocatalytic activity cannot be sufficiently restrained occasionally. If the weight ratio exceeds 50/100 in terms of the respective metal oxides, the coating layers are thickened, and a desired refractive index is sometimes not obtained. Therefore, such weight ratios are undesirable.

The coating layers of the metal oxide particles desirably have a refractive index that is lower than the refractive index of the fine particles of the titanium-based oxide by 0.2 or more, preferably 0.5 or more.

Unless the refractive index of the coating layers is lower than the refractive index of the fine particles of the titanium-based oxide by 0.2 or more, light scattering on the surfaces of the particles sometimes cannot be sufficiently restrained. Therefore, such a refractive index is undesirable.

The refractive index of the metal oxide particles each having the above coating layer is desired to be in the range of 2.0 to 2.5, preferably 2.1 to 2.4.

If the refractive index of the metal oxide particles is less than 2.0, it is difficult to increase the refractive index of a coating film obtained from a coating liquid for forming a coating film prepared by use of a water dispersion sol containing the fine particles to 1.70 or more. If the refractive index thereof exceeds 2.5, the refractive index of the coating film is too high and interference fringes are liable to occur, when the metal oxide particles are added in an amount necessary for imparting a satisfactory hardness (namely, appropriate hard coat properties) to the coating film obtained from a coating liquid for forming a coating film prepared by use of a water dispersion sol containing the fine particles. Therefore, such refractive indexes are undesirable.

That is to say, the metal oxide particles with a high refractive index for use in the present invention are constituted with fine particles of a titanium-based oxide with a rutile-type crystal structure which are specially processed as above and a coating layer formed on a surface each of the fine particles of the titanium-based oxide with a silica-based oxide or a silica-based composite oxide.

(2) Binder Component

The binder component for use in the present invention can be properly selected from publicly known binder components and binder components that are being developed at present, according to the use purpose of the coating composition. Here, typical binder components used for coating compositions for optical materials are described in detail. That is to say, specific description is made on: an organosilicon compound that is used for a coating material for forming a film of a hard coat layer or the like; and a thermosetting organic resin or a thermoplastic organic resin that is used for a coating composition for forming a film of a primer layer or the like.

However, the binder component for use in the present invention is not necessarily limited to them, and substances functioning as binder components for the metal oxide particles with a high refractive index are employable. For example, compounds such as metallic alkoxides (e.g., titanium alkoxide) or ultraviolet-curable compounds (e.g., polyfunctional acrylic-based compounds having acryloyloxy group) can be used instead of the organosilicon compound, and compounds such as the above ultraviolet-curable compounds can be used instead of the thermosetting organic resin or the thermoplastic organic resin.

(a) Organosilicon Compound

The organosilicon compound as the binder component for use in the present invention is preferably an organosilicon compound represented by the following formula (I) and/or a hydrolyzate thereof.

$$R^1_a R^2_b Si(OR^3)_{4-(a+b)} \quad (I)$$

In the above formula, $R^1$ is an alkyl group of 1 to 6 carbon atoms, an organic group having 8 or less carbon atoms and containing a vinyl group, an organic group having 8 or less carbon atoms and containing an epoxy group, an organic group having 8 or less carbon atoms and containing a methacryloxy group, an organic group having 1 to 5 carbon atoms and containing a mercapto group or an organic group having 1 to 5 carbon atoms and containing an amino group, $R^2$ is an alkyl group of 1 to 3 carbon atoms, an alkylene group, a cycloalkyl group or a halogenated alkyl or allyl group, $R^3$ is an alkyl group of 1 to 3 carbon atoms, alkylene group or a cycloalkyl group, a is an integer of 0 or 1, and b is an integer of 0, 1 or 2.

A typical example of the organosilicon compound represented by the formula (I) is an alkoxysilane compound, and specific examples thereof include tetraethoxysilane, methyltrimethoxysilane, vinyltrimethoxysilane, γ-methacryloxypropyltrimethoxysilane, trimethylchlorosilane, α-glycidoxymethyltrimethoxysilane, α-glycidoxyethyltrimethoxysilane, β-glycidoxyethyltrimethoxysilane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)-ethyltrimethoxysilane, β-(3,4-epoxycyclohexyl)-ethyltriethoxysilane, γ-aminopropyltrimethoxysilane, γ-aminopropyltriethoxysilane, N-β(aminoethyl)-γ-aminopropylmethyldimethoxysilane and N-β(aminoethyl)-γ-aminopropylmethyldiethoxysilane. Of these, tetraethoxysilane, methyltrimethoxysilane, γ-glycidoxypropyltrimethoxysilane, γ-glycidoxypropylmethyldiethoxysilane and β-(3,4-epoxycyclohexyl)-ethyltrimethoxysilane are preferably used. These organosilicon compounds (2) may be used singly or in combination of two or more kinds.

(b) Thermosetting Organic Resin

The thermosetting organic resin for the binder component for use in the present invention is preferably at least one selected from a urethane-based resin, an epoxy-based resin and a melamine-based resin.

More specifically, the urethane-based resin is, for example, a reaction product of block type polyisocyanate such as hexamethylene diisocyanate with an active hydrogen-containing compound such as polyester polyol or polyether polyol, and the epoxy resin is, for example, a polyalkylene ether modified epoxy resin or an epoxy group-containing compound wherein a flexible skeleton (a soft segment) has been introduced into a molecular chain.

The melamine-based resin is, for example, a cured product of etherifiedmethylolmelamine with polyester polyol or polyether polyol. Of these, the urethane-based resin that is a cured product of block type isocyanate with polyol is preferably used. These thermosetting organic resins may be used singly or in combination of two or more kinds.

(c) Thermoplastic Organic Resin

The thermoplastic organic resin for the binder component for use in the present invention is preferably at least one selected from an acrylic-based resin, a urethane-based resin and an ester-based resin, and is more preferably a self-emulsifiable aqueous emulsion resin.

More specifically, the acrylic-based resin is, for example, an aqueous emulsion obtained from a (meth)acrylic acid alkyl ester monomer or a polymer emulsion obtained by copolymerization of the above monomer and styrene, acrylonitrile or the like. The urethane resin is, for example, an aqueous emulsion obtained by reacting polyisocyanate with a polyol compound such as polyester polyol, polyether polyol or polycarbonate polyol. The ester-based resin is, for example, a water dispersion type elastomer of a multi-block copolymer obtained by use of polyester for a hard segment and polyether or polyester for a soft segment. Of these, a water dispersion type urethane-based resin obtained from polyester polyol or polyether polyol and polyisocyanate is preferably used. These thermoplastic organic resins may be used singly or in combination of two or more kinds.

Next, the coating composition comprising the metal oxide particles with a high refractive index and the binder component is described in more detail. That is to say, the coating composition containing the organosilicon compound as specific description is hereinafter made on the bonder component (hereinafter sometimes referred to as a "coating composition-1") and the coating composition containing the thermosetting organic resin or the thermoplastic organic resin as the binder component (hereinafter sometimes referred to as a "coating composition-2").

Coating Composition-1

In the preparation of the coating composition-1 of the present invention, it is preferable that the organosilicon compound is partially hydrolyzed or hydrolyzed in a polar organic solvent such as an alcohol or without a solvent in the presence of an acid or water, and then mixed with an organic solvent dispersion sol containing the metal oxide particles with a high refractive index. The organosilicon compound may be partially hydrolyzed or hydrolyzed after mixed with the organic solvent dispersion sol.

The coating composition-1 is prepared by mixing the organosilicon compound and/or hydrolyzate thereof with an organic solvent dispersion sol containing the metal oxide particles with a high refractive index as described above, and the mixing ratio is as follows. That is to say, when the weight of a silicon constituent in terms of $SiO_2$ is expressed as "X" and the weight of the metal oxide particles with a high refractive index is expressed as "Y", the weight ratio (X/Y) is preferably in the range of 30/70 to 90/10, more preferably 35/65 to 80/20. If the weight ratio is less than 30/70, adhesion to an optical substrate or another coating film (e.g., film of a primer layer) is sometimes lowered, and if the weight ratio exceeds 90/10, refractive index of the resulting coating film or scratch resistance of the surface of the coating film is lowered. Therefore, such weight ratios are undesirable.

The coating composition-1 prepared as above can be favorably used as a coating composition for forming a film of a hard coat layer.

The coating composition-1 may contain a non-crosslinked epoxy compound in addition to the above components for the purpose of enhancing dyeing properties of the coating film such as a film of a hard coat layer, enhancing adhesion to a plastic lens substrate or the like, and preventing occurrence of cracks.

Examples of the non-crosslinked epoxy compounds include 1,6-hexanediol diglycidyl ether, ethylene glycol diglycidyl ether, propylene glycol diglycidyl ether, glycerol diglycidyl ether and glycerol triglycidyl ether. Of these, 1,6-hexanediol diglycidyl ether, glycerol diglycidyl ether, glycerol triglycidyl ether or the like is preferably used. These non-crosslinked epoxy compounds may be used singly or in combination of two or more kinds.

The coating composition-1 may further contain components other than the above components, such as a surface active agent, a leveling agent and/or an ultraviolet light absorber, and organic compounds and inorganic compounds described in hitherto publicly known literatures, such as Patent literature 2, Patent literature 3, Japanese Patent Laid-Open Publication No. 310755/1999 and International Publication WO2007/046357.

Coating Composition-2

The coating composition-2 of the present invention is prepared by mixing the thermosetting organic resin or the thermoplastic organic resin with an organic solvent dispersion sol of the metal oxide particles with a high refractive index.

The mixing ratio varies depending upon the type of the resin compound (i.e., the thermosetting organic resin or the thermoplastic organic resin), the use purpose of the coating composition and the like. However, it is preferable that when the weight of the resin compound is expressed as "A" and the weight of the metal oxide particles with a high refractive index is expressed as "B", the weight ratio (A/B) is in the range of 90/10 to 30/70, preferably 80/20 to 35/65. If the weight ratio is less than 20/80, adhesion between a coating film (a film of a primer layer) formed from this coating composition and a film of a hard coat layer formed on the surface of the film of a primer layer is sometimes lowered. In the case where an antireflection layer film is formed on the surface of the film of a hard coat layer, impact resistance of the resulting optical lens substrate is sometimes deteriorated. Therefore, such a weight ratio is undesirable. If the weight ratio exceeds 90/10, heat resistance of a coating film (a film of a primer layer) formed from this coating composition is sometimes deteriorated, and besides, refractive index of the coating film is sometimes lowered. Therefore, such a weight ratio is undesirable.

The coating composition-2 prepared as above can be favorably used as a coating composition for an optical substrate (particularly, coating composition for forming a film of a primer layer).

The coating composition-2 may further contain components other than the above components, such as a neutralizing agent, a surface active agent and an ultraviolet light absorber, and organic compounds and inorganic compounds described in hitherto publicly known literatures such as International Publication WO2007/026529.

Preparation Process

Next, the process for preparing the coating composition-1 or the coating composition-2 of the present invention is described in detail. As described above, the coating composition-1 or the coating composition-2 is prepared by preparing a water dispersion sol containing metal oxide particles with a high refractive index, then preparing an organic solvent dispersion sol containing the fine particles from the water dispersion sol, and then mixing the organic solvent dispersion sol with the organosilicon compound (which is a component of the coating composition-1) or the thermosetting resin or the thermoplastic resin (each of which is a component of the coating composition-2). The steps of the preparation process are described below. However, the preparation process described here is one embodiment, and the coating composition of the present invention is not limited to the coating composition obtained by the preparation process.

Here, the "pure water" used in the present invention means ion-exchanged water, and the "ultrapure water" means water having an impurity content of not more than 0.01 μg/liter obtained by further removing impurities from the pure water.

(1) Process for Preparing Water Dispersion Sol

The process for preparing a water dispersion sol containing metal oxide particles with a high refractive index for use in the present invention is described below.

Preparation Process-1

The first process for preparing the water dispersion sol (hereinafter referred to as a "preparation process-1") is a process for preparing a water dispersion sol containing metal oxide particles with a high refractive index constituted with fine particles of a titanium-based oxide having an average particle diameter, as measured by a dynamic light scattering method, in the range of 15 to 60 nm and a coating layer formed on a surface each of the fine particles of the titanium-based oxide with at least a silica-based oxide, which is comprises:

(a) a step of placing a mixed aqueous solution containing peroxotitanic acid and potassium stannate and/or a silicon compound in an autoclave and subjecting the solution to hydrothermal treatment at a temperature of 150 to 250° C. to form a composite oxide containing titanium and tin and/or silicon;

(b) a step of drying the composite oxide formed in the step (a) and granulating the dried composite oxide to obtain particles of a composite oxide containing titanium and tin and/or silicon and having an average particle diameter of 1 to 80 µm;

(c) a step of calcining the particles of the composite oxide obtained in the step (b) in an oxygen-containing atmosphere at a temperature of 300 to 800° C. to obtain particles of the titanium-based oxide composed of a calcined product of the particles of the composite oxide;

(d) a step of pulverizing the particles of the titanium-based oxide obtained in the step (c) to give fine particles of a titanium-based oxide having an average particle diameter, as measured by a dynamic light scattering method, in the range of 15 to 60 nm and dispersing the fine particles of the titanium-based oxide in pure water or ultrapure water to obtain a water dispersion sol;

(e) a step of subjecting the water dispersion obtained in the step (d) to a wet classification apparatus to separate and remove at least coarse particles larger than 100 nm in the particle diameter, as measured by a dynamic light scattering method, when needed; and (f) a step of mixing the water dispersion obtained in the step (d) or the step (e) with (i) at least one silicon compound selected from a silicon alkoxide and silicic acid to hydrolyze the silicon compound and thereby obtain a water dispersion sol containing metal oxide particles constituted with the fine particles of the titanium-based oxide and a coating layer formed on their surface of the fine particles of the titanium-based oxide with a silica-based oxide.

Next, the above steps are described in detail.

Step (a)

An aqueous solution of titanium tetrachloride containing about 7 to 8% by weight of a titanium constituent in terms of $TiO_2$ is mixed with an aqueous ammonia containing about 10 to 20% by weight of ammonia ($NH_3$) to obtain a white slurry having pH of about 9 to 10. Subsequently, the slurry is subjected to filtration, and the resulting cake is then washed with pure water to obtain a purified cake of hydrous titanic acid having a solid content of about 8 to 14% by weight.

Subsequently, to the cake, an aqueous hydrogen peroxide containing about 30 to 40% by weight of hydrogen peroxide ($H_2O_2$) and pure water are added, and the resulting mixture are heated at a temperature of about 70 to 90° C. for about 0.5 to 5 hours while stirring to obtain an aqueous solution of peroxotitanic acid containing about 1 to 3% by weight of a titanium constituent in terms of $TiO_2$. The aqueous solution of peroxotitanic acid is with a color of transparent yellow-brown, and has pH of about 7.5 to 8.5.

However in the present invention, peroxotitanic acid prepared by a method other than the above method may be used.

Subsequently, the aqueous solution of peroxotitanic acid is mixed with a cation-exchange resin, and to the mixture, an aqueous solution of potassium stannate containing about 0.5 to 2% by weight of a tin constituent in terms of $SnO_2$ is gradually added while stirring.

Subsequently, after the cation-exchange resin in which a potassium ion and the like have been incorporated is separated from the mixture solution, a silica sol containing silica fine particles with an average particle diameter of about 4 to 12 nm and containing about 10 to 20% by weight of silicon oxide ($SiO_2$) and pure water are added thereto, and then hydrothermal treatment is carried out at a temperature of 150 to 250° C., preferably 160 to 200° C., for about 15 to 20 hours, preferably 16 to 19 hours, in an autoclave. In this case, silicic acid or a silicon alkoxide comprising tetramethoxysilane, tetraethoxysilane or a hydrolysate thereof can be used instead of the silica sol. However, such a silica source is not required to be added in the case of the preparation of particles of a composite oxide composed of titanium and tin.

As previously described, if the hydrothermal treatment temperature is lower than 150° C., crystallization of the composite oxide containing titanium and tin and/or silicon hardly proceeds, and hence, crystallinity of the resulting particles (i.e., primary particles) is low. If the hydrothermal treatment temperature exceeds 250° C., not only does crystallization of the composite oxide excessively proceed, but the resulting particles are also liable to be aggregated. Therefore, the hydrothermal treatment is preferably carried out at a temperature properly selected from the above range. If the hydrothermal treatment time is less than 15 hours, a non-crystallized composite oxide or insufficiently crystallized fine particles of a composite oxide sometimes remain. If the hydrothermal treatment time exceeds 20 hours, the resulting crystalline fine particles of the composite oxide are liable to be aggregated. Therefore, such hydrothermal treatment time is undesirable.

Such a process is performed to give a mixed aqueous solution containing a composite oxide with a rutile-type crystal structure and containing titanium and tin and/or silicon. When the silica source is not added, a mixed aqueous solution containing a composite oxide containing titanium and tin is obtained, but the description about this is hereinafter omitted. Next, the resulting mixed aqueous solution is cooled down to room temperature, then is subjected to an ultrafiltration apparatus to be concentrated to obtain a mixed aqueous solution having a solid content of about 2 to 15% by weight. Subsequently, the pH of the mixed aqueous solution is adjusted to 3 to 10, preferably 4 to 8, when needed. When the mixed aqueous solution shows an alkalinity of pH 10 or more, this pH adjustment can be carried out by adding a cation-exchange resin to the mixed aqueous solution to remove a potassium ion and the like contained in the mixed aqueous solution. The mixed aqueous solution hardly shows pH of less than 3. However in such a case of pH of less than 3, the pH adjustment can be carried out by adding potassium hydroxide or the like.

If the pH is less than 3, not only is a fear of equipment corrosion increased, but storage stability of the mixed aqueous solution is also liable to be lowered, as previously described. If the pH exceeds 10, capillary force acting among particles during drying is increased, and thereby rigid dried particles (namely, dried particles that are hardly pulverized in the pulverization step of the later stage) are liable to be formed. Therefore, it is preferable to properly adjust pH to be in the above range.

And also, the cation-exchange resin and the like used in the pH adjustment are separated to obtain a mixed aqueous solution having a solid content of about 2 to 15% by weight. However, when the pH of the mixed aqueous solution is in the range of 3 to 10, the pH adjustment is not required, and consequently, separation and removal of the cation-exchange resin and the like are also not required.

Step (b)

Next, the composite oxide contained in the mixed aqueous solution is dried and granulated. In this case, the dried and granulated composite oxide may be prepared by subjecting the mixed aqueous solution to a hot air drying apparatus in a general use, drying the composite oxide contained in the mixed aqueous solution to obtain a dried product (usually obtained as a massive solid), then subjecting the dried product to a pulverization apparatus and appropriately pulverizing the dry product. However, these operations are complicated, and therefore, the mixed aqueous solution may be preferably spray dried using a spray dryer. If the spray dryer is used, drying and granulating of the solid matters can be carried out at the same time.

As the spray dryer, a hitherto publicly known one (e.g., spray dryer of disc rotation type or nozzle type) can be used. The spray-drying is carried out by spraying the water dispersion, which has been concentrated when needed, into a stream of hot air using a hitherto publicly known method.

In this spray-drying, the temperature of the hot air desirably satisfies an inlet temperature in the range of 150 to 200° C., preferably 170 to 180° C., and an outlet temperature in the range of preferably 40 to 60° C. If the inlet temperature is lower than 150° C., drying of the solid materials contained in the water dispersion is insufficient. On the other hand, if the inlet temperature is higher than 200° C., drying of the solid materials is not carried out economically. If the outlet temperature is lower than 40° C., the particles of the solid materials adhere inside the apparatus because of poor drying of the particles. Therefore, such a temperature is undesirable.

Such a spray-drying process as described above gives dried particles of a composite oxide having an average diameter of 1 to 80 μm, preferably 2 to 60 μm.

As previously described, the drying operation may be carried out by use of a hot air drying apparatus which is in a general use. However, such a dry process gives a dried product in a state of a massive solid, which is difficult to efficiently turn into particles having uniform particle diameters even if it is subjected to a pulverization apparatus to be pulverized.

Step (c)

Next, the particles of the composite oxide obtained by spray-drying are subjected to a calcining apparatus and is calcined at a temperature of 300 to 800° C., preferably 400 to 700° C., over a period of 30 to 240 minutes, preferably 60 to 180 minutes, in an oxygen-containing atmosphere such as in an air.

As previously described, if the calcining temperature is lower than 300° C., crystallization inside the particles hardly proceeds. As a result, obtaining particles having a desired crystallite diameter, as determined by X-ray diffraction is difficult. If the temperature exceeds 800° C., sintering of particles with one another (particularly, sintering of primary particles with one another) rapidly proceeds. As a result, the specific surface area on the surfaces of the particles is markedly reduced. Therefore, the calcining is preferably carried out at a temperature properly selected from the above range. If the calcining time is less than 30 minutes, the whole particles of the composite oxide are not sufficiently calcined occasionally. On the other hand, if the calcining time is more than 240 minutes, calcining is not curried out economically. Therefore, such a calcining time is undesirable.

The above calcining process gives particles of a composite oxide having a crystallite diameter, as determined by X-ray diffraction, in the range of 7.5 to 14.0 nm, preferably 8.0 to 12.0 nm, namely, particles of the titanium-based oxide having a relatively high crystallinity. In more detail, if the above calcining operation is carried out, crystallinity of the particles of the composite oxide is enhanced, which leads to give crystalline particles of the titanium-based oxide with a rutile-type crystal structure having the above-mentioned crystallite diameter, as determined by X-ray diffraction. Moreover, the particles of the titanium-based oxide themselves have a high refractive index and low photocatalytic activity.

If particles having a crystallite diameter, as determined by X-ray diffraction, of less than 7.5 nm are obtained, the calcining temperature is required to be elevated. If particles having a crystallite diameter, as determined by X-ray diffraction, of more than 14.0 nm are obtained, the calcining temperature is required to be lowered.

Step (d)

Subsequently, the calcined particles of the titanium-based oxide are those having relatively large particle diameters, specifically having an average particle diameter of 1 to 80 μm, and are therefore subjected to a pulverization apparatus and pulverized into fine particles having such small particle diameters as to be able to form a sol.

As the pulverization apparatus, a hitherto publicly known pulverization apparatus, such as sand mill, roll mill, bead mill, ultrasonic dispersing machine, Ultimizer or Nanomizer (registered trademark or trademark), may be used. The operation conditions of the pulverization apparatus vary depending upon the pulverization apparatus used, the properties of the fine particles of the titanium-based oxide and the like. However, when a sand mill (Kansai Paint Co., Ltd., bench sand mill) is used, the pulverization is preferably conducted by placing an aqueous suspension (solid content: 5 to 40% by weight) of spherical quartz beads in the range of 0.1 to 0.2 mm in the bead diameter and the particles of the titanium-based oxide in an apparatus equipped with a ceramic disc rotor or the like, and currying out pulverization under general conditions (e.g., rotor rotation speed: 600 to 2000 rpm, treatment time: 1 to 10 hours).

The above pulverization process gives fine particles of a titanium-based oxide (namely, crystalline fine particles of a titanium-based oxide) having an average particle diameter, as measured by a dynamic light scattering method, in the range of 15 to 60 nm.

As previously described, if the average particle diameter is less than 5 nm, the viscosity of a sol tends to be markedly increased when the fine particles of the titanium-based oxide are dispersed in an aqueous solution (water dispersion sol) in a high concentration. If the average particle diameter exceeds 60 nm, light scattering on the surfaces of the particles is increased, which sometimes results in increase of the turbidity of a water dispersion sol containing metal oxide particles obtained by use of the fine particles of the titanium-based oxide. Therefore, it is preferable to properly adjust the average particle diameter to be in the above range.

The fine particles of the titanium-based oxide obtained as above are crystalline fine particles with a rutile-type crystal structure, and besides, they have a crystallite diameter, as determined by X-ray diffraction, in the range of 7.5 to 14.0 nm, preferably 8 to 12.0 nm, a specific surface area in the range of 70 to 155 $m^2/g$, preferably 90 to 130 $m^2/g$, and a refractive index in the range of 2.2 to 2.7, preferably 2.3 to 2.6.

If fine particles having a specific surface area of less than 70 $m^2/g$ are obtained, the calcining temperature is required to be lowered. If fine particles having a specific surface area of more than 155 $m^2/g$ are obtained, the calcining temperature is required to be elevated. If fine particles having a refractive index of less than 2.2 are obtained, the calcining temperature is required to be elevated. If fine particles having a refractive index of more than 2.7 are obtained, the calcining temperature is required to be lowered. Details of the crystallite diameter, as determined by X-ray diffraction, are as previously described.

Step (e)

The fine particles of the titanium-based oxide are prepared through pulverization, or pulverization and peptization as above, and therefore coarse particles having relatively large particle diameters are sometimes contained in the particle group. When such coarse particles are contained, at least coarse particles larger than 100 nm in the particle diameter, as measured by a dynamic light scattering method, are required to be separated and removed by dispersing the fine particles of the titanium-based oxide in pure water or ultrapure water, and then subjecting the water dispersion to a wet classification apparatus. However, when such coarse particles are not contained, this operation does not necessarily have to be carried out.

As the wet classification apparatus, a hitherto publicly known apparatus, such as centrifugal separator, liquid cyclone or levigation apparatus (spontaneous sedimentation apparatus), may be used.

The separation and removal of the coarse particles are preferably carried out so that in a frequency distribution of particle diameter obtainable when the fine particles of the titanium-based oxide are measured by a dynamic light scattering method, the distribution frequency of coarse particles larger than 100 nm in the particle diameter may be not more than 1%, preferably not more than 0.2%.

As previously described, if the distribution frequency of the coarse particles exceeds 1%, a water dispersion sol containing metal oxide particles obtained from fine particles of the titanium-based oxide containing such coarse particles sometimes has a turbidity of more than 10 cm$^{-1}$. This sometimes leads to lowering of transparency of a coating film obtained from a coating liquid for forming a coating film prepared by use of the water dispersion sol. Therefore, it is desirable to separate and remove such coarse particles as much as possible.

The above process gives fine particles of the titanium-based oxide (i.e., crystalline fine particles of a titanium-based oxide) having an average particle diameter, as measured by a dynamic light scattering method, in the range of 15 to 60 nm, preferably 15 to 45 nm.

The water dispersion sol obtained by dispersing the pulverized fine particles of the titanium-based oxide in pure water or ultrapure water contains a small amount of a potassium ion and the like. Therefore, it is preferable to remove the potassium ion and the like from the water dispersion sol by use of a cation-exchange resin prior to subjecting the water dispersion sol to the wet classification apparatus.

Step (f)

Next, to the dispersion obtained by separating and removing the coarse particles (namely, a water dispersion sol containing fine particles of a titanium-based oxide having an average particle diameter, as measured by a dynamic light scattering method, in the range of 15 to 60 nm), a compound as a raw material used for coating the fine particles of the titanium-based oxide on their surface with a silica-based oxide is added.

That is to say, when the surfaces of the fine particles of the titanium-based oxide are coated with a silica-based oxide, at least one silicon compound selected from a silicon alkoxide and silicic acid is added to the water dispersion sol. Subsequently, the silicon compound is hydrolyzed, whereby the surfaces of the fine particles of the titanium-based oxide are coated with a silica-based oxide such as silicon dioxide.

As previously described, the silicon alkoxide is preferably tetramethoxysliane or a hydrolysate thereof, or tetraethoxysilane or a hydrolysate thereof.

The above process gives metal oxide particles wherein the surfaces of the fine particles of the titanium-based oxide are coated with a silica-based oxide.

The surfaces of the fine particles of the titanium-based oxide are preferably coated with the silica-based oxide in such a manner that when the weight of the fine particles of the titanium-based oxide is expressed as "C" and the weight of their coating layers is expressed as "S", the weight ratio (S/C) is 1/100 to 50/100, preferably 5/100 to 30/100, in terms of the respective metal oxides.

If the weight ratio is less than 1/100 in terms of the respective metal oxides, the photocatalytic activity is not sufficiently restrained occasionally, as previously described. If the weight ratio exceeds 50/100 in terms of the respective metal oxides, the coating layers is thick occasionally and a desired refractive index is not obtained occasionally. Therefore, such weight ratios are undesirable.

The coating weight depends upon the amount of the compound as a raw material that is added to the water dispersion sol. Therefore, it is preferable to appropriately select the amount of the compound as a raw material added.

The coating layers formed as above desirably have a refractive index that is lower than the refractive index of the fine particles of the titanium-based oxide as described above by 0.2 or more. The refractive index of the silica-based oxide such as silicon dioxide is about 1.45, and the above conditions can be readily satisfied.

By coating the fine particles of the titanium-based oxide on their surface with the silica-based oxide as above, light scattering on the surfaces of the particles is markedly restrained, and thereby the later-described turbidity of the water dispersion sol can be controlled low.

The coating layers have an extremely small thickness of not more than 5 nm, particularly 0.1 to 3 nm (although the detailed value is not measurable), and the refractive index of the metal oxide particles obtained as above is very close to the refractive index of the fine particles of the titanium-based oxide. That is to say, the refractive index of the metal oxide particles is relatively high and is in the range of 2.0 to 2.5, preferably 2.1 to 2.4.

In the case where metal oxide particles having a refractive index of less than 2.0 are obtained, formation of a coating film (e.g., coating film for optical substrate) with a desired high refractive index is difficult. Therefore, the thickness of the coating layers is required to be made smaller. In the case where metal oxide particles having a refractive index of more than 2.5 are obtained, restraint of light scattering on the surfaces of the particles is sometimes difficult. Therefore, the thickness of the coating layers is required to be made larger.

The water dispersion sol obtained as above contains ionized substances that are added during the above preparation steps or produced as by-products. The ionized substances include: cationic substances, such as a potassium ion, a sodium ion, an ammonium ion, a tin ion and a titanium ion; and anionic substances, such as a chloride ion, a sulfuric acid ion, a nitric acid ion, a silicic acid ion, a stannic acid ion and a titanic acid ion. The ionized substances are preferably removed as much as possible by adding an anion-exchange resin or a cation-exchange resin to the water dispersion sol and stirring the resulting mixture for a proper time, when needed. The amount of the ionized substances desired to be removed in advance varies depending upon the use purpose of the water dispersion sol. However, the removal is preferably carried out until the total ion concentration of the ionized substances contained in the water dispersion sol is decreased to not more than 0.1 mol/liter. If the total ion concentration exceeds 0.1 mol/liter, aggregation is liable to occur when the metal oxide particles are dispersed in an organic solvent. Therefore, such a total ion concentration is undesirable.

Preparation Process-2

The second process for preparing the water dispersion sol (hereinafter referred to as a "preparation process-2") is a process for preparing a water dispersion sol containing metal oxide particles with a high refractive index constituted with fine particles of a titanium-based oxide having an average particle diameter, as measured by a dynamic light scattering method, in the range of 15 to 60 nm and a coating layer formed on a surface each of the fine particles of the titanium-based oxide with at least a silica-based composite oxide, and this process includes:

(a) a step of placing a mixed aqueous solution containing peroxotitanic acid, and potassium stannate and/or a silicon compound in an autoclave and subjecting the solution to hydrothermal treatment at a temperature of 150 to 250° C. to form a composite oxide containing titanium and tin and/or silicon, (b) a step of drying the composite oxide formed in the step (a) and granulating the dried composite oxide to obtain particles of a composite oxide containing titanium and tin and/or silicon and having an average particle diameter of 1 to 80 μm, (c) a step of calcining the particles of the composite oxide obtained in the step (b) in an oxygen-containing atmosphere at a temperature of 300 to 800° C. to obtain particles of a titanium-based oxide composed of a calcined product of the particles of the composite oxide, (d) a step of pulverizing the particles of the titanium-based oxide obtained in the step (c) to give fine particles of a titanium-based oxide having an average particle diameter, as measured by a dynamic light scattering method, in the range of 15 to 60 nm and dispersing the fine particles of the titanium-based oxide in pure water or ultrapure water to obtain a water dispersion sol, (e) a step of subjecting the water dispersion obtained in the step (d) to a wet classification apparatus to separate and remove at least coarse particles larger than 100 nm in the particle diameter, as measured by a dynamic light scattering method, when needed, and (f) a step of mixing the water dispersion obtained in the step (d) or the step (e) with (i) at least one silicon compound selected from a silicon alkoxide and silicic acid and at least one metal compound selected from a peroxozirconate, an antimonate, a stannate and an aluminate, and then hydrolyzing the silicon compound and the metal compound to obtain a water dispersion sol containing metal oxide particles in which surfaces of the fine particles of the titanium-based oxide have been coated with a silica-based composite oxide.

That is to say, the differences between this preparation process-2 and the aforesaid preparation process-1 are only the operation conditions of the step (f). Therefore, only the step (f) is hereinafter described.

Steps (a) to (e)

The steps (a) to (e) are the same as those described in the preparation process-1.

Step (f)

To the dispersion obtained by separating and removing the coarse particles in the step (e) (namely, a water dispersion sol containing fine particles of the titanium-based oxide having an average particle diameter, as measured by a dynamic light scattering method, in the range of 15 to 60 nm), compounds as raw materials used for coating the fine particles of the titanium-based oxide on their surfaces with a silica-based composite oxide are added.

That is to say, when the surfaces of the fine particles of the titanium-based oxide are coated with a silica-based composite oxide, at least one silicon compound selected from a silicon alkoxide and silicic acid and at least one metal compound selected from a peroxozirconate, an antimonate, a stannate and an aluminate are added to the water dispersion sol. Subsequently, the silicon compound and the metal compound are hydrolyzed, whereby the surfaces of the fine particles of the titanium-based oxide are coated with a silica-based composite oxide containing silicon and at least one metal element selected from zirconium, antimony, tin and aluminum.

As previously described, the silicon alkoxide is preferably tetramethoxysliane or a hydrolysate thereof, or tetraethoxysilane or a hydrolysate thereof.

This process gives metal oxide particles wherein the surfaces of the fine particles of the titanium-based oxide are coated with a silica-based composite oxide.

In metal particles, the surfaces of the fine particles of the titanium-based oxide are preferably coated with the silica-based composite oxide in such a manner that when the weight of the fine particles of the titanium-based oxide is expressed as "C" and the weight of their coating layers is expressed as "S", the weight ratio (S/C) is 1/100 to 50/100, preferably 5/100 to 30/100, in terms of the respective metal oxides.

If the weight ratio is less than 1/100 in terms of the respective metal oxides, the photocatalytic activity occasionally cannot be sufficiently restrained, as previously described. If the weight ratio exceeds 50/100 in terms of the respective metal oxides, the coating layers is thick and a desired refractive index is occasionally not obtained. Therefore, such weight ratios are undesirable.

The coating weight depends upon the amount of the compounds as raw materials that are added to the water dispersion sol, and therefore the compounds as raw materials are preferably added to the water dispersion sol in appropriately selected amounts.

That is to say, the refractive index of the silica-based composite oxide containing silicon and metal elements of zirconium, antimony, tin and/or aluminum depends upon the contents of these metal elements, and therefore, metal compounds (as raw materials added), such as a peroxozirconate, an antimonate, a stannate and an aluminate, are desirably added in controlled amounts. Since the refractive index of the fine particles of the titanium-based oxide is high, specifically 2.2 to 2.7, it is extremely easy to form coating layers having a refractive index that is lower than the refractive index of the fine particles of the titanium-based oxide as described above by 0.2 or more.

By coating the fine particles of the titanium-based oxide on their surfaces with the silica-based composite oxide as above, light scattering on the surfaces of the particles is markedly restrained, and therefore the later-described turbidity of the water dispersion sol is controlled low.

The thickness of the coating layers is extremely small, and is 5 nm or less, particularly about 0.1 to 3 nm (although the detailed value is not measurable). Therefore, the refractive index of the metal oxide particles obtained as above is very close to the refractive index of the fine particles of the titanium-based oxide. The refractive index of the metal oxide particles is relatively high and is in the range of 2.0 to 2.5, preferably 2.1 to 2.4.

In the case where metal oxide particles having a refractive index of less than 2.0 are obtained, formation of a coating film (e.g., coating film for optical substrate) with a desired high refractive index is difficult, similarly to the case of the preparation process-1. Therefore, the thickness of the coating layers is required to be made smaller. In the case where metal oxide particles having a refractive index of more than 2.5 are obtained, restraint of light scattering on the surfaces of the particles is sometimes difficult. Therefore, the thickness of the coating layers is required to be made larger.

The water dispersion sol obtained as above also contains ionized substances that are added during the above preparation steps or produced as by-products, e.g., cationic substances, such as a potassium ion, a sodium ion, an ammonium ion, a tin ion and a titanium ion, and anionic substances, such as a chloride ion, a sulfuric acid ion, a nitric acid ion, a silicic acid ion, a stannic acid ion and a titanic acid ion. The ionized substances are desirably removed in advance, similarly to the case of the preparation process-1.

The water dispersion sol containing metal oxide particles, which is obtained in the preparation process-1 or the preparation process-2, contains 1 to 30% by weight, preferably 5 to 20% by weight, of the metal oxide particles, and have a turbidity of 0.1 to 10.0 cm$^{-1}$, preferably 0.2 to 8.0 cm$^{-1}$.

The content of the metal oxide particles in the water dispersion sol is substantially determined by the amount of the fine particles of the titanium-base oxide to be added, for making its dispersion, into pure water or ultrapure water, the fine particles of which are obtained by pulverizing the calcined particles of a titanium-based oxide. If the content thereof is less than 1% by weight, not only is reactivity to a surface treatment agent deteriorated, but the amount of a solvent used for solvent replacement is also large, and this is not economical. If the content thereof exceeds 30% by weight, viscosity increase or the like occurs, and stability of the water dispersion sol is deteriorated. Therefore, the content of the metal oxide particles is preferably adjusted properly so as to be in the above range.

On the other hand, the turbidity of the water dispersion sol is substantially determined by the light scattering ratio of the metal oxide particles and the content thereof. A water dispersion sol having a turbidity of less than 0.1 cm$^{-1}$ is difficult to obtain. If the turbidity exceeds 10.0 cm$^{-1}$, transparency of a coating film obtained from a coating composition prepared from the water dispersion sol is markedly lowered. Therefore, such a turbidity is undesirable.

In the case where the turbidity of the water dispersion sol exceeds 10.0 cm$^{-1}$ as above, the thickness of the coating layers is required to be increased a little in order to restrain light scattering on the surfaces of the metal oxide particles. This problem can be occasionally solved also by making the average particle diameter of the metal oxide particles smaller. Therefore in some cases, it is desirable that the average particle diameter of the fine particles of the titanium-based oxide obtained by pulverizing the particles of the titanium-based oxide is made smaller or coarse particles included in the fine particles of the titanium-based oxide are removed as much as possible in the subsequent wet classification step.

Thus, a water dispersion sol containing the metal oxide particles with a high refractive index for use in the present invention is obtained. The water dispersion sol has a turbidity of 0.1 to 10 cm$^{-1}$, and contains 1 to 30% by weight of metal oxide particles constituted with fine particles of a titanium-based oxide and a coating layer formed on a surface each of the fine particles of the titanium-based oxide with at least a silica-based oxide or a silica-based composite oxide. The fine particles of a titanium-based oxide have an average particle diameter, as measured by a dynamic light scattering method, in the range of 15 to 60 nm, and are obtained by calcining particles of a composite oxide containing titanium and tin and/or silicon and pulverizing thus calcined particles.

More particularly, the fine particles of the titanium-based oxide to constitute cores of the metal oxide particles are crystalline fine particles with a rutile-type crystal structure, and have a crystallite diameter, as determined by X-ray diffraction, in the range of 3 to 13 nm, a specific surface area in the range of 70 to 290 m$^2$/g and a refractive index in the range of 2.2 to 2.7; the coating layers to constitute shells of the fine particles have a refractive index that is lower than the refractive index of the fine particles of the titanium-based oxide as described above by 0.2 or more; and the metal oxide particles each having the above coating layer have a refractive index in the range of 2.0 to 2.5. Moreover, the spacing d$^1$ of the (310) crystal face, as determined by X-ray diffraction, of the fine particles of the titanium-based oxide is preferably in the range of 0.1440 to 0.1460 nm, and the spacing d$^2$ of the (301) crystal face, as determined by the same X-ray diffraction, of the fine particles of the titanium-based oxide is preferably in the range of 0.1355 to 0.1370 nm. Furthermore, the relative ratio (P$^1$/P$^2$) of a peak intensity P$^1$ of the (310) crystal face to a peak intensity P$^2$ of the (110) crystal face, as determined by X-ray diffraction of the fine particles of the titanium-based oxide, is preferably in the range of 6/100 to 20/100.

(2) Process for Preparing Organic Solvent Dispersion Sol

Next, description is made on the process for preparing an organic solvent dispersion sol containing the metal oxide particles with a high refractive index for use in the present invention.

Surface Treatment of Metal Oxide Particles

The water dispersion sol of metal oxide particles with a high refractive index obtained above is subjected to a solvent replacement apparatus, and the water contained in the water dispersion sol is replaced with an organic solvent to prepare an organic solvent dispersion sol of metal oxide particles with a high refractive index.

The metal oxide particles with a high refractive index contained in the water dispersion sol are hydrophilic fine particles, and are desirably changed to hydrophobic fine particles in advance. For that purpose, the surfaces of the fine particles are preferably treated with a surface treatment agent by a hitherto publicly known method.

The surface treatment agent is not specifically restricted, and an organosilicon compound, an amine-based compound and the like may be used.

As the organosilicon compound, a hitherto publicly known silane coupling agent having a hydrolyzable group may be used, and the type thereof is properly selected according to the use purpose, the type of the solvent, and the like. Such silane coupling agents may be used singly or in combination of two or more kinds. Specific examples of the organosilicon compounds include the following compounds (a) to (d).

(a) Monofunctional Silane Represented by the Formula R$_3$SiX

In the above formula, R is an organic group having an alkyl group, a phenyl group, a vinyl group, a methacryloxy group, a mercapto group, an amino group or an epoxy group, and X is a hydrolyzable group, such as an alkoxy group or a chloro group.

Typical examples of the above compounds include trimethylethoxysilane, dimethylphenylethoxysilane and dimethylvinylethoxysilane.

(b) Bifunctional Silane Represented by the Formula R$_2$SiX$_2$

In the above formula, R and X are the same as above.

Typical examples of the above compounds include dimethyldiethoxysilane and diphenyldiethoxysilane.

(c) Trifunctional Silane Represented by the Formula RSiX$_3$

In the above formula, R and X are the same as above.

Typical examples of the above compounds include methyltriethoxysilane and phenyltriethoxysilane.

(d) Tetrafunctional Silane Represented by the Formula SiX$_4$

In the above formula, X is the same as above.

Typical examples of the above compounds include tetraalkoxysilanes, such as tetramethoxysilane and tetraethoxysilane.

Examples of the amine-based compounds include ammonia, alkylamines, such as ethylamine, triethylamine, isopropylamine and n-propylamine, aralkylamines, such as benzylamine, alicyclic amines, such as piperidine, alkanolamines, such as monoethanolamine and triethanolamine, and quaternary ammonium salts and quaternary ammonium hydroxides, such as tetramethylammonium salt and tetramethylammonium hydroxide.

The surface treatment of the metal oxide particles with a high refractive index is not specifically restricted, but for example, when the organosilicon compound is used as the surface treatment agent, the surface treatment is carried out by adding a solution of the organosilicon compound or partial hydrolyzate thereof dissolved in an organic solvent such as methanol to the water dispersion sol, then heating the mixture to a temperature of about 40 to 60° C. and stirring the mixture for about 1 to 20 hours to hydrolyze the organosilicon compound or partial hydrolyzate thereof.

In the stage where this surface treatment operation has been completed, all of the hydrolyzable groups of the organosilicon compound are preferable to have reacted with the OH groups present on the surfaces of the coating layers of the metal oxide particles with a high refractive index, but a part of the hydrolyzable groups may remain unreacted.

Solvent Replacement of Water Dispersion Sol

The water dispersion sol containing the metal oxide particles with a high refractive index surface treated as above is subjected to a solvent replacement apparatus, and the water contained in the water dispersion sol is replaced with an organic solvent.

As the solvent replacement apparatus, a hitherto publicly known solvent replacement apparatus, such as an ultrafiltration apparatus or a rotary evaporator, may be used. The operation conditions of the solvent replacement apparatus vary depending upon the types of the solvent replacement apparatus and the organic solvent used, and the like. For example, when the solvent replacement is carried out by use of an ultrafiltration apparatus (SIP-1013 manufactured by Asahi Kasei Corporation), the water dispersion sol (solid content: 1 to 30% by weight) and an organic solvent (e.g., methanol) to be replacement for the water contained in the sol are preferably subjected to the apparatus equipped with an ultrafiltration membrane and the solvent replacement is preferably carried out under the general conditions (e.g., pump discharge pressure: 10 to 20 MPa, water content after solvent replacement: 0.1 to 5% by weight).

In this case, when the concentration of the metal oxide particles with a high refractive index contained in the water dispersion sol is much lower than the solid content of the desired organic solvent dispersion sol, the water dispersion sol is preferably concentrated using an ultrafiltration apparatus or the like to raise the solid content of the water dispersion sol, and then preferably subjected to the solvent replacement apparatus.

The organic solvent used varies depending upon the use purpose, but employable solvents include an organic compound selected from alcohols, such as methanol, ethanol, butanol, propanol and isopropyl alcohol, ethers, such as ethylene glycol monomethyl ether, propylene glycol monomethyl ether and propylene glycol monoethyl ether, and ketones, such as methyl ethyl ketone and γ-butyrolactone. When the organic solvent dispersion sol is used for the preparation of a coating composition for an optical substrate, preferably used is at least one organic compound selected from alcohols such as methanol and ethers such as propylene glycol monomethyl ether, among them. The reason is that the drying rate of a coating film is relatively high and film formation is easily carried out.

Adjustment of Organic Solvent Dispersion Sol

The solid content of the organic solvent dispersion sol obtained as above, namely, the content of the metal oxide particles with a high refractive index, varies depending upon the purpose for use of the organic solvent dispersion sol, the type of the organic solvent, and the like. For example, when the organic solvent dispersion sol is used for an optical substrate, the content of the metal oxide particles with a high refractive index is preferably adjusted so as to be within the range of 10 to 40% by weight, preferably 20 to 30% by weight, based on the total amount of the dispersion sol.

If the content of the metal oxide particles with a high refractive index is less than 10% by weight, the solid content in a coating liquid for an optical substrate using this dispersion sol as a raw material is low, and hence, coating films are difficult to be economically formed with a desired film thickness and a desired film hardness. If the content thereof exceeds 40% by weight, the stability of the organic solvent dispersion sol is deteriorated. Therefore, such a content is undesirable.

Thus, the organic solvent dispersion sol containing the metal oxide particles with a high refractive index for use in the present invention is obtained.

(3) Process for Preparing Coating Composition

Next, description is made on the process for preparing the coating composition of the present invention, particularly a coating composition used for an optical substrate. However, the coating composition of the present invention may be used for other purposes, and the purpose for use of the coating composition of the present invention is not limited to the above purpose. That is to say, when used for a purpose other than the optical substrate, the coating composition may further contain a raw material component necessary for that purpose.

Coating Composition-1

The coating composition-1 of the present invention is prepared by mixing the organic solvent dispersion sol of metal oxide particles with a high refractive index obtained above, with an organosilicon compound.

The organosilicon compound is preferably an organosilicon compound represented by the following formula and/or hydrolyzate thereof, as previously described.

$$R^1_a R^2_b Si(OR^3)_{4-(a+b)} \quad (I)$$

In the above formula, $R^1$ is an alkyl group of 1 to 6 carbon atoms, an organic group having 8 or less carbon atoms and containing a vinyl group, an organic group having 8 or less carbon atoms and containing an epoxy group, an organic group having 8 or less carbon atoms and containing a methacryloxy group, an organic group having 1 to 5 carbon atoms and containing a mercapto group or an organic group having 1 to 5 carbon atoms and containing an amino group, $R^2$ is an alkyl group of 1 to 3 carbon atoms, an alkylene group, a cycloalkyl group or a halogenated alkyl or allyl group, $R^3$ is an alkyl group of 1 to 3 carbon atoms, alkylene group or a cycloalkyl group, a is an integer of 0 or 1, and b is an integer of 0, 1 or 2.

Specific examples of the organosilicon compounds are as previously described.

In the preparation of the coating composition-1, the organosilicon compound is preferably mixed with the organic solvent dispersion sol after the organosilicon compound is partially hydrolyzed or hydrolyzed without a solvent or in a polar organic solvent such as an alcohol in the presence of an acid and water. However, the organosilicon compound may be partially hydrolyzed or hydrolyzed after mixed with the organic solvent dispersion sol.

The partial hydrolysis or the hydrolysis of the organosilicon compound is preferably carried out at a temperature of 5 to 30° C. over a period of 1 to 48 hours while stirring. After the hydrolysis is carried out, aging may be carried out by allowing the resulting mixture to stand still under the low-temperature conditions of −10 to 1° C.

The coating composition-1 is prepared by mixing the organosilicon compound with the organic solvent dispersion sol, as described above, and this mixing is preferably carried out in such a manner that when the weight of a silicon constituent in terms of $SiO_2$ is expressed as "X" and the weight of the metal oxide particles with a high refractive index is expressed as "Y", the weight ratio (X/Y) is 30/70 to 90/10, preferably 35/65 to 80/20. If the weight ratio is less than 30/70, adhesion to a substrate or another coating film is sometimes deteriorated, as previously described. If the weight ratio exceeds 90/10, refractive index of the coating film and scratch resistance of a surface of the coating film are sometimes lowered. Therefore, such weight ratios are undesirable.

The coating composition-1 prepared as above is favorably used as a coating composition for an optical substrate. A typical example of the coating composition for an optical substrate is a coating composition for forming a film of a hard coat layer.

When the coating composition-1 is prepared as a coating composition for an optical substrate, alcohols, such as methanol and ethanol, and ethers, such as propylene glycol monomethyl ether, are preferably used as dispersion media in the organic solvent dispersion sol. As for the dispersion media of the organosilicon compound, those having good compatibility with the dispersion medium in the organic solvent dispersion sol can be used without any restriction. However, it is preferable to use the same dispersion medium of the organosilicon compound as the dispersion medium in the organic solvent dispersion sol whenever possible.

In order to enhance dyeing properties of the coating film such as a film of a hard coat layer and adhesion to a plastic lens substrate or the like and moreover in order to prevent occurrence of cracks, the coating composition-1 may contain a non-crosslinked epoxy compound, and the like in addition to the above components.

The coating composition-1 may further contain components other than the above components, such as a surface active agent, a leveling agent and/or an ultraviolet light absorber, and hitherto publicly known organic compounds and inorganic compounds suitable for the use purpose of the composition.

Coating Composition-2

The coating composition-2 is prepared by mixing the organic solvent dispersion sol of metal oxide particles with a high refractive index obtained above with a thermosetting resin or a thermoplastic resin.

Examples of the thermosetting resins used herein include a urethane-base resin, an epoxy-based resin, a melamine-based resin and a silicone-based resin. Of these, a urethane-based resin, an epoxy-based resin or the like is preferably used.

Examples of the thermoplastic resins include an acrylic-based resin, a urethane-based resin and an ester-based resin. Of these, a urethane-based resin, an ester-based resin or the like is preferably used.

Specific examples of the thermosetting resins and the thermoplastic resins are as previously described.

In the preparation of the coating composition-2, the organic solvent dispersion sol is preferably mixed with a dispersion in which the thermosetting resin is dissolved in an organic solvent or a dispersion in which the thermoplastic resin is dissolved or dispersed in an organic solvent or water. As the dispersion media of the thermosetting resin or the thermoplastic resin, those having good compatibility with the dispersion medium in the organic solvent dispersion sol can be used without any restriction. However, it is preferable to use the same dispersion medium of the thermosetting resin or the thermoplastic resin as the dispersion medium in the organic solvent dispersion sol whenever possible. The thermosetting resin or the thermoplastic resin may be directly mixed with the organic solvent dispersion sol without dissolving or dispersing the resin in the dispersion medium such as an organic solvent or water.

The coating composition-2 is prepared by mixing the resin compound with the organic solvent dispersion sol, as described above. The mixing manner varies depending upon the type of the resin compound, the use purpose thereof, and the like. However, this mixing is preferably carried out in such a manner that when the weight of the resin compound is expressed as "A" and the weight of the metal oxide particles with a high refractive index is expressed as "B", the weight ratio (A/B) is 90/10 to 30/70, preferably 80/20 to 35/65. If the weight ratio is less than 30/70, adhesion to a substrate or another coating film and impact resistance of a substrate are sometimes lowered, and if the weight ratio exceeds 90/10, refractive index or heat resistance of the coating film is sometimes lowered. Therefore, such weight ratios are undesirable.

The coating composition-2 prepared as above is favorably used as a coating composition for an optical substrate, similarly to the case of the coating composition-1. A typical example of the coating composition for an optical substrate is a coating composition for forming a film of a primer layer.

The coating composition-2 may further contain components other than the above components, such as a neutralizing agent, a surface active agent and an ultraviolet light absorber, and hitherto publicly known organic compounds and inorganic compounds suitable for the use purpose of the composition.

Coating Film

The coating composition of the present invention can be applied to various uses, such as high-dielectric materials, optical materials, hard coat materials with a high refractive index, adhesive materials with a high refractive index, sealing materials with a high refractive index, high-reflecting materials and ultraviolet absorbing materials. As a typical example of the use application, a curable coating film obtained by applying the coating composition onto an optical substrate, i.e., coating film for an optical substrate, is described here.

Coating Film for Optical Substrate

Optical substrates to be coated with the coating composition include various plastic substrates. Plastic substrates for optical lenses include plastic lens substrates composed of polystyrene resin, allyl resin (particularly, aromatic allyl resin), polycarbonate resin, polythiourethane resin, polythioepoxy resin or the like. Plastic substrates for other purposes than the optical lenses include plastic substrates composed of PMMA resin, ABS resin, epoxy resin, polysulfone resin or the like.

Recently, optical substrates (plastic lens substrates, and the like) with a relatively high refractive index of 1.7 or more, more particularly 1.71 to 1.81, have been developed, and at present, some of them have been put on the market or test supplied. The coating composition can be applied to these optical substrates with a high refractive index without any problem, and optical substrates to be coated with the coating composition are properly selected from these optical substrates and used.

Besides, the coating composition can be readily applied to optical substrates having a relatively low refractive index of 1.50 to 1.70, more particularly 1.52 to 1.67 by lowering the concentration of the metal oxide particles with a high refractive index contained in the coating composition.

Of the above coating compositions, a coating composition for an optical substrate (i.e., a coating composition for forming a film of a primer layer) selected from the coating compositions-2 is directly applied onto the optical substrate by a hitherto publicly known method. On the other hand, a coating composition for an optical substrate (i.e., a coating composition for forming a film of a hard coat layer) selected from the coating compositions-1 is directly applied onto the optical substrate by a hitherto publicly known method or applied onto a coating film (i.e., a film of a primer layer) formed by applying the above-mentioned coating composition for an optical substrate.

The coating film formed on the optical substrate in the above manner is cured by a hitherto publicly known method to give a desired coating film for an optical substrate, namely, a film of a hard coat layer or a film of a primer layer.

Thus, a coating film for an optical substrate (e.g., a film of a hard coat layer) that has been eagerly desired from the recent plastic lens industry and the like is obtained, which coating film has a high refractive index of 1.70 or more (particularly 1.71 to 1.81), and is excellent in weathering resistance and light resistance. This coating film is obtained with transparent colorless as a film having a low haze of not more than 0.5%.

Moreover, the coating film is excellent also in properties of scratch resistance, abrasion resistance, impact resistance, perspiration resistance, hot water resistance, adhesion properties, dyeing properties, fade resistance, and the like, which are required for a coating film for an optical substrate. However, if the film of a hard coat layer is directly formed on a plastic lens substrate composed of a polythioepoxy resin, discoloration of the substrate attributable to physical properties of the substrate or deterioration of adhesion between the substrate and the film of a hard coat layer sometimes occurs. Therefore in such cases, the film of a primer layer on the substrate is desirably formed in advance. This phenomenon likewise occurs also in the case of using a hitherto publicly known coating composition for forming a film of a hard coat layer.

Measuring Methods

Next, a detailed description is made on measuring methods and evaluation test methods used in the examples of the present invention and the like.

(1) Average Particle Diameter "A" of Particles (i.e., Particles Larger than 30 μm in Average Particle Diameter)

1.0 g of particles of a composite oxide (i.e., particles of a titanium-based oxide) composed of a spray-dried product having relatively large particle diameters (having particle diameters of 5 μm or more) are put in a sieving particle size distribution measuring device (RPS-85EX manufactured by Seishin Enterprise Co., Ltd.) equipped with Micromesh Sieve (20, 30, 45, 60, 75, 90, 105, 150 μm), and an average particle diameter is measured.

This measuring method is suitable for measuring an average particle diameter of a particle group having particle diameters in the range of 20 to 150 μm.

(2) Average Particle Diameter "B" of Particles (i.e., Particles Having Average Particle Diameter of 0.2 to 30 μm)

Particles of a composite oxide (i.e., particles of a titanium-based oxide) composed of a spray-dried product having relatively small particle diameters (having particle diameters of 0.2 to 5 μm) are dispersed in a glycerol-containing aqueous solution of 40% by weight to prepare a slurry (solid content: 1.0% by weight). The slurry is irradiated with ultrasonic waves for 5 minutes by use of an ultrasonic wave generation apparatus (US-2 type manufactured by iuchi Co.) to well disperse the particles of the composite oxide. Subsequently, the dispersion is placed in a glass cell (size of length of 10 mm, width of 10 mm and height of 45 cm), and an average particle diameter is measured by use of a centrifugal sedimentation type particle size distribution measuring device (CAPA-700 manufactured by HORIBA, Ltd.) at a rotation speed of 300 to 10,000 rpm over a period of 2 minutes to 2 hours. This measuring method is suitable for measuring an average particle diameter of a particle group having particle diameters of 0.2 to 30 μm.

(3) Average Particle Diameter "C" of Particles (i.e., Particles Smaller than 200 μm in Average Particle Diameter)

0.15 g of a water dispersion sol (solid content: 20% by weight) of fine particles of a titanium-based oxide or metal oxide particles having particle diameters of nano size is mixed with 19.85 g of pure water to prepare a sample having a solid content of 0.15% by weight. The sample is placed in a quartz cell having a length of 1 cm, a width of 1 cm and a height of 5 cm, and a particle diameter distribution of a particle group is measured by use of an ultrafine particle size analytical device (model ELS-Z2 manufactured by Otsuka Electronics Co., Ltd.) using a dynamic light scattering method. The "average particle diameter" referred to in the present invention means a value obtained by subjecting the measurement results to cumulant analysis and performing calculation. However, the average particle diameter of particles obtained by the particle diameter distribution of the fine particles measured by the dynamic light scattering method using the ultrafine particle size analytical device has proved to show a value of about 3 times the average particle diameter of particles obtained by TEM photograph of the fine particles taken by a transmission electron microscope. Therefore, the average particle diameter of the fine particles defined in the present invention is different from an average particle diameter obtained by other measuring methods. This measuring method is suitable for measuring an average particle diameter of a particle group having particle diameters of 3 to 1000 nm.

(4) Particle Diameter Distribution Frequency of Particles

The particle diameter distribution frequency is determined from frequency distribution of scattering intensity obtained by the particle diameter distribution measurement using the dynamic light scattering method used in the above (3). The "distribution frequency of particles having particle diameters of 100 nm or more", which is referred to in the present invention, means a value obtained by subtracting the total value of the distribution frequency (%) of a particle group having particle diameters of not more than 94.9 nm from 100.

(5) Specific Surface Area of Particles

About 30 ml of a dried particles of a composite oxide (i.e., particles of a titanium-based oxide) or fine particles of a titanium-based oxide is placed in a porcelain crucible (B-2 type), dried at a temperature of 300° C. for 2 hours, then placed in a desiccator and cooled down to room temperature. Next, 1 g of the sample is taken out, and the specific surface area ($m^2/g$) is measured by a BET method using a fully automatic surface area measuring device (Multisorb 12 type manufactured by Yuasa Ionics Inc.). The "specific surface area" referred to in the present invention means a value calculated from this measurement result.

(6) Crystal Form of Particles

About 30 ml of a water dispersion sol of particles of a composite oxide (i.e., particles of a titanium-based oxide) or fine particles of a titanium-based oxide is placed in a porcelain crucible (B-2 type), dried at a temperature of 110° C. for 12 hours, then placed in a desiccator and cooled down to room temperature. Next, the sample is ground by a mortar for 15 minutes, and a crystal form is measured by use of an X-ray diffraction apparatus (RINT1400 manufactured by Rigaku Corporation). The "crystal form" referred to in the present invention means a form (e.g., rutile-type) judged from this measurement result.

(7) Crystallite Diameter, as Determined by X-Ray Diffraction, of Particles

The crystallite diameter, as determined by X-ray diffraction, is determined from the results obtained by measuring crystal structure of the calcined particles of the composite oxide (i.e., particles of a titanium-based oxide) or the fine particles of the titanium-based oxide using an X-ray diffraction apparatus used in the above (6). The "crystallite diameter (D), as determined by X-ray diffraction", referred to in the present invention means a value calculated by use of the following Sheller's formula:

$$D=\lambda/\beta \cos \theta$$

wherein $\lambda$ is an X-ray wavelength, $\beta$ is a half band width, and $\theta$ is an angle of reflection. The wavelength $\lambda$ of X rays ($CuK_\alpha$ rays) used in this measurement is 0.154056 nm. The angle $\theta$ of reflection is calculated using $2\theta$ of the rutile-type crystal face (110) measured.

(8) Crystal Face Spacing by X-Ray Diffraction

The crystal face spacing is determined from the results obtained by measuring crystal structure of the calcined particles of the composite oxide (i.e., particles of the titanium-based oxide) or the fine particles of the titanium-based oxide using an X-ray diffraction apparatus used in the above (6). The "crystal face spacing (d)" referred to in the present invention means a value obtained by measuring the crystal faces of (310) and (301) and performing calculation by use of the following Brrag's formula:

$$d=\lambda/2 \sin \theta$$

wherein $\lambda$ is an X-ray wavelength, and $\theta$ is an angle of reflection. The wavelength $\lambda$ of X rays ($CuK_\alpha$ rays) used in this measurement is 0.154056 nm.

(9) Relative Peak Intensity by X-Ray Diffraction

The relative peak intensity is determined from the results obtained by measuring the calcined particles of the composite oxide (i.e., particles of the titanium-based oxide) or the fine particles of the titanium-based oxide using an X-ray diffraction apparatus used in the above (6). The "relative peak intensity" referred to in the present invention means a relative intensity ratio ($P^1/P^2$) obtained when a peak intensity $P^2$ of the (110) crystal face indicating a most intense interference line of the rutile-type crystal and a peak intensity $P^1$ of the (310) crystal face are measured and the former peak intensity ($P^2$) is taken to be 100.

(10) Turbidity of Water Dispersion Sol

The turbidity is determined from the results obtained by measuring an absorbance ($\log(I_0/I)$) of a water dispersion sol containing metal oxide particles at a wavelength of 500 nm using a spectrophotometer (V-550 manufactured by JEOL Ltd.). In this case, water is used as a contrast liquid. The "turbidity ($\tau$)" referred to in the present invention means a value calculated by use of the following formula of Lambert's law:

$$\tau(cm^{-1})=(1/W)\times\ln(I_0/I)=(1/W)\times 2.303\times\log(I_0/I)$$

wherein W is a width (cm) of a cell, $I_0$ is an intensity (%) of incident light, and I is an intensity (%) of transmitted light.

(11) Content of Metal Oxide in Particles

A water dispersion sol (sample) containing metal oxide particles is placed in a zirconia bowl, then dried and calcined. Thereafter, $Na_2O_2$ and NaOH are added, and the mixture is melted. The molten mixture is dissolved in $H_2SO_4$ and HCl and diluted with pure water. Thereafter, the contents of titanium, tin, aluminum, antimony and/or silica in terms of the respective metal oxides (i.e., $TiO_2$, $SnO_2$, $Al_2O_3$, $Sb_2O_5$ and/or $SiO_2$) are measured by use of an ICP apparatus (ICPS-8100 manufactured by Shimadzu Corporation).

Subsequently, the sample is placed in a platinum dish, then HF and $H_2SO_4$ are added, and the mixture is heated and dissolved in HCl. The resulting solution is diluted with pure water, and then the content of zirconium in terms of the metal oxides ($ZrO_2$) is measured by use of an ICP apparatus (ICPS-8100 manufactured by Shimadzu Corporation).

Next, the sample is placed in a platinum dish, then HF and $H_2SO_4$ are added, and the mixture is heated and dissolved in HCl. The resulting solution is diluted with pure water, and then the content of potassium in terms of the metal oxides ($K_2O$) is measured by use of an atomic absorption apparatus (Z-5300 manufactured by Hitachi, Ltd.).

The "content of respective metal oxide" referred to in the present invention means a value calculated from the result of the above measurement.

(12) Refractive Index "A" of Particles (as Calculated from Refractive Index of Coating Film)

14.1 g of γ-glycidoxypropyltrimethoxysilane (Z-6040 available from Dow Corning Toray Co., Ltd., 49.2% by weight of a silicon constituent in terms of $SiO_2$) is mixed with 7.1 g of methanol (available from Hayashi Pure Chemical Ind., Ltd.) containing 99.9% by weight of methyl alcohol, and to the mixture, 3.6 g of a 0.01N aqueous solution of hydrochloric acid is dropwise added while stirring to obtain a mixed solution containing a hydrolyzate of a silane compound. To the mixed solution, 38.6 g of a water dispersion sol (solid content: 2.0% by weight) containing the fine particles of the titanium-based oxide, 0.3 g of tris(2,4-pentanedionato)aluminum (III) (available from Tokyo Chemical Industry Co., Ltd.) and 0.07 g of a methanol solution containing 10% by weight of a silicone-based surface active agent (L-7006 available from Dow Corning Toray Co., Ltd.) as a leveling agent are added, and the mixture are stirred at room temperature for one day and night to prepare a coating composition A (weight fraction of particles: 10% by weight). The "weight fraction of particles" referred to herein means a weight fraction of the fine particles of the titanium-based oxide or the metal oxide particles based on the whole solid matters contained in the coating composition, and the same shall hereinafter apply.

Moreover, a coating composition B (weight fraction of particles: 20% by weight), a coating composition C (weight fraction of particles: 30% by weight), a coating composition D (weight fraction of particles: 40% by weight), a coating composition E (weight fraction of particles: 50% by weight) and a coating composition F (weight fraction of particles: 55% by weight) are prepared in the same manner as above, except that the amount of the water dispersion sol mixed is changed to 77.1 g, 115.6 g, 154.1 g, 192.7 g and 212.0 g, respectively.

Also with regard to the water dispersion sol (solid content: 20.0% by weight) containing the metal oxide particles, a coating composition A (weight fraction of particles: 10% by weight), a coating composition B (weight fraction of particles: 20% by weight), a coating composition C (weight fraction of particles: 30% by weight), a coating composition D (weight fraction of particles: 40% by weight), a coating composition E (weight fraction of particles: 50% by weight) and a coating composition F (weight fraction of particles: 55% by weight) are prepared in the same manner as above, except that the amount of the water dispersion sol mixed is changed to 3.9 g, 7.7 g, 11.6 g, 15.4 g, 19.2 g and 21.2 g, respectively.

Subsequently, the coating compositions A to F are each applied to a silicon wafer substrate kept at a temperature of 40° C. using a spin coater (MS-A200 manufactured by Mikasa Co., Ltd.) at a rotation speed of 300 rpm, and then dried at a temperature of 120° C. for 2 hours to form coating films. Next, the refractive index "NaV"' (found value) of the coating film formed on each silicon wafer substrate is measured by use of a spectroscopic ellipsometer (SOPRA ESVG manufactured by Sopra Inc.).

Next, using the following conversion formula between a fraction by volume and a fraction by weight (see Mathematical formula 1) and Maxwell-Garnett formula (see Mathematical formula 2), the theoretical refractive index "Nav" (calculated value) of the coating film is calculated for the above-mentioned each particle weight fraction.

Subsequently, the deviation between the refractive index "Nav" of the coating film calculated based on these formulas and the refractive index "Nav'" of the coating film measured above is determined, then from this, the square of deviation is calculated, and from the calculated square of deviation, a sum of square of deviation is determined. The sum of square of deviation is determined every particle refractive index "Np" supposed (e.g., plural particle refractive indexes supposed at intervals of at least 0.01 in the range of 1.70 to 2.70), and the refractive index showing the minimum value is taken as a refractive index "Np'" of the above particles. That is to say, this method is a measuring method of particle refractive index according to the least squares method. (In this case, the above values are preferably plotted in a graph with the supposed particle refractive index as abscissa and the sum of square of deviation as ordinate.)

$$f(m) = \frac{\frac{m}{100dp}}{\frac{1-\frac{m}{100}}{dm} + \frac{m}{100dp}}$$ [Mathematical formula 1]

In Mathematical formula 1, "f(m)" means a fraction by volume of particles based on the whole solid matters, "m" means a fraction by weight of particles based on the whole solid matters, "dm" means a specific gravity of a matrix component (1.07 that is a specific gravity of γ-glycidoxypropyltrimethoxysilane), and "dp" means a specific gravity of the fine particles of the titanium-based oxide or the metal oxide particles. The "dp" is a specific gravity determined by calculation from the contents of metal components of the fine particles of the titanium-based oxide or the metal oxide particles, and the specific gravities of $TiO_2$, $SiO_2$, $SnO_2$ and $Al_2O_3$ contained in these particles are taken to be 4.26, 2.20, 7.00 and 3.97, respectively.

$$Nav = \sqrt{Nm^2\left(1 + \frac{3 \cdot f(m) \cdot \left(\frac{Np^2 - Nm^2}{Np^2 + 2 \cdot Nm^2}\right)}{1 - f(m) \cdot \left(\frac{Np^2 - Nm^3}{Np^2 + 2 \cdot Nm^2}\right)}\right)}$$ [Mathematical formula 2]

In Mathematical formula 2, "Nav" means a refractive index of a coating film, "Nm" means a refractive index of a matrix component (1.499 that is a refractive index of a hydrolyzate of γ-glycidoxypropyltrimethoxysilane), and "Np" means a refractive index of the fine particles of the titanium-based oxide or the metal oxide particles.

In this measuring method, a refractive index of a particle group having a refractive index of 1.70 to 2.70 can be measured, and this method is suitable particularly for measuring a refractive index of a particle group having a refractive index exceeding 2.31 that cannot be measured by the following standard liquid method. The refractive index of particles determined by this measuring method almost agrees with a refractive index (in the range of 1.70 to 2.31) of particles measured by the standard liquid method.

(13) Refractive Index "B" of Particles (Standard Liquid Method)

A water dispersion sol or an organic solvent dispersion sol containing fine particles of the titanium-based oxide or metal oxide particles is subjected to an evaporator to evaporate the dispersion medium, and then the residue is dried at a temperature of 120° C. to give dried particles. Subsequently, 2 or 3 drops of a standard liquid reagent having a known refractive index are allowed to fall on a glass substrate and mixed with the dried fine particles of the titanium-based oxide or the metal oxide particles to prepare a mixed liquid. This operation is carried out using standard liquid reagents (Cargille standard refractive index liquids available from MORITEX Corporation) having various refractive indexes, and the refractive index of the standard liquid reagent where the mixed liquid becomes transparent is taken as a refractive index of the particles.

This measuring method can measure a refractive index of a particle group having a refractive index of 1.70 to 2.31. However, the standard liquid reagents that are on the market at present can be applied only to particles having a refractive index of not more than 2.31, and therefore, the refractive index of particles having a refractive index of more than 2.31 cannot be measured by this method. Then, the aforesaid measuring method A is adopted in the present invention, but for reference, measurement of a refractive index of particles having a refractive index in the range of 1.70 to 2.31 is carried out using the measuring method B.

(14) Photocatalytic Activity Test of Particles 0.33 g of a sample having a solid content of 6.6% by weight, which has been prepared by mixing 0.66 g of a water dispersion sol (solid content: 20% by weight) containing metal oxide particles with 9.34 g of pure water, is mixed with 9.70 g of a glycerol solution of Sunset Yellow dye having a solid content of 0.02% by weight. Subsequently, the resulting mixture is placed in a quartz cell having a length of 1 mm, a width of 1 cm and a height of 5 cm, followed by sealing the cell. Next, using an ultraviolet lamp (SLUV-6 manufactured by AS ONE Co.) in which the wavelength region of I-spectral line (wavelength: 365 nm) has been selected, the quartz cell is irradiated with ultraviolet rays under the conditions of an irradiation distance of 5.5 cm and an irradiation intensity of 0.4 mW/cm² (in terms of wavelength of 365 nm) for 180 minutes.

On the other hand, the respective absorbance ($A_0$) of the sample at a wavelength of 490 nm before and after the irradiation with ultraviolet rays are measured, and the fade change ratio of the dye is calculated from the following formula. Furthermore, the photocatalytic activity of particles is evaluated by the following criteria.

Fade change ratio (%)=$(1-A_{180}/A_0) \times 100$

Evaluation Criteria
AA: The fade change ratio is less than 20%.
BB: The fade change ratio is 20% or more but less than 50%.
CC: The fade change ratio is 50% or more.

(15) Light Resistance Test of Particles 18.00 g of a sample having a solid content of 1.0% by weight, which has been prepared by mixing 0.90 g of a water dispersion sol (solid content: 20% by weight) containing metal oxide particles with 4.50 g of pure water and 12.6 g of methanol, is placed in a quartz cell having a length of 1 mm, a width of 1 cm and a height of 5 cm, followed by sealing the cell. Next, using an ultraviolet lamp (SLUV-6 manufactured by AS ONE Co.) in which the wavelength region of I-spectral line (wavelength: 365 nm) has been selected, the quartz cell is irradiated with ultraviolet rays under the conditions of an irradiation distance of 5.5 cm and an irradiation intensity of 0.4 mW/cm$^2$ (in terms of wavelength of 365 nm) for 60 minutes. Then, the coloration (color change) of the mixed liquid having been exposed to ultraviolet rays is visually observed, followed by evaluation by the following criteria.

Evaluation Criteria
AA: Coloration (Color change) to blue begins in not shorter than 1 hour.
BB: Coloration (Color change) to blue begins in not shorter than 0.5 hour but shorter than 1 hour.
CC: Coloration (Color change) to blue begins in shorter than 0.5 hour.

(16) Appearance of Coating Film (Interference Fringes)

In a box having a black inner wall, a fluorescent lamp "Mellow 5N" (trade name, available from Toshiba Lighting & Technology Corporation, three band-type neutral white fluorescent lamp) is installed. The light of fluorescent lamp is reflected on a surface of an antireflection film formed on a film of a hard coat layer (containing the metal oxide particles) of a substrate as a sample, and occurrence of rainbow pattern (interference fringes) due to interference of light is visually observed, followed by evaluation by the following criteria.
S: Interference fringes are hardly observed.
A: Interference fringes are not conspicuous.
B: Interference fringes are observed but allowable.
C: Interference fringes are conspicuous.
D: Glare interference fringes are observed.

(17) Appearance of Coating Film (Haze)

In a box having a black inner wall, a fluorescent lamp "Mellow 5N" (trade name, available from Toshiba Lighting & Technology Corporation, three band-type neutral white fluorescent lamp) is installed. Then a substrate as a sample having a film of a hard coat layer containing the metal oxide particles is put vertically just below the fluorescent lamp, and the transparency (degree of haze) of the substrate as a sample is visually observed, followed by evaluation by the following criteria.
A: Haze is not observed.
B: Haze is slightly observed.
C: Haze is clearly observed.
D: Marked haze is observed.

(18) Scratch Resistance Test of Coating Film

The surface of a substrate as a sample having a film of a hard coated layer is hand rubbed with Bonstar Steel Wool #0000 (available from Nihon Steel Wool Co., Ltd.), and the degree of scratch is visually observed, followed by evaluation by the following criteria.
A: The surface is hardly scratched.
B: The surface is slightly scratched.
C: The surface is considerably scratched.
D: Almost all the surface of the rubbed area is scratched.

(19) Adhesion Test of Coating Film

The surface of a lens of a substrate as a sample having a film of a hard coat layer is cut with a knife at intervals of 1 mm to form 100 squares of 1 mm$^2$, then a Cellophane adhesive tape is strongly pressed against the squares. Thereafter, the adhesive tape is rapidly pulled in the direction of 90° to the in-plane direction of the plastic lens substrate. This operation is carried out 5 times in all, and the number of squares remaining is counted, followed by evaluation by the following criteria.
Good: The number of squares remaining is 95 or more.
Bad: The number of squares remaining is less than 95.

(20) Weathering Resistance Test of Coating Film

A substrate as a sample having a film of a hard coat layer is subjected to exposure test using a Xenon weatherometer (X-75 type manufactured by Suga Test Instrument Co., Ltd.), and observation of appearance and the same adhesion test as above are carried out, followed by evaluation by the following criteria. In the case of the substrate having an antireflection film, the exposure time is 200 hours, and in the case of the substrate having no antireflection film, the exposure time is 50 hours.
Good: The number of squares remaining is 95 or more.
Bad: The number of squares remaining is less than 95.

(21) Light Resistance Test of Coating Film

Irradiation with ultraviolet rays using a mercury lamp for fade test (H400-E available from Toshiba Corporation) is carried out for 50 hours. The color of the lens is visually observed before and after the test, followed by evaluation by the following criteria. The irradiation distance between the lamp and the specimen is 70 mm, and the output of the lamp is adjusted so that the surface temperature of the specimen is 45±5° C. This test is carried out using, as a test object, a plastic lens having an antireflection film formed on the surface of a hard coat layer.
AA: Coloration (color change) is hardly observed.
BB: A little coloration (color change) is observed.
CC: Obvious coloration (color change) is observed.

EXAMPLES

The present invention is further described with reference to the following examples, but it should be construed that the present invention is in no way limited to those examples.

Preparation Example 1

Preparation of a Water Dispersion Sol Containing Fine Particles of Titanium-Based Oxide 11.37 kg of an aqueous solution of titanium tetrachloride (available from OSAKA Titanium technologies Co., Ltd.) containing 7.75% by weight of a titanium constituent in terms of $TiO_2$ was mixed with 4.41 kg of an aqueous ammonia (available from Ube Industries, Ltd.) containing 15% by weight of ammonia to prepare a white slurry of pH 9.5. Subsequently, the slurry was subjected to filtration, and the resulting cake was then washed with pure water to obtain 9.27 kg of a purified cake of hydrous titanic acid having a solid content of 10% by weight.

Next, to the cake, 10.60 kg of an aqueous hydrogen peroxide (available from Mitsubishi Gas Chemical Company, Inc.) containing 35% by weight of hydrogen peroxide and 20.00 kg of pure water were added, then the resulting mixture was heated at a temperature of 80° C. for 1 hour while stirring, and 52.87 kg of pure water was further added to obtain 92.75 kg of an aqueous solution of peroxytitanic acid containing 1% by weight of a titanium constituent in terms of $TiO_2$. The aqueous solution of peroxytitanic acid was with a color of transparent yellow-brown and had a pH of 8.5.

Subsequently, 92.75 kg of the aqueous solution of peroxytitanic acid was mixed with 4.4 kg of a cation-exchange resin (available from Mitsubishi Chemical Corporation), and to the mixture, 11.59 kg of an aqueous solution of potassium stannate (available from Showa Kako Corporation) containing 1% by weight of a tin constituent in terms of $SnO_2$ was slowly added, while stirring.

Next, the cation-exchange resin in which a potassium ion and the like had been incorporated was separated from the mixture solution, 0.44 kg of a silica sol (available from JGC C&C) containing 15% by weight of silica fine particles with an average particle diameter of 7 nm and 6.22 kg of pure water were mixed thereto, and then the mixture was heated at a temperature of 165° C. for 18 hours in an autoclave (manufactured by Taiatsu Techno Corporation, with a capacity of 120 liters).

Next, the resulting mixed aqueous solution was cooled down to room temperature, and then concentrated by use of an ultrafiltration membrane apparatus (manufactured by Asahi Kasei Corporation, ACV-3010) to obtain 9.90 kg of a mixed aqueous solution having a solid content of 10% by weight.

The solids contained in the mixed aqueous solution thus obtained were measured and determined by the aforesaid method, and as a result, the solids were fine particles of composite oxide (i.e., primary particles) with a rutile-type crystal structure and containing titanium, tin and silicon. Moreover, the amounts of metal components contained in the fine particles of the composite oxide were measured and determined, and as a result, the contents of the metal components in terms of their respective metal oxides were: 82.8% by weight of a titanium constituent as $TiO_2$, 10.1% by weight of a tin constituent as $SnO_2$, 5.4% by weight of a silicon constituent as $SiO_2$, and 1.7% by weight of a potassium constituent as $K_2O$. The pH of the mixed aqueous solution was 9.2.

Subsequently, 9.00 kg of the mixed aqueous solution containing the fine particles of the composite oxide was subjected to a spray dryer (manufactured by NIRO, NIRO ATOMIZER) and spray-drying was performed in an air stream (at an inlet temperature of 260° C., and at an outlet temperature of 55° C.). Thus, 0.63 kg of dried particles of the composite oxide with an average particle diameter of about 2 μm was obtained.

Next, 0.63 kg of the dried particles of the composite oxide obtained as described above was calcined at a temperature of 600° C. for 1 hour in an air atmosphere to obtain 0.59 kg of calcined particles of the composite oxide.

The calcined particles of the composite oxide (i.e., particles of a titanium-based oxide) obtained as described above are crystalline particles with a a rutile-type crystal structure, and had a specific surface area of 138 $m^2/g$ and a crystallite diameter, as determined by X-ray diffraction, of 8.9 nm. The spacing of the (310) crystal face, as determined by X-ray diffraction, was 0.1452 nm, and the spacing of the (301) crystal face, as determined by X-ray diffraction, was 0.1357 nm. The relative ratio ($P^1/P^2$) of a peak intensity $P^1$ of the (310) crystal face to a peak intensity $P^2$ of the (110) crystal face, as determined by X-ray diffraction, was 13/100.

Next, 0.17 kg of the calcined particles of the composite oxide (i.e., particles of a titanium-based oxide) were dispersed in 250.4 g of pure water, and then to the dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) having a bead diameter of 0.1 to 0.2 mm were added, and the resulting mixture was subjected to a wet pulverizer (Kanpe Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.19 kg of a sol of water dispersion (hereinafter sometimes referred to as "water dispersion sol") having a solid content of 11% by weight. The water dispersion sol containing fine particles of the composite oxide (i.e., fine particles of a titanium-based oxide) obtained by pulverization as described above was with a color of milky white. The average particle diameter of the fine particles of the composite oxide contained in the water dispersion sol was 104 nm, and the distribution frequency of coarse particles of the composite oxide larger than 100 nm in the particle diameter contained therein was 58.6%.

Subsequently, to 1.19 kg of the water dispersion sol, 0.12 kg of pure water was added to give a water dispersion sol having a solid content of 10% by weight, and the water dispersion sol was mixed with 0.29 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 40.1 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.12 kg of a water dispersion sol having a solid content of 6.6% by weight was obtained.

Subsequently, to 1.12 kg of the water dispersion sol (solid content: 6.6% by weight), 2.58 kg of pure water was added to obtain 3.70 kg of a water dispersion sol having a solid content of 2.0% by weight. Next, the water dispersion sol was placed in an autoclave (manufactured by Taiatsu Techno corporation, with a capacity of 5 liters) and treated under a temperature of 165° C. for 18 hours.

Then, to the water dispersion sol taken out from the autoclave and also cooled down to room temperature, 0.15 kg of an anion-exchange resin (available from Mitsubishi Chemical Corporation) was added, and then the resulting mixture was stirred for 15 minutes. And also, the anion-exchange resin was separated and removed from the water dispersion sol by use of a stainless steel filter having an opening size of 44 μm, and then the resulting water dispersion sol was mixed with 9.8 g of a cation-exchange resin (available from Mitsubishi Chemical Corporation), followed by stirring for 15 minutes. And also, the cation-exchange resin was separated and removed from the water dispersion sol by use of a stainless steel filter having an opening size 44 μm to prepare a water dispersion sol having a solid content of 2.0% by weight and nearly not containing ionized substances therein. Thus, 3.62 kg of a water dispersion sol containing fine particles of a titanium-based oxide (hereinafter referred to as "CP-1") for Examples, which is produced with the particular steps of calcinations, pulverization and classification as described above, was obtained.

The thus obtained water dispersion sol containing the fine particles of the titanium-based oxide was with a color of transparent milky white and had turbidity of 0.42 cm$^{-1}$. The average particle diameter of the fine particles of the titanium-based oxide contained in the water dispersion sol was 31 nm, and the distribution frequency of coarse particles larger than 100 nm in the particle diameter contained therein was 0%.

The fine particles of the titanium-based oxide were crystalline particles with a rutile-type crystal structure and exhibited the same values of a specific surface area, a crystallite diameter, a crystal face spacing and a relative peak intensity ratio, some of which are determined by X-ray diffraction, as those of the aforesaid fine particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 84.4% by weight of a titanium constituent as $TiO_2$, 9.9% by weight of a tin constituent as $SnO_2$, 5.3% by weight of a silicon constituent as $SiO_2$, and 0.4% by weight of a potassium constituent as $K_2O$. The specific gravity of the fine particles of the titanium-based oxide, as determined from these metal contents, was 4.20. When the weight fractions "m" of the fine particles contained in the coating composition were 10% by weight, 20% by weight, 30% by weight, 40% by weight, 50% by weight and 55% by weight, the refractive indexes "Nav'" of the coating film, as measured by a spectroellipsometer in accordance with the method as described in the aforesaid "Method-A for measuring particle refractive index", were 1.544, 1.584, 1.630, 1.682, 1.743 and 1.775, respectively. The minimum value of the sum of square of deviation as determined from the above refractive index "Nav'" and a refractive index "Nav" of the coating film, which is calculated from the conversion formula between a fraction by weight and fraction by weight and the Maxwell-Garnett's formula, was 0.000167, and also the refractive index of the fine particles exhibiting the minimum value as described above was 2.35. Accordingly, the refractive index of the fine particles of the titanium-based oxide was regarded as 2.35.

Of the above measurement results, main data relating to the present invention are described in Table 1.

Preparation Example 2

Preparation of Water Dispersion Sol Containing Fine Particles of Titanium-Based Oxide 12.09 kg of an aqueous solution of titanium tetrachloride (available from OSAKA Titanium technologies Co., Ltd.) containing 7.75% by weight of a titanium constituent in terms of $TiO_2$ was mixed with 4.69 kg of an aqueous ammonia (available from Ube Industries, Ltd.) containing 15% by weight of ammonia to prepare a white slurry of pH 9.5. Subsequently, the slurry was subjected to filtration, and the resulting cake was then washed with pure water to obtain 9.87 kg of a purified cake of hydrous titanic acid having a solid content of 10% by weight.

Next, to the cake, 11.28 kg of an aqueous hydrogen peroxide (available from Mitsubishi Gas Chemical Company, Inc.) containing 35% by weight of hydrogen peroxide and 20.00 kg of pure water were added, then the resulting mixture was heated at a temperature of 80° C. for 1 hour while stirring, and 57.52 kg of pure water was further added to obtain 98.67 kg of an aqueous solution of peroxotitanic acid containing 1% by weight of a titanium constituent in terms of $TiO_2$. The aqueous solution of peroxotitanic acid was with a color of transparent yellow-brown and had pH of 8.5.

Subsequently, 98.67 kg of the aqueous solution of peroxotitanic acid was mixed with 4.7 kg of a cation-exchange resin (available from Mitsubishi Chemical Corporation), and to the mixture, 12.33 kg of an aqueous solution of potassium stannate (available from Showa Kako Corporation) containing 1% by weight of a tin constituent in terms of $SnO_2$ was slowly added, while stirring.

Next, after the cation-exchange resin in which a potassium ion and the like had been incorporated was separated from the mixture solution, the resulting solution was placed in an autoclave (manufactured by Taiatsu Techno Corporation, with a capacity of 120 liters) and heated at a temperature of 165° C. for 18 hours.

Next, the resulting mixed aqueous solution was cooled down to room temperature, and then concentrated by use of an ultrafiltration membrane apparatus (manufactured by Asahi Kasei Corporation, ACV-3010) to obtain 9.90 kg of a mixed aqueous solution having a solid content of 10% by weight.

The solids contained in the mixed aqueous solution thus obtained were measured and determined by the aforesaid method, and as a result, the solids were fine particles of a composite oxide (i.e., primary particles) with a rutile-type crystal structure and containing titanium and tin. Moreover, the amounts of metal components contained in the fine particles of the composite oxide were measured and determined, and as a result, the contents of the metal components in terms of their respective metal oxides were: 87.2% by weight of a titanium constituent as $TiO_2$, 11.0% by weight of a tin constituent as $SnO_2$, and 1.8% by weight of a potassium constituent as $K_2O$. The pH of the mixed aqueous solution was 10.0.

Subsequently, 9.00 kg of the mixed aqueous solution containing the fine particles of the composite oxide was subjected to a spray dryer (manufactured by NIRO, NIRO ATOMIZER) and then spray drying was performed in an air stream (at an inlet temperature of 260° C., and at an outlet temperature: 55° C.). Thus, 0.63 kg of dried particles of a composite oxide having an average particle diameter of about 2 μm were obtained.

Next, 0.63 kg of the dried particles of the composite oxide obtained above was calcined at a temperature of 500° C. for 1 hour in an air atmosphere to obtain 0.59 kg of calcined particles of the composite oxide.

The calcined particles of the composite oxide (i.e., particles of a titanium-based oxide) obtained as described above are crystalline particles with a rutile-type crystal structure, and had a specific surface area of 124 m$^2$/g and a crystallite diameter, as determined by X-ray diffraction, of 9.6 nm. The spacing of the (310) crystal face, as determined by X-ray diffraction, was 0.1447 nm, and the spacing of the (301) crystal face, as determined by X-ray diffraction, was 0.1366 nm. The relative ratio ($P^1/P^2$) of a peak intensity $P^1$ of the (310) crystal face to a peak intensity $P^2$ of the (110) crystal face, as determined by X-ray diffraction, was 14/100. An X-ray diffraction chart (XRD chart) obtained in this measurement is shown in FIG. 1.

Next, 0.17 kg of the resulting calcined particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.17 kg of a water dispersion sol having a solid content of 11% by weight. The water dispersion sol containing the fine particles of the composite oxide obtained by pulverization as above was with a color of milky white. The average particle diameter of the fine particles of the composite oxide contained in the water dispersion sol was 106 nm, and the distribution frequency of coarse particles larger than 100 nm in the particle diameter contained therein was 59.1%.

Subsequently, to 1.17 kg of the water dispersion sol, 0.12 kg of pure water was added to give a water dispersion sol having a solid content of 10% by weight, and the water dispersion sol was mixed with 0.29 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 39.4 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.13 kg of a water dispersion sol having a solid content of 6.4% by weight was obtained.

Subsequently, to 1.13 kg of the water dispersion sol (solid content: 6.4% by weight), 2.49 kg of pure water was added to obtain 3.62 kg of a water dispersion sol having a solid content of 2.0% by weight. Next, the water dispersion sol was placed in an autoclave (manufactured by Taiatsu Techno Corporation, with a capacity of 5 liters) and treated under a temperature of 165° C. for 18 hours.

Then, the water dispersion sol taken out from the autoclave and also cooled down to room temperature was mixed with 0.14 kg of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 9.5 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 3.52 kg of a water dispersion sol containing fine particles of a titanium-based oxide (hereinafter referred to as "CP-2") for Examples, which is produced with the particular steps of calcination, pulverization and classification as described above, was obtained.

The thus obtained water dispersion sol containing the fine particles of the titanium-based oxide was with a color of transparent milky white and had a turbidity of 0.51 cm$^{-1}$. The average particle diameter of the fine particles of the titanium-based oxide contained in the water dispersion sol was 35 nm, and the distribution frequency of coarse particles larger than 100 nm in the particle diameter contained therein was 0%.

The fine particles of the titanium-based oxide were crystalline particles with a rutile-type crystal structure and exhibited the same values of a specific surface area, a crystallite diameter, a crystal face spacing and a relative peak intensity ratio, some of which determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 88.5% by weight of a titanium constituent as $TiO_2$, 11.1% by weight of a tin constituent as $SnO_2$, and 0.4% by weight of a potassium constituent as $K_2O$. The specific gravity of the fine particles of the titanium-based oxide, as determined from these metal contents, was 4.44.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.532, 1.598, 1.622, 1.681, 1.746 and 1.783, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000421, and also the refractive index of the fine particles exhibiting the minimum value as described above was 2.38. Accordingly, the refractive index of the fine particles of the titanium-based oxide was regarded as 2.38.

Of the above measurement results, main data relating to the present invention are described in Table 1.

Preparation Example 3

Preparation of Water Dispersion Sol Containing Fine Particles of Titanium-Based Oxide 0.63 kg of dried particles of a composite oxide having an average particle diameter of about 2 μm were obtained in the same manner as in Preparation Example 1.

Subsequently, 0.63 kg of the dried particles of the composite oxide was calcined at a temperature of 500° C. for 1 hour in an air atmosphere to obtain 0.59 kg of calcined particles of the composite oxide.

Figure 2:
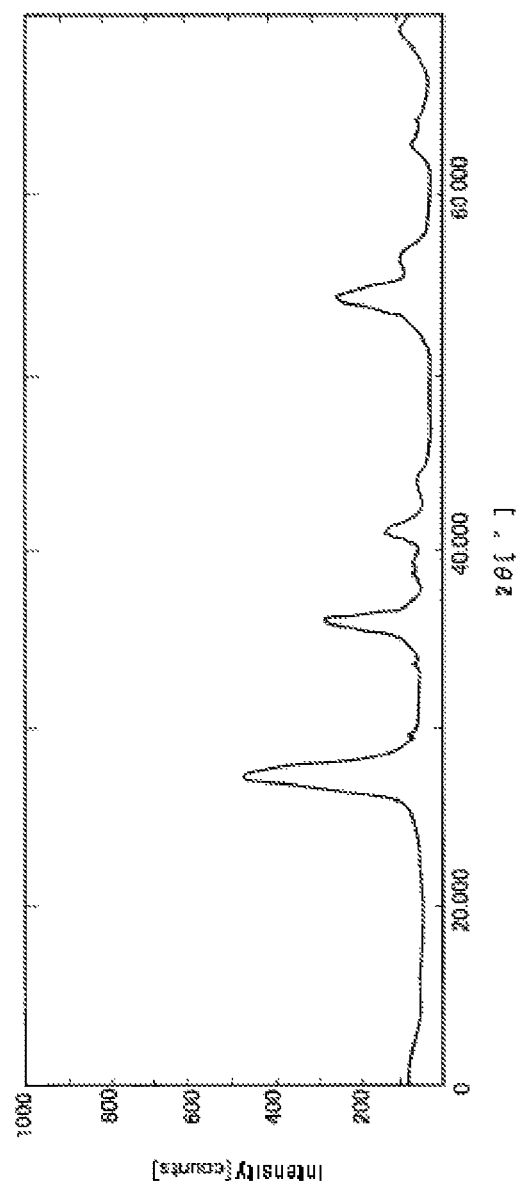
FIG. 2 shows an X-ray diffraction chart obtained by subjecting calcined particles of a composite oxide (i.e., particles of a titanium-based oxide) used in Preparation Example 3 to X-ray diffraction with an X-ray diffraction apparatus.

The calcined particles of the composite oxide (i.e., particles of a titanium-based oxide) obtained as described above are crystalline particles with a rutile-type crystal structure, and had a specific surface area of 150 m$^2$/g and a crystallite diameter, as determined by X-ray diffraction, of 8.2 nm. The spacing of the (310) crystal face, as determined by X-ray diffraction, was 0.1448 nm, and the spacing of the (301) crystal face, as determined by X-ray diffraction, was 0.1357 nm. The relative ratio (P$^1$/P$^2$) of a peak intensity P$^1$ of the (310) crystal face to a peak intensity P$^2$ of the (110) crystal face, as determined by X-ray diffraction, was 14/100. An X-ray diffraction chart (XRD chart) obtained in this measurement is shown in FIG. 2.

Next, 0.17 kg of the resulting calcined particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.35 kg of a water dispersion sol having a solid content of 11% by weight. The water dispersion sol containing the fine particles of the composite oxide obtained by pulverization as above was with a color of milky white. The average particle diameter of the fine particles of the composite oxide contained in the water dispersion sol was 98 nm, and the distribution frequency of coarse particles larger than 100 nm in the particle diameter contained therein was 53.4%.

Subsequently, to 1.35 kg of the water dispersion sol, 0.14 kg of pure water was added to give a water dispersion sol having a solid content of 10% by weight, and the water dispersion sol was mixed with 0.33 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 45.4 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.30 kg of a water dispersion sol having a solid content of 6.6% by weight was obtained.

Subsequently, to 1.30 kg of the water dispersion sol (solid content: 6.6% by weight), 3.51 kg of pure water was added to obtain 4.81 kg of a water dispersion sol having a solid content of 2.0% by weight. Next, the water dispersion sol was placed in an autoclave (manufactured by Taiatsu Techno Corporation, with a capacity of 5 liters) and treated under a temperature of 165° C. for 18 hours.

Then, the water dispersion sol taken out from the autoclave and also cooled down to room temperature was mixed with 0.19 kg of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 12.7 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 4.76 kg of a water dispersion sol containing fine particles of a titanium-based oxide (hereinafter referred to as "CP-3") for Examples, which is produced with the particular steps of calcination, pulverization and classification as described above, was obtained.

The thus obtained water dispersion sol containing the fine particles of the titanium-based oxide was with a color of transparent milky white and had a turbidity of 0.28 cm$^{-1}$. The average particle diameter of the fine particles of the titanium-based oxide contained in the water dispersion sol was 29 nm, and the distribution frequency of coarse particles larger than 100 nm in the particle diameter contained therein was 0%.

The fine particles of the titanium-based oxide were crystalline particles with a rutile-type crystal structure and exhibited the same values of a specific surface area, a crystallite diameter, a crystal face spacing and a relative peak intensity ratio, some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 83.8% by weight of a titanium constituent as TiO$_2$, 10.5% by weight of a tin constituent as SnO$_2$, 5.4% by weight of a silicon constituent as SiO$_2$, and 0.3% by weight of potassium constituent as K$_2$O. The specific gravity of the fine particles of the titanium-based oxide, as determined from these metal contents, was 4.21.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.534, 1.573, 1.619, 1.671, 1.731 and 1.764, respectively. The minimum value of the sum of square of deviation, as determined from the above index "Nav'" and a refractive index "Nav" of the coating film, which is calculated from the conversion formula between a fraction by volume and a fraction by weight and the Maxwell-Garnett's formula, was 0.000005, and also the refractive index of the fine particles exhibiting the minimum value as described above was 2.29. Accordingly, the refractive index of the fine particles of the titanium-based oxide was regarded as 2.29. In this connection, the refractive index of the fine particles of the titanium-based oxide, as measured by method-B for measuring a refractive index of particles (standard liquid method), was 2.29.

Of the above measurement results, main data relating to the present invention are described in Table 1.

Preparation Example 4

Preparation of Water Dispersion Sol Containing Fine Particles of Titanium-Based Oxide 0.63 kg of dried particles of a composite oxide having an average particle diameter of about 2 μm was obtained in the same manner as in Preparation Example 1.

Subsequently, 0.63 kg of the dried particles of the composite oxide was calcined at a temperature of 700° C. for 1 hour in an air atmosphere to obtain 0.59 kg of calcined particles of the composite oxide.

The calcined particles of the composite oxide (i.e., particles of a titanium-based oxide) obtained as described above are crystalline particles with a rutile-type crystal structure, and had a specific surface area of 113 m$^2$/g and a crystallite diameter, as determined by X-ray diffraction, of 10.0 nm. The spacing of the (310) crystal face, as determined by X-ray diffraction, was 0.1453 nm, and the spacing of the (301) crystal face, as determined by X-ray diffraction, was 0.1363 nm. The relative ratio ($P^1/P^2$) of a peak intensity $P^1$ of the (310) crystal face to a peak intensity $P^2$ of the (110) crystal face, as determined by X-ray diffraction, was 12/100.

Next, 0.17 kg of the resulting calcined particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.18 kg of a water dispersion sol having a solid content of 11% by weight. The water dispersion sol containing the fine particles of the composite oxide obtained by pulverization as above was with a color of milky white. The average particle diameter of the fine particles of the composite oxide contained in the water dispersion sol was 109 nm, and the distribution frequency of coarse particles larger than 100 nm in the particle contained therein was 59.6%.

Subsequently, to 1.18 kg of the water dispersion sol, 0.12 kg of pure water was added to give a water dispersion sol having a solid content of 10% by weight, and the water dispersion sol was mixed with 0.29 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 39.7 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.12 kg of a water dispersion sol having a solid content of 6.6% by weight was obtained.

Subsequently, to 1.12 kg of the water dispersion sol (solid content: 6.6% by weight), 2.52 kg of pure water was added to obtain 3.64 kg of a water dispersion sol having a solid content of 2.0% by weight. Next, the water dispersion sol was placed in an autoclave (manufactured by Taiatsu Techno Corporation, with a capacity of 5 liters) and treated under a temperature of 165° C. for 18 hours.

Then, the water dispersion sol taken out from the autoclave and also cooled down to room temperature was mixed with 0.14 kg of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 9.6 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 3.54 kg of a water dispersion sol containing fine particles of a titanium-based oxide (hereinafter referred to as "CP-4") for Examples, which is produced with the particular steps of calcination, pulverization and classification as described above, was obtained.

The thus obtained water dispersion sol containing the fine particles of the titanium-based oxide was with a color of transparent milky white and had a turbidity of 0.48 cm$^{-1}$. The average particle diameter of the fine particles of the titanium-based oxide contained in the water dispersion sol was 38 nm, and the distribution frequency of coarse particles larger than 100 nm in the particle diameter contained therein was 0%.

The fine particles of the titanium-based oxide were crystalline particles with a rutile-type crystal structure and exhibited the same values of a specific surface area, a crystallite diameter, a crystal face spacing and a relative peak intensity ratio, some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 86.9% by weight of a titanium constituent as $TiO_2$, 10.9% by weight of a tin constituent as $SnO_2$, 1.8% by weight of a silicon constituent as $SiO_2$, and 0.4% by weight of a potassium constituent as $K_2O$. The specific gravity of the fine particles of the titanium-based oxide, as determined from these metal contents, was 4.36.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.536, 1.581, 1.631, 1.689, 1.755 and 1.802, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000674, and also the refractive index of the fine particles exhibiting the minimum value as described above was 2.43. Accordingly, the refractive index of the fine particles of the titanium-based oxide was regarded as 2.43.

Of the above measurement results, main data relating to the present invention are described in Table 1.

Preparation Example 5

Preparation of Water Dispersion Sol Containing Fine Particles of Titanium-Based Oxide 0.63 kg of dried particles of a composite oxide having an average particle diameter of about 2 μm were obtained in the same manner as in Preparation Example 2.

Subsequently, 0.63 kg of the dried particles of the composite oxide was calcined at a temperature of 700° C. for 1 hour in an air atmosphere to obtain 0.59 kg of calcined particles of the composite oxide.

Figure 3:
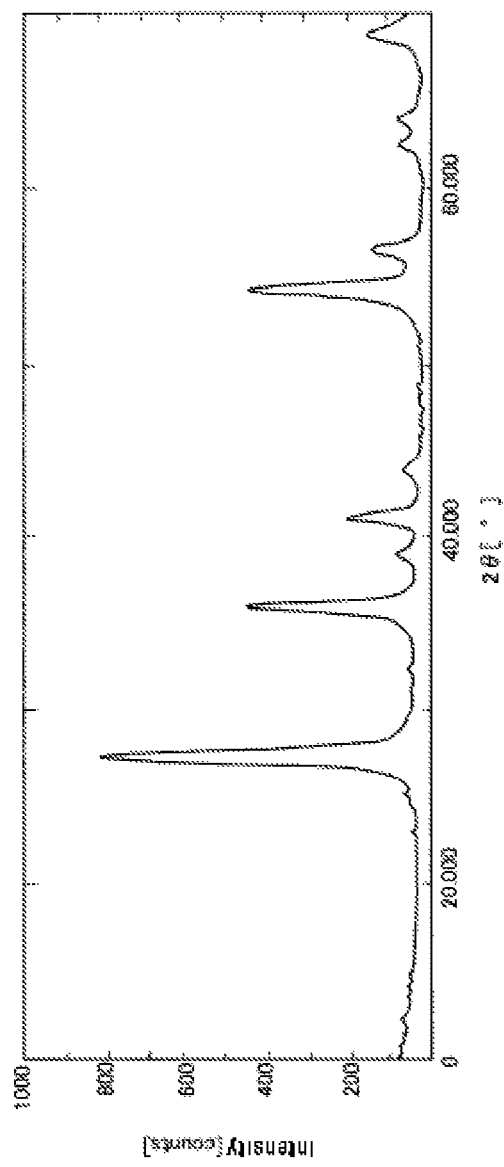
FIG. 3 shows an X-ray diffraction chart obtained by subjecting calcined particles of a composite oxide (i.e., particles of a titanium-based oxide) used in Preparation Example 5 to X-ray diffraction with an X-ray diffraction apparatus.

The calcined particles of the composite oxide (i.e., particles of a titanium-based oxide) obtained as described above are crystalline particles with a rutile-type crystal structure, and had a specific surface area of 82 m$^2$/g and a crystallite diameter, as determined by X-ray diffraction, of 13.4 nm. The spacing of the (310) crystal face, as determined by X-ray diffraction, was 0.1453 nm, and the spacing of the (301) crystal face, as determined by X-ray diffraction, was 0.1370 nm. The relative ratio ($P^1/P^2$) of a peak intensity $P^1$ of the (310) crystal face to a peak intensity $P^2$ of the (110) crystal face, as determined by X-ray diffraction, was 11/100. An X-ray diffraction chart (XRD chart) obtained in this measurement is shown in FIG. 3.

Next, 0.17 kg of the resulting calcined particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then 840.0 g of pure water was added to thus obtained solution, and the resulting mixture was stirred to obtain 1.18 kg of a water dispersion sol having a solid content of 11% by weight. The water dispersion sol containing the fine particles of the composite oxide obtained by pulverization as above was with a color of milky white. The average particle diameter of the fine particles of the composite oxide contained in the water dispersion sol was 115 nm, and the distribution frequency of coarse particles larger than 100 nm in the particle diameter contained therein was 62.0%.

Subsequently, to 1.18 kg of the water dispersion sol, 0.12 kg of pure water was added to give a water dispersion sol having a solid content of 10% by weight, and the water dispersion sol was mixed with 0.29 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 39.7 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.13 kg of a water dispersion sol having a solid content of 5.9% by weight was obtained.

Subsequently, to 1.13 kg of the water dispersion sol (solid content: 5.9% by weight), 2.20 kg of pure water was added to obtain 3.33 kg of a water dispersion sol having a solid content of 2.0% by weight. Next, the water dispersion sol was placed in an autoclave (manufactured by Taiatsu Techno Corporation, with a capacity of 5 liters) and treated under a temperature of 165° C. for 18 hours.

Then, the water dispersion sol taken out from the autoclave and also cooled down to room temperature was mixed with 0.13 kg of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 8.8 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 3.28 kg of a water dispersion sol containing fine particles of a titanium-based oxide (hereinafter referred to as "CP-5") for Examples, which is produced with the particular steps of calcination, pulverization and classification as described above, then classifying and removing coarse particles, was obtained.

The thus obtained water dispersion sol containing the fine particles of the titanium-based oxide with a color of transparent milky white and had a turbidity of 0.64 cm$^{-1}$. The average particle diameter of the fine particles of the titanium-based oxide contained in the water dispersion sol was 41 nm, and the distribution frequency of coarse particles larger than 100 nm in the particle diameter contained therein was 0%.

The fine particles of the titanium-based oxide were crystalline particles with a rutile-type crystal structure and exhibited the same values of a specific surface area, a crystallite diameter, a crystal face spacing and a relative peak intensity ratio, some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 88.5% by weight of a titanium constituent as $TiO_2$, 11.1% by weight of a tin constituent as $SnO_2$, and 0.4% by weight of a potassium constituent as $K_2O$. The specific gravity of the fine particles of the titanium-based oxide, as determined from these metal contents, was 4.44.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.542, 1.592, 1.644, 1.716, 1.793 and 1.839, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000358, and also the refractive index of the fine particles exhibiting the minimum value as described above was 2.62. Accordingly, the refractive index of the fine particles of the titanium-based oxide was regarded as 2.62.

Of the above measurement results, main data relating to the present invention are described in Table 1.

Preparation Example 6

Preparation of Water Dispersion Sol Containing Fine Particles of Titanium-Based Oxide 0.63 kg of dried particles of a composite oxide having an average particle diameter of about 2 μm were obtained in the same manner as in Preparation Example 1.

These dried particles of the composite oxide were used as such without being calcined.

Figure 4:
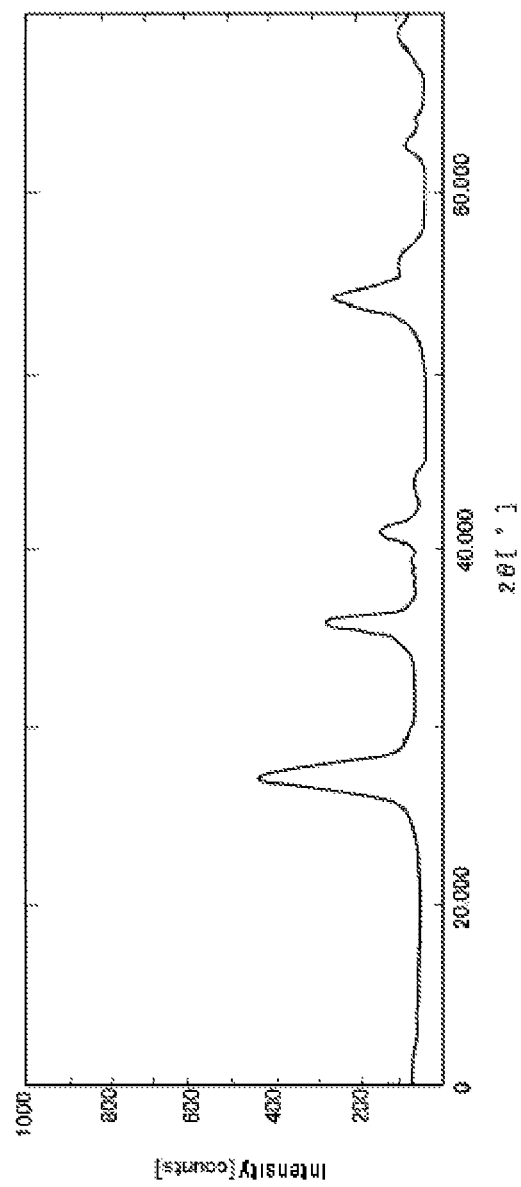
FIG. 4 shows an X-ray diffraction chart obtained by subjecting dried particles of a composite oxide (i.e., particles of a titanium-based oxide) used in Preparation Example 6 to X-ray diffraction with an X-ray diffraction apparatus.

The particles of the composite oxide (i.e., particles of a titanium-based oxide) were crystalline particles with a rutile-type crystal structure, and had a specific surface area of 215 $m^2/g$ and a crystallite diameter, as determined by X-ray diffraction, of 7.1 nm. The spacing of the (310) crystal face, as determined by X-ray diffraction, was 0.1365 nm, and the spacing of the (301) crystal face, as determined by X-ray diffraction, was 0.1354 nm. The relative ratio ($P^1/P^2$) of a peak intensity $P^1$ of the (310) crystal face to a peak intensity $P^2$ of the (110) crystal face, as determined by X-ray diffraction, was 24/100. An X-ray diffraction chart (XRD chart) obtained in this measurement is shown in FIG. 4.

Next, 0.17 kg of the resulting dried particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.45 kg of a water dispersion sol having a solid content of 11% by weight. The water dispersion sol containing the fine particles of the composite oxide obtained by pulverization as above was with a color of milky white. The average particle diameter of the fine particles of the composite oxide contained in the water dispersion sol was 136 nm, and the distribution frequency of coarse particles larger than 100 nm in the particle diameter contained therein was 70.4%.

Subsequently, to 1.45 kg of the water dispersion sol, 0.205 kg of pure water was added to give a water dispersion sol having a solid content of 10% by weight, and the water dispersion sol was mixed with 0.36 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 48.8 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.43 kg of a water dispersion sol having a solid content of 3.5% by weight was obtained.

Subsequently, to 1.43 kg of the water dispersion sol (solid content: 3.5% by weight), 1.07 kg of pure water was added to obtain 2.50 kg of a water dispersion sol having a solid content of 2.0% by weight. Next, kg of the water dispersion sol was placed in an autoclave (manufactured by Taiatsu Techno Corporation, with a capacity of 10 liters) and treated under a temperature of 165° C. for 18 hours.

Then, the water dispersion sol taken out from the autoclave and also cooled down to room temperature was mixed with 0.10 kg of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 6.6 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 2.00 kg of a water dispersion sol containing fine particles of a titanium-based oxide (hereinafter referred to as "RCP-1") for Comparative Examples, which is produced with the particular steps of pulverization and classification as described above, was obtained.

The thus obtained water dispersion sol containing the fine particles of the titanium-based oxide was with a color of milky white and had a turbidity of 3.98 $cm^{-1}$. The average particle diameter of the fine particles of the titanium-based oxide contained in the water dispersion sol was 98 nm, and the distribution frequency of coarse particles larger than 100 nm in the particle diameter contained therein was 64.3%.

The fine particles of the titanium-based oxide were crystalline particles with a rutile-type crystal structure and exhibited the same values of a specific surface area, a crystallite diameter, a crystal face spacing and a relative peak intensity ratio, some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 83.9% by weight of a titanium constituent as $TiO_2$, 10.4% by weight of a tin constituent as $SnO_2$, 5.3% by weight of a silicon constituent as $SiO_2$, and 0.4% by weight of a potassium constituent as $K_2O$. The specific gravity of the fine particles of the titanium-based oxide, as determined from these metal contents, was 4.21.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.529, 1.564, 1.604, 1.649, 1.701 and 1.730, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000002, and also the refractive index of the fine particles exhibiting the minimum value as described above was 2.16. Accordingly, the refractive index of the fine particles of the titanium-based oxide was regarded as 2.16. In this connection, the refractive index of the fine particles of the titanium-based oxide, as measured by method-B for measuring a refractive index of particles (standard liquid method), was 2.16.

Of the above measurement results, main data relating to the present invention are described in Table 1.

Preparation Example 7

Preparation of Water Dispersion Sol Containing Fine Particles of Titanium-Based Oxide 0.63 kg of dried particles of a composite oxide having an average particle diameter of about 2 μm were obtained in the same manner as in Preparation Example 1.

Then, 0.63 kg of the dried particles of the composite oxide was calcined at a temperature of 180° C. for 1 hour in an air atmosphere to obtain 0.59 kg of calcined particles of the composite oxide.

The calcined particles of the composite oxide (i.e., particles of a titanium-based oxide) obtained as described above were crystalline particles with a rutile-type crystal structure, and had a specific surface area of 212 $m^2/g$ and a crystallite diameter, as determined by X-ray diffraction, of 7.1 nm. The spacing of the (310) crystal face, as determined by X-ray diffraction, was 0.1365 nm, and the spacing of the (301) crystal face, as determined by X-ray diffraction, was 0.1354 nm. The relative ratio ($P^1/P^2$) of a peak intensity $P^1$ of the (310) crystal face to a peak intensity $P^2$ of the (110) crystal face, as determined by X-ray diffraction, was 24/100.

Next, 0.17 kg of the resulting calcined particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then 840.0 g of pure water was added to thus obtained solution, and the resulting mixture was stirred to obtain 1.43 kg of a water dispersion sol having a solid content of 11% by weight.

The water dispersion sol containing the fine particles of the composite oxide obtained by pulverization as above was with a color of milky white. The average particle diameter of the fine particles of the composite oxide contained in the water dispersion sol was 130 nm, and the distribution frequency of coarse particles larger than 100 nm in the particle diameter contained therein was 68.2%.

Subsequently, to 1.43 kg of the water dispersion sol, 0.14 kg of pure water was added to give a water dispersion sol having a solid content of 10% by weight, and the water dispersion sol was mixed with 0.35 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 48.1 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.39 kg of a water dispersion sol having a solid content of 5.2% by weight was obtained.

Subsequently, to 1.39 kg of the water dispersion sol (solid content: 5.2% by weight), 2.22 kg of pure water was added to obtain 3.61 kg of a water dispersion sol having a solid content of 2.0% by weight. Next, the water dispersion sol was placed in an autoclave (manufactured by Taiatsu Techno Corporation, with a capacity of 10 liters) and treated under a temperature of 165° C. for 18 hours.

Then, the water dispersion sol taken out from the autoclave and also cooled down to room temperature was mixed with 0.14 kg of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 9.5 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 3.21 kg of a water dispersion sol containing fine particles of a titanium-based oxide (hereinafter referred to as "RCP-2") for Comparative Examples, which is produced with the particular steps of calcination, pulverization and classification as described above, then classifying and removing coarse particles, was obtained.

The thus obtained water dispersion sol containing the fine particles of the titanium-based oxide was with a color of milky white and had a turbidity of 1.03 $cm^{-1}$. The average particle diameter of the fine particles of the titanium-based oxide contained in the water dispersion sol was 72 nm, and the distribution frequency of coarse particles larger than 100 nm in the particle diameter contained therein was 56.1%.

The fine particles of the titanium-based oxide were crystalline particles with a rutile-type crystal structure and exhibited the same values of a specific surface area, a crystallite diameter, a crystal face spacing and a relative peak intensity ratio, some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 84.4% by weight of a titanium constituent as $TiO_2$, 9.9% by weight of a tin constituent as $SnO_2$, 5.3% by weight of a silicon constituent as $SiO_2$, and 0.4% by weight of a potassium constituent as $K_2O$. The specific gravity of the fine particles of the titanium-based oxide, as determined from these metal contents, was 4.20.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.529, 1.564, 1.604, 1.649, 1.701 and 1.730, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000002, and also the refractive index of the fine particles exhibiting the minimum value as described above was 2.17. Accordingly, the refractive index of the fine particles of the titanium-based oxide was regarded as 2.17. In this connection, the refractive index of the fine particles of the titanium-based oxide, as measured by method-B for measuring a refractive index of particles (standard liquid method), was 2.17.

Of the above measurement results, main data relating to the present invention are described in Table 1.

Preparation Example 8

Preparation of Water Dispersion Sol Containing Fine Particles of Titanium-Based Oxide 0.63 kg of dried particles of a composite oxide having an average particle diameter of about 2 µm were obtained in the same manner as in Preparation Example 1.

Then, 0.63 kg of the dried particles of the composite oxide was calcined at a temperature of 850° C. for 1 hour in an air atmosphere to obtain 0.59 kg of calcined particles of the composite oxide.

Figure 5:
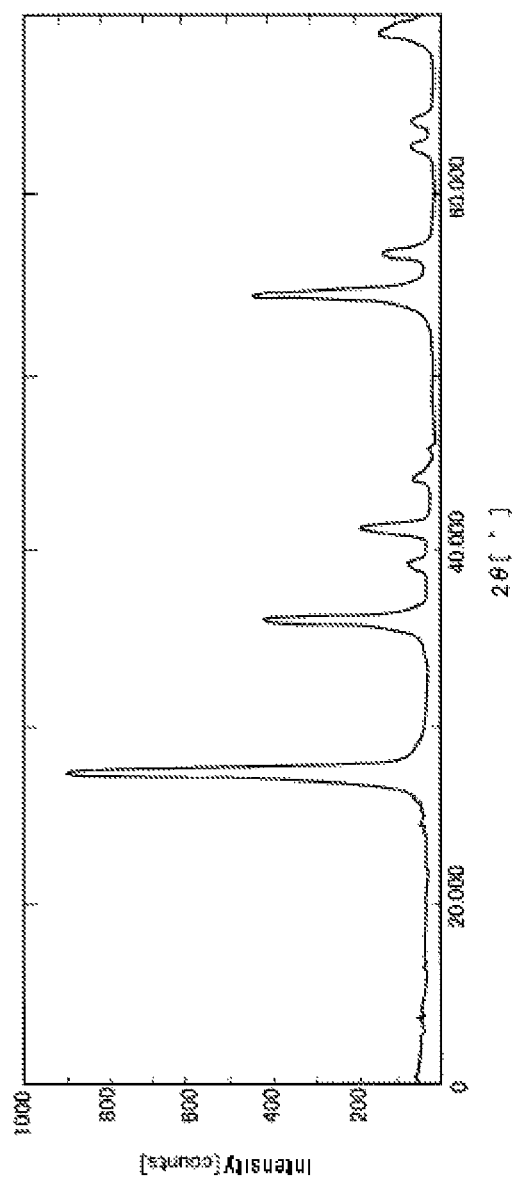
FIG. 5 shows an X-ray diffraction chart obtained by subjecting calcined particles of a composite oxide (i.e., particles of a titanium-based oxide) used in Preparation Example 8 to X-ray diffraction with an X-ray diffraction apparatus.

The calcined particles of the composite oxide (i.e., particles of a titanium-based oxide) obtained as described above were crystalline particles with a rutile-type crystal structure, and had a specific surface area of 51 m²/g and a crystallite diameter, as determined by X-ray diffraction, of 28.0 nm. The spacing of the (310) crystal face, as determined by X-ray diffraction, was 0.1456 nm, and the spacing of the (301) crystal face, as determined by X-ray diffraction, was 0.1361 nm. The relative ratio ($P^1/P^2$) of a peak intensity $P^1$ of the (310) crystal face to a peak intensity $P^2$ of the (110) crystal face, as determined by X-ray diffraction, was 12/100. An X-ray diffraction chart (XRD chart) obtained in this measurement is shown in FIG. 5.

Next, 0.17 kg of the resulting calcined particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 µm. Then 840.0 g of pure water was added to thus obtained solution, and the resulting mixture was stirred to obtain 1.12 kg of a water dispersion sol having a solid content of 11% by weight.

The water dispersion sol containing the fine particles of the composite oxide obtained by pulverization as above was with a color of milky white. The average particle diameter of the fine particles of the composite oxide contained in the water dispersion sol was 150 nm, and the distribution frequency of coarse particles larger than 100 nm in the particle diameter contained therein was 82.6%.

Subsequently, to 1.12 kg of the water dispersion sol, 0.11 kg of pure water was added to give a water dispersion sol having a solid content of 10% by weight, and the water dispersion sol was mixed with 0.28 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 µm, and then the resulting water dispersion sol was mixed with 37.7 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 µm. Then, the water dispersion sol thus obtained was subjected to a centrifugal separator (manufactured by Hitachi Koki Co., Ltd., CR-21G) and treated for 1 hour at a rotating speed of 12,000 rpm, whereby coarse particles larger than 100 nm in the particle diameter were classified and removed. Thus, 1.12 kg of a water dispersion sol having a solid content of 2.0% by weight was obtained.

Subsequently, the water dispersion sol was placed in an autoclave (manufactured by Taiatsu Techno Corporation, with a capacity of 5 liters) and treated under a temperature of 165° C. for 18 hours.

Then, the water dispersion sol taken out from the autoclave and also cooled down to room temperature was mixed with 44.2 g of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 µm, and then the resulting water dispersion sol was mixed with 2.9 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 µm to prepare a water dispersion sol having a solid content of 2.0% by weight and nearly not containing ionized substances therein. Thus, 1.07 kg of a water dispersion sol containing fine particles of a titanium-based oxide (hereinafter referred to as "RCP-3") for Comparative Examples, which is produced with the particular steps of calcination, pulverization and classification as described above, then classifying and removing coarse particles, was obtained.

The thus obtained water dispersion sol containing the fine particles of the titanium-based oxide was with a color of milky white and had a turbidity of 4.82 cm$^{-1}$. The average particle diameter of the fine particles of the titanium-based oxide contained in the water dispersion sol was 111 nm, and the distribution frequency of coarse particles larger than 100 nm in the particle diameter contained therein was 76.9%.

The fine particles of the titanium-based oxide were crystalline particles with a rutile-type crystal structure and exhibited the same values of a specific surface area, a crystallite diameter, a crystal face spacing and a relative peak intensity ratio some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 84.5% by weight of a titanium constituent as $TiO_2$, 9.8% by weight of a tin constituent as $SnO_2$, 5.3% by weight of a silicon constituent as $SiO_2$, and 0.4% by weight of a potassium constituent as $K_2O$. The specific gravity of the fine particles of the titanium-based oxide, as determined from these metal contents, was 4.20.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.542, 1.591, 1.647, 1.719, 1.797 and 1.842, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000048, and also the refractive index of the fine particles exhibiting the minimum value as described above was 2.58. Accordingly, the refractive index of the fine particles of the titanium-based oxide was regarded as 2.58.

Of the above measurement results, main data relating to the present invention are described in Table 1.

Preparation Example 9

Preparation of Water Dispersion Sol Containing Fine Particles of Titanium-Based Oxide 0.63 kg of dried particles of a composite oxide having an average particle diameter of about 2 μm were obtained in the same manner as in Preparation Example 1.

Then, 0.63 kg of the dried particles of the composite oxide was calcined at a temperature of 600° C. for 1 hour in an air atmosphere to obtain 0.59 kg of calcined particles of the composite oxide.

The calcined particles of the composite oxide (i.e., particles of a titanium-based oxide) obtained as described above were crystalline particles with a rutile-type crystal structure, and had a specific surface area of 138 m$^2$/g and a crystallite diameter, as determined by X-ray diffraction, of 8.2 nm. The spacing of the (310) crystal face, as determined by X-ray diffraction, was 0.1452 nm, and the spacing of the (301) crystal face, as determined by X-ray diffraction, was 0.1357 nm. The relative ratio ($P^1/P^2$) of a peak intensity $P^1$ of the (310) crystal face to a peak intensity $P^2$ of the (110) crystal face, as determined by X-ray diffraction, was 13/100.

Next, 0.17 kg of the resulting calcined particles of the composite oxide (i.e., particles of a titanium-based oxide) were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the composite oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.19 kg of a water dispersion sol having a solid content of 11% by weight.

The water dispersion sol containing the fine particles of the composite oxide obtained by pulverization as above was with a color of milky white. The average particle diameter of the fine particles of the composite oxide contained in the water dispersion sol was 104 nm, and the distribution frequency of coarse particles larger than 100 nm in the particle diameter contained therein was 58.6%.

Subsequently, to 1.19 kg of the water dispersion sol, 0.12 kg of pure water was added to give a water dispersion sol having a solid content of 10% by weight, and the water dispersion sol was mixed with 0.29 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 40.1 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. However, the water dispersion sol thus obtained was not subjected to classification of coarse particles larger than 100 nm in the particle diameter using a centrifugal separator. Thus, 1.12 kg of a water dispersion sol having a solid content of 10.0% by weight was obtained.

Subsequently, to 1.12 kg of the water dispersion sol (solid content: 10.0% by weight), 4.48 kg of pure water was added to obtain 5.60 kg of a water dispersion sol having a solid content of 2.0% by weight. Next, the water dispersion sol was placed in an autoclave (manufactured by Taiatsu Techno Corporation, with a capacity of 10 liters) and treated under a temperature of 165° C. for 18 hours.

Then, the water dispersion sol taken out from the autoclave and also cooled down to room temperature was mixed with 0.22 kg of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 14.8 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 5.49 kg of a water dispersion sol containing titanium-based fine particles of a titanium-based oxide (hereinafter referred to as "RCP-4") for Comparative Examples, which is produced with the particular steps of calcination and pulverization as described above, was obtained.

The thus obtained water dispersion sol containing the fine particles of a titanium-based oxide was with a color of milky white and had a turbidity of 10.25 cm$^{-1}$. The average particle diameter of the fine particles of the titanium-based oxide contained in the water dispersion sol was 104 nm, and the distribution frequency of coarse particles larger than 100 nm in the particle diameter contained therein was 58.6%.

The fine particles of the titanium-based oxide were crystalline particles with a rutile-type crystal structure and exhibited the same values of a specific surface area, a crystallite diameter, a crystal face spacing and a relative peak intensity ratio some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 83.7% by weight of a titanium constituent as $TiO_2$, 10.6% by weight of a tin constituent as $SnO_2$, 5.4% by weight of a silicon constituent as $SiO_2$, and 0.3% by weight of a potassium constituent as $K_2O$. The specific gravity of the fine particles of the titanium-based oxide, as determined from these metal contents, was 4.21.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.548, 1.594, 1.642, 1.699, 1.743 and 1.785, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000664, and also the refractive index of the fine particles exhibiting the minimum value as described above was 2.38. Accordingly, the refractive index of the fine particles of the titanium-based oxide was regarded as 2.38.

Of the above measurement results, main data relating to the present invention are described in Table 1.

Preparation Example 10

Preparation of Water Dispersion Sol Containing Fine Particles of Titanium-Based Oxide Commercially available particles of a titanium oxide (fine particles of a titanium oxide MT-150W available from TAYCA CORPORATION) were prepared. These particles of the titanium oxide were crystalline particles with a rutile-type crystal structure, and had a specific surface area of 88 m$^2$/g and a crystallite diameter, as determined by X-ray diffraction, of 16.8 nm. The spacing of the (310) crystal face, as determined by X-ray diffraction, was 0.1457 nm, and the spacing of the (301) crystal face, as determined by X-ray diffraction, was 0.1363 nm. The relative ratio ($P^1/P^2$) of a peak intensity $P^1$ of the (310) crystal face to a peak intensity $P^2$ of the (110) crystal face, as determined by X-ray diffraction, was 9/100.

Judging from these measurement results, the particles of the titanium oxide was considered to be a calcined particles obtained by calcining at a relatively high temperature.

Next, 0.17 kg of the particles of the titanium oxide were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the titanium oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.01 kg of a water dispersion sol having a solid content of 11% by weight.

The water dispersion sol containing pulverized particles of the titanium oxide obtained by pulverization as above was with a color of milky white. The average particle diameter of the fine particles of the composite oxide contained in the water dispersion sol was 548 nm, and the distribution frequency of coarse particles larger than 100 nm in the particle diameter contained therein was 100%.

Subsequently, to 1.01 kg of the water dispersion sol, 0.10 kg of pure water was added to give a water dispersion sol having a solid content of 10% by weight, and the water dispersion sol was mixed with 0.25 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 34.0 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 10 minutes at a rotating speed of 3,000 rpm, whereby coarse particles larger than 100 nm in the particle diameter were classified and removed. Thus, 0.95 kg of a water dispersion sol having a solid content of 2.2% by weight was obtained.

Subsequently, to 0.95 kg of the water dispersion sol (solid content: 6.6% by weight), 0.10 kg of pure water was added to obtain 1.05 kg of a water dispersion sol having a solid content of 2.0% by weight. Next, the water dispersion sol was placed in an autoclave (manufactured by Taiatsu Techno Corporation, with a capacity of 5 liters) and treated under a temperature of 165° C. for 18 hours.

Then, the water dispersion sol taken out from the autoclave and also cooled down to room temperature was mixed with 41.6 g of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 2.8 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substance therein. Thus, 0.97 kg of a water dispersion sol containing fine particles of a titanium-based oxide (hereinafter referred to as "RCP-5") for Comparative Examples, which is produced with the particular steps of calcination, pulverization and classification as described above, was obtained.

The thus obtained water dispersion sol containing the fine particles of the titanium-based oxide was with a color of milky white and had a turbidity of 15.31 cm$^{-1}$. The average particle diameter of the fine particles of the titanium-based oxide contained in the water dispersion sol was 384 nm, and the distribution frequency of coarse particles larger than 100 nm in the particle diameter contained therein was 100%.

The fine particles of the titanium-based oxide were crystalline particles with a rutile-type crystal structure and exhibited the same values of a specific surface area, a crystallite diameter, a crystal face spacing and a relative peak intensity ratio some of which are determined by X-ray diffraction, as those of the aforesaid particles of the composite oxide (i.e., particles of a titanium-based oxide prior to pulverization).

The amounts of metal components contained in the fine particles of the titanium-based oxide were measured and determined, and as a result, the contents of the metal components in terms of their respective metal oxides were: 98.3% by weight of a titanium constituent as $TiO_2$, 0.4% by weight of an aluminum constituent as $Al_2O_3$, 0.5% by weight of a sodium constituent as $Na_2O$, 0.1% by weight of a calcium constituent as $CaO$, 0.1% by weight of a silicon constituent as $SiO_2$, and 0.6% by weight of a phosphorus constituent as $P_2O_5$. The specific gravity of the fine particles of the titanium-based oxide, as determined from these metal contents, was 4.25.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.548, 1.594, 1.642, 1.699, 1.743 and 1.797, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000602, and also the refractive index of the fine particles exhibiting the minimum value as described above was 2.39. Accordingly, the refractive index of the fine particles of the titanium-based oxide was regarded as 2.39.

Of the above measurement results, main data relating to the present invention are described in Table 1.

Preparation Example 11

Preparation of Water Dispersion Sol Containing Fine Particles of Titanium-Based Oxide Commercially available particles of a titanium oxide containing aluminum in addition to titanium (ultrafine particles of titanium oxide TTO-51 (A) available from Ishihara Sangyo Kaisha, Ltd.) were prepared. The particles of titanium oxide were crystalline particles with a rutile-type crystal structure, and had a specific surface area of 98 m$^2$/g and a crystallite diameter, as determined by X-ray diffraction, of 14.3 nm. The spacing of the (310) crystal face, as determined by X-ray diffraction, was 0.1449 nm, and the spacing of the (301) crystal face, as determined by X-ray diffraction, was 0.1357 nm. The relative ratio ($P^1/P^2$) of a peak intensity $P^1$ of the (310) crystal face to a peak intensity $P^2$ of the (110) crystal face, as determined by X-ray diffraction, was 11/100.

Judging from these measurement results, the particles of the titanium oxide were considered to be a calcined particles obtained by calcining at a relatively high temperature.

Next, 0.17 kg of the particles of the titanium oxide were dispersed in 250.4 g of pure water, and then to the water dispersion, 24.8 g of an aqueous solution of potassium hydroxide having a concentration of 10% by weight was added to adjust the pH to 11.0. Subsequently, to the mixed aqueous solution, 1.27 kg of quartz beads (available from MRC Unitech Co., Ltd., high-purity silica beads 015) in the range of 0.1 to 0.2 mm in the bead diameter were added, and the resulting mixture was subjected to a wet pulverizer (Kanpe Hapio Co., Ltd., batch type bench sand mill), and then pulverization of the particles of the titanium oxide as described above was carried out for 180 minutes. Thereafter, the quartz beads were separated and removed from the mixed aqueous solution by use of a stainless steel filter having an opening size of 44 μm. Then, 840.0 g of pure water was added to thus obtained solution, and the resulting mixture was stirred to obtain 1.09 kg of a water dispersion sol having a content of 11% by weight.

The water dispersion sol containing pulverized particles of the titanium oxide obtained by pulverization as above was with a color of milky white. The average particle diameter of the fine particles of the composite oxide contained in the water dispersion sol was 690 nm, and the distribution frequency of coarse particles larger than 100 nm in the particle diameter contained therein was 100%.

Subsequently, to 1.09 kg of the water dispersion sol, 0.205 kg of pure water was added to give a water dispersion sol having a solid content of 10% by weight, and the water dispersion sol was mixed with 0.287 kg of an anion-exchange resin (available from Mitsubishi Chemical Corporation), followed by stirring for 15 minutes. Next, the anion-exchange resin was separated and removed from the water dispersion sol by use of a stainless steel filter having an opening size of 44 μm, and then the resulting water dispersion sol was mixed with 36.7 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm. Then, the water dispersion sol thus obtained was subjected to a centrifugal separator (manufactured by Hitachi Koki Co., Ltd., CR-21G) and treated for 10 minutes at a rotating speed of 3,000 rpm, whereby coarse particles larger than 100 nm in the particle diameter were classified and removed. Thus, 1.09 kg of a water dispersion sol having a solid content of 2.5% by weight was obtained.

Subsequently, to 1.09 kg of the water dispersion sol (solid content: 2.5% by weight), 0.27 kg of pure water was added to obtain 1.36 kg of a water dispersion sol having a solid content of 2.0% by weight. Next, the water dispersion sol was placed in an autoclave (manufactured by Taiatsu Techno Corporation, with a capacity of 5 liters) and treated under a temperature of 165° C. for 18 hours.

Then, the water dispersion sol taken out from the autoclave and also cooled down to room temperature was mixed with 54.2 g of an anion-exchange resin (available from Mitsubishi Chemical Corporation), and then the mixture was stirred for 15 minutes. Subsequently, the anion-exchange resin was separated and removed from the water dispersion sol by use of a stainless steel filter having an opening size of 44 μm, and then the resulting water dispersion sol was mixed with 3.6 g of a cation-exchange resin (available from Mitsubishi Chemical Corporation), followed by stirring for 15 minutes. And also, the cation-exchange resin was separated and removed from the water dispersion sol by use of a stainless steel filter having an opening size of 44 μm to prepare a water dispersion sol having a solid content of 2.0% by weight and nearly not containing ionized substances therein. Thus, 1.30 kg of a water dispersion sol containing fine particles of a titanium-based oxide (hereinafter referred to as "RCP-6") for Comparative Examples, which is produced with the particular steps of calcination, pulverization and classification as described above, was obtained.

The thus obtained water dispersion sol containing the fine particles of a titanium-based oxide was with a color of milky white and had a turbidity of 12.22 cm$^{-1}$. The average particle diameter of the fine particles of the titanium-based oxide contained in the water dispersion sol was 298 nm, and the distribution frequency of coarse particles larger than 100 nm in the particle diameter contained therein was 100%.

The fine particles of the titanium-based oxide were crystalline particles with a rutile-type crystal structure and exhibited the same values of a specific surface area, a crystallite diameter, a crystal face spacing and a relative peak intensity ratio some of which are determined by X-ray diffraction, as those of the aforesaid particles of the composite oxide (i.e., particles of a titanium-based oxide prior to pulverization).

The amounts of metal components contained in the fine particles of a titanium-based oxide were measured and determined, and as a result, the contents of the metal components in terms of their respective metal oxides were: 85.2% by weight of a titanium constituent as $TiO_2$, 13.2% by weight of an aluminum constituent as $Al_2O_3$, 1.4% by weight of a silicon constituent as $SiO_2$, and 0.2% by weight of a phosphorus constituent as $P_2O_5$. The specific gravity of the fine particles of the titanium-based oxide, as determined from these metal contents, was 4.18.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.516, 1.541, 1.564, 1.593, 1.630 and 1.648, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000031, and also the refractive index of the fine particles exhibiting the minimum value as described above was 1.92. Accordingly, the refractive index of the fine particles of the titanium-based oxide was regarded as 1.92. In this connection, the refractive index of the fine particles of the titanium-based oxide, as measured by method-B for measuring a refractive index of particles (standard liquid method), was 1.92.

Of the above measurement results, main data relating to the present invention are described in Table 1.

TABLE 1

| | | Properties of fine particles of titanium-based oxide | | | | | | | |
|---|---|---|---|---|---|---|---|---|---|
| | Number of fine particles | Crystallite diameter as determined by X-ray diffraction (nm) | Crystal face spacing of (310) (nm) | Crystal face spacing of (301) (nm) | Relative peak intensity ($P^1/P^2$) | Specific surface area ($m^2/g$) | Average particle diameter (nm) | Refractive index (measuring method-A) | Distribution frequency of coarse particles (%) |
| Prep. Ex. 1 | CP-1 | 8.9 | 0.1452 | 0.1357 | 13/100 | 138 | 31 | 2.35 | 0 |
| Prep. Ex. 2 | CP-2 | 9.6 | 0.1452 | 0.1357 | 14/100 | 124 | 35 | 2.38 | 0 |
| Prep. Ex. 3 | CP-3 | 8.2 | 0.1448 | 0.1357 | 14/100 | 150 | 29 | 2.29 | 0 |
| Prep. Ex. 4 | CP-4 | 10.0 | 0.1453 | 0.1363 | 12/100 | 113 | 38 | 2.43 | 0 |
| Prep. Ex. 5 | CP-5 | 13.4 | 0.1453 | 0.1370 | 11/100 | 82 | 41 | 2.62 | 0 |
| Prep. Ex. 6 | RCP-1 | 7.1 | 0.1365 | 0.1354 | 24/100 | 215 | 98 | 2.16 | 64.3 |
| Prep. Ex. 7 | RCP-2 | 7.1 | 0.1365 | 0.1354 | 24/100 | 212 | 72 | 2.17 | 56.1 |
| Prep. Ex. 8 | RCP-3 | 28.0 | 0.1456 | 0.1361 | 12/100 | 51 | 111 | 2.58 | 76.9 |
| Prep. Ex. 9 | RCP-4 | 8.2 | 0.1452 | 0.1357 | 13/100 | 138 | 104 | 2.38 | 58.6 |
| Prep. Ex. 10 | RCP-5 | 16.8 | 0.1457 | 0.1363 | 9/100 | 88 | 384 | 2.39 | 100 |
| Prep. Ex. 11 | RCP-6 | 14.3 | 0.1449 | 0.1357 | 11/100 | 98 | 298 | 1.92 | 100 |

Preparation Example 12

Preparation of Water Dispersion Sol Containing Metal Oxide Particles 7.50 kg of a water dispersion sol (solid content: 2.0% by weight) of fine particles of the titanium-based oxide CP-1 prepared in the same manner as in Preparation Example 1 was mixed with 57.0 g of an aqueous ammonia having a concentration of 5.0% by weight. The mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, the mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.88 kg of a water dispersion sol containing metal oxide particles (hereinafter referred to as "CSP-1") for Examples was obtained, which metal oxide particles were consisted with the fine particles of the titanium-based oxide and a coating layer formed on a surface each of the fine particles of the titanium-based oxide with a hydrolysate of ethyl orthosilicate, namely, silicon dioxide. The refractive index of the silicon dioxide that formed coating layers of the metal oxide particles was 1.45 that was lower than the refractive index of the fine particles of the titanium-based oxide as described above by 0.90.

The thus obtained water dispersion sol containing the metal oxide particles was with a color of transparent milky white and had a turbidity of 5.36 $cm^{-1}$. The average particle diameter of the metal oxide particles contained in the water dispersion sol was 33 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 66.0% by weight of a titanium constituent as $TiO_2$, 8.1% by weight of a tin constituent as $SnO_2$, 25.7% by weight of a silicon constituent as $SiO_2$, and 0.2% by weight of a potassium constituent as $K_2O$. The specific gravity of the metal oxide particles, as determined from these metal contents, was 3.52.

When the weight fractions "m" of the fine particles contained in the coating composition were 10% by weight, 20% by weight, 30% by weight, 40% by weight, 50% by weight and 55% by weight, the refractive indexes "Nav" of the coating films, as measured by a spectroellipsometer in accordance with the method described in the aforesaid "Method-A for measuring a refractive index of particles", were 1.523, 1.551, 1.579, 1.619, 1.661 and 1.685, respectively. The minimum value of the sum of square of deviation, as determined from the above refractive index "Nav" and a refractive index "Nav" of the coating film, which is calculated from the conversion formula between a fraction by volume and a fraction by weight and the Maxwell-Garnett's formula, was 0.000013, and also the refractive index of the fine particles exhibiting the minimum value as described above was 2.04. Accordingly, the refractive index of the metal oxide particles was regarded as 2.04. In this connection, the refractive index of the metal oxide particles, as measured by method-B for measuring a refractive index of particles (standard liquid method), was 2.04.

Of the above measurement results, main data relating to the present invention are described in Table 2.

Preparation Example 13

Preparation of an Aqueous Solution of Peroxozirconic Acid

To 15.79 kg of an aqueous solution of zirconium oxychloride (available from Taiyo Koko Co., Ltd.) containing 2.0% by weight of a zirconium constituent in terms of $ZrO_2$ an aqueous ammonia containing 15.0% by weight of ammonia was slowly added while stirring to obtain a slurry of pH 8.5 containing a hydrate of zirconium. Subsequently, the slurry was subjected to filtration, and the resulting cake was then washed with pure water to obtain 3.00 kg of a purified cake containing 10.0% by weight of a zirconium constituent in terms of $ZrO_2$.

Next, to 150.0 g of this cake, 1.35 kg of pure water was added to thus obtained solution, and 90.0 g of an aqueous solution of potassium hydroxide containing 10.0% by weight of potassium hydroxide (available from Kanto Chemical Co., Inc.) was further added to make the mixture alkaline. Thereafter, 300.0 g of an aqueous hydrogen peroxide containing 35.0% by weight of hydrogen peroxide was added, and the mixture was heated to a temperature of 50° C. to dissolve the cake. Then, 1.11 kg of pure water was further added to obtain 3.00 kg of an aqueous solution of peroxozirconic acid containing 0.5% by weight of a zirconium constituent in terms of $ZrO_2$. The aqueous solution of peroxozirconic acid had pH of 12.

Preparation of Silicic Acid Solution

On the other hand, 0.31 kg of commercially available water glass (available from AGC Si-Tech Co., Ltd.) was diluted with pure water, and then the diluted water glass was dealkalized by use of a cation-exchange resin (available from Mitsubishi Chemical Corporation) to obtain 3.00 kg of an aqueous solution of silicic acid containing 2.0% by weight of a silicon constituent in terms of $SiO_2$. The aqueous solution of silicic acid had pH of 2.3.

Preparation of Water Dispersion Sol Containing Metal Oxide Particles

To 7.50 kg of a water dispersion sol (solid content: 2.0% by weight) of fine particles of the titanium-based oxide CP-1 prepared in the same manner as in Preparation Example 1, 13.76 kg of pure water was added to thus obtained solution, and the mixture was stirred and heated to a temperature of 90° C. Thereafter, to the mixture, 6.00 kg of the aqueous solution of peroxozirconic acid and 4.50 kg of the aqueous solution of silicic acid were slowly added, and after the addition was completed, the mixture was aged for 1 hour while maintaining the temperature at 90° C. and stirring.

Subsequently, the mixed solution was placed in an autoclave (manufactured by Taiatsu Techno Corporation, with a capacity of 50 liters) and treated under a temperature of 165° C. for 18 hours.

Next, the resulting mixed solution was cooled down to room temperature, and then concentrated by use of an ultrafiltration membrane (manufactured by Asahi Kasei Corporation, SIP-1013) to prepare a water dispersion sol having a solid content of 20.0% by weight.

Subsequently, the resulting water dispersion sol was mixed with 0.59 kg of an anion-exchange resin (available from Mitsubishi Chemical Corporation), and then the mixture was stirred for 15 minutes. Next, the anion-exchange resin was separated and removed from the water dispersion sol by use of a stainless steel filter having an opening size of 44 μm, and then the resulting water dispersion sol was mixed with 81.0 g of a cation-exchange resin (available from Mitsubishi Chemical Corporation), followed by stirring for 15 minutes. Then, the cation-exchange resin was separated and removed from the water dispersion sol by use of a stainless steel filter having an opening size of 44 μm to obtain 1.32 kg of a water dispersion sol having a solid content of 20.0% by weight.

Thus, 1.32 kg of a water dispersion sol containing metal oxide particles (hereinafter referred to as "CSP-2") for Examples was obtained, which metal oxide particles constituted with the fine particles of the titanium-based oxide and a coating layer formed on a surface each of the fine particles of the titanium-based oxide with a composite oxide containing silicon and zirconium.

The refractive index of the composite oxide that formed coating layers of the metal oxide particles was 1.54 that was lower than the refractive index of the fine particles of the titanium-based oxide as described above by 0.81.

The thus obtained water dispersion sol containing the metal oxide particles was with a color of transparent milky white and had a turbidity of 5.35 $cm^{-1}$. The average particle diameter of the metal oxide particles contained in the water dispersion sol was 37 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 67.2% by weight of a titanium constituent as $TiO_2$, 8.6% by weight of a tin constituent as $SnO_2$, 19.3% by weight of a silicon constituent as $SiO_2$, 4.6% by weight of a zirconium constituent as $ZrO_2$, and 0.3% by weight of a potassium constituent as $K_2O$. The specific gravity of the metal oxide particles, as determined from these metal contents, was 3.75.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.526, 1.560, 1.596, 1.638, 1.684 and 1.710, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000009, and also the refractive index of the fine particles exhibiting the minimum value as described above was 2.07. Accordingly, the refractive index of the metal oxide particles was regarded as 2.07. In this connection, the refractive index of the metal oxide particles, as measured by method-B for measuring a refractive index of particles (standard liquid method), was 2.07.

Of the above measurement results, main data relating to the present invention are described in Table 2.

Preparation Example 14

Preparation of Water Dispersion Sol Containing Metal Oxide Particles

To 7.50 kg of a water dispersion sol (solid content: 2.0% by weight) of fine particles of a titanium-based oxide CP-1 prepared in the same manner as in Preparation Example 1, 1.16 kg of pure water was added to thus obtained solution, and the mixture was stirred and heated to a temperature of 90° C. Thereafter, to the mixture, 16.80 kg of an aqueous solution of peroxozirconic acid and 1.80 kg of an aqueous solution of silicic acid, which had been prepared in the same manner as in Preparation Example 13, were slowly added, and after the addition was completed, the mixture was aged for 1 hour while maintaining the temperature at 90° C. and stirring.

Subsequently, the mixed solution was placed in an autoclave (manufactured by Taiatsu Techno Corporation, with a capacity of 50 liters) and treated under a temperature of 165° C. for 18 hours.

Next, the resulting mixed solution was cooled down to room temperature, and then concentrated by use of an ultrafiltration membrane (manufactured by Asahi Kasei Corporation, SIP-1013) to prepare a water dispersion sol having a solid content of 20.0% by weight.

Subsequently, the resulting water dispersion sol was mixed with 0.59 kg of an anion-exchange resin (available from Mitsubishi Chemical Corporation), and then the mixture was stirred for 15 minutes. Then, the anion-exchange resin was separated and removed from the water dispersion sol by use of a stainless steel filter having an opening size of 44 μm, and then the resulting water dispersion sol was mixed with 81.0 g of a cation-exchange resin (available from Mitsubishi Chemical Corporation), followed by stirring for 15 minutes. Then, the cation-exchange resin was separated and removed from the water dispersion sol by use of a stainless steel filter having an opening size of 44 μm to obtain 1.32 kg of a water dispersion sol having a solid content of 20.0% by weight.

Thus, 1.32 kg of a water dispersion sol containing metal oxide particles (hereinafter referred to as "CSP-3") for Examples was obtained, which metal oxide particles were constituted with the fine particles of the titanium-based oxide and a coating layer formed on a surface each of the fine particles of the titanium-based oxide with a composite oxide containing silicon and zirconium.

The refractive index of the composite oxide that formed coating layers of the metal oxide particles was 2.11 that was lower than the refractive index of the fine particles of the titanium-based oxide as described above by 0.24.

The thus obtained water dispersion sol containing the metal oxide particles was with a color of transparent milky white and had a turbidity of 5.34 $cm^{-1}$. The average particle diameter of the metal oxide particles contained in the water dispersion sol was 31 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 65.9% by weight of a titanium constituent as $TiO_2$, 8.0% by weight of a tin constituent as $SnO_2$, 12.0% by weight of a silicon constituent as $SiO_2$, 13.9% by weight of a zirconium constituent as $ZrO_2$, and 0.2% by weight of a potassium constituent as $K_2O$. The specific gravity of the metal oxide particles, as determined from these metal contents, was 4.06.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.529, 1.564, 1.604, 1.649, 1.701 and 1.741, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000045, and also the refractive index of the fine particles exhibiting the minimum value as described above was 2.17. Accordingly, the refractive index of the metal oxide particles was regarded as 2.21. In this connection, the refractive index of the metal oxide particles, as measured by method-B for measuring a refractive index of particles (standard liquid method), was 2.17.

Of the above measurement results, main data relating to the present invention are described in Table 2.

Preparation Example 15

Preparation of Water Dispersion Sol Containing Metal Oxide Particles

To 7.50 kg of a water dispersion sol (solid content: 2.0% by weight) of fine particles of a titanium-based oxide CP-1 prepared in the same manner as in Preparation Example 1, 18.29 kg of pure water was added to thus obtained solution, and the mixture was stirred and heated to a temperature of 90° C. Thereafter, to the mixture, 5.98 kg of an aqueous solution of silicic acid prepared in the same manner as in Preparation Example 13 and 60.9 g of sodium aluminate (available from Asahi Kagaku Kogyo Co., Ltd.) containing 0.67% by weight of an aluminum constituent in terms of $Al_2O_3$ were slowly added, and after the addition was completed, the mixture was aged for 1 hour while maintaining the temperature at 90° C. and stirring.

Next, the resulting mixed solution was cooled down to room temperature, and then concentrated by use of an ultrafiltration membrane (manufactured by Asahi Kasei Corporation, SIP-1013) to prepare a water dispersion sol having a solid content of 20.0% by weight.

Subsequently, the resulting water dispersion sol was mixed with 0.59 kg of an anion-exchange resin (available from Mitsubishi Chemical Corporation), and then the mixture was stirred for 15 minutes. Next, the anion-exchange resin was separated and removed from the water dispersion sol by use of a stainless steel filter having an opening size of 44 μm, and then the resulting water dispersion sol was mixed with 81.0 g of a cation-exchange resin (available from Mitsubishi Chemical Corporation), followed by stirring for 15 minutes. Then, the cation-exchange resin was separated and removed from the water dispersion sol by use of a stainless steel filter having an opening size of 44 μm to obtain 1.32 kg of a water dispersion sol having a solid content of 20.0% by weight.

Thus, 1.32 kg of a water dispersion sol containing metal oxide particles (hereinafter referred to as "CSP-4") for Examples was obtained, which metal oxide particles were constituted with the fine particles of the titanium-based oxide and a coating layer formed on a surface each of the fine particles of the titanium-based oxide with a composite oxide containing silicon and aluminum.

The refractive index of the composite oxide that formed coating layers of the metal oxide particles was 1.45 that was lower than the refractive index of the fine particles of the titanium-based oxide as described above by 0.90.

The thus obtained water dispersion sol containing the metal oxide particles was with a color of transparent milky white and had a turbidity of 5.35 $cm^{-1}$. The average particle diameter of the metal oxide particles contained in the water dispersion sol was 32 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 70.9% by weight of a titanium constituent as $TiO_2$, 8.9% by weight of a tin constituent as $SnO_2$, 19.8% by weight of a silicon constituent as $SiO_2$, 0.2% by weight of an aluminum constituent as $Al_2O_3$, and 0.2% by weight of a potassium constituent as $K_2O$. The specific gravity of the metal oxide particles, as determined from these metal contents, was 3.70.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.528, 1.561, 1.598, 1.639, 1.685 and 1.712, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000047, and also the refractive index of the fine particles exhibiting the minimum value as described above was 2.07. Accordingly, the refractive index of the metal oxide particles was regarded as 2.07. In this connection, the refractive index of the metal oxide particles, as measured by method-B for measuring a refractive index of particles (standard liquid method), was 2.08.

Of the above measurement results, main data relating to the present invention are described in Table 2.

Preparation Example 16

Preparation of Water Dispersion Sol Containing Metal Oxide Particles 7.50 kg of a water dispersion sol (solid content: 2.0% by weight) of fine particles of a titanium-based oxide CP-1 prepared in the same manner as in Preparation Example 2 was mixed with 57.0 g of an aqueous ammonia having a concentration of 5.0% by weight. Then the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, the mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.89 kg of a water dispersion sol containing metal oxide particles (hereinafter referred to as "CSP-5") for Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide. The refractive index of the silicon dioxide that formed coating layers of the metal oxide particles was 1.45 that was lower than the refractive index of the fine particles of the titanium-based oxide as described above by 0.93.

The thus obtained water dispersion sol containing the metal oxide particles was with a color of transparent milky white and had a turbidity of 5.47 $cm^{-1}$. The average particle diameter of the metal oxide particles contained in the water dispersion sol was 37 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 78.0% by weight of a titanium constituent as $TiO_2$, 8.8% by weight of a tin constituent as $SnO_2$, 20.2% by weight of a silicon constituent as $SiO_2$, and 0.2% by weight of a potassium constituent as $K_2O$. The specific gravity of the metal oxide particles, as determined from these metal contents, was 3.68.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.530, 1.566, 1.604, 1.650, 1.702 and 1.730, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000009, and also the refractive index of the fine particles exhibiting the minimum value as described above was 2.12. Accordingly, the refractive index of the metal oxide particles was regarded as 2.12. In this connection, the refractive index of the metal oxide particles, as measured by method-B for measuring a refractive index of particles (standard liquid method), was 2.11.

Of the above measurement results, main data relating to the present invention are described in Table 2.

Preparation Example 17

Preparation of Water Dispersion Sol Containing Metal Oxide Particles 7.50 kg of a water dispersion sol (solid content: 2.0% by weight) of fine particles of the titanium-based oxide CP-3 prepared in the same manner as in Preparation Example 3 was mixed with 57.0 g of an aqueous ammonia having a concentration of 5.0% by weight. Then the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, this mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.89 kg of a water dispersion sol containing metal oxide particles (hereinafter referred to as "CSP-6") for Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide. The refractive index of the silicon dioxide that formed coating layers of the metal oxide particles was 1.45 that was lower than the refractive index of the fine particles of the titanium-based oxide as described above by 0.84.

The thus obtained water dispersion sol containing the metal oxide particles was with a color of transparent milky white and had a turbidity of 5.25 $cm^{-1}$. The average particle diameter of the metal oxide particles contained in the water dispersion sol was 31 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 66.3% by weight of a titanium constituent as $TiO_2$, 8.1% by weight of a tin constituent as $SnO_2$, 25.4% by weight of a silicon constituent as $SiO_2$, and 0.2% by weight of a potassium constituent as $K_2O$. The specific gravity of the metal oxide particles, as determined from these metal contents, was 3.53.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.528, 1.560, 1.591, 1.631, 1.673 and 1.696, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000011, and also the refractive index of the fine particles exhibiting the minimum value as described above was 2.01. Accordingly, the refractive index of the metal oxide particles was regarded as 2.01. In this connection, the refractive index of the metal oxide particles, as measured by method-B for measuring a refractive index of particles (standard liquid method), was 2.01.

Of the above measurement results, main data relating to the present invention are described in Table 2.

Preparation Example 18

Preparation of Water Dispersion Sol Containing Metal Oxide Particles 7.50 kg of a water dispersion sol (solid content: 2.0% by weight) of fine particles of a titanium-based oxide CP-4 prepared in the same manner as in Preparation Example 4 was mixed with 57.0 g of an aqueous ammonia having a concentration of 5.0% by weight. Then, the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, the mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.88 kg of a water dispersion sol containing metal oxide particles (hereinafter referred to as "CSP-7") for Examples was obtained, which metal oxide was constituted with the fine particles of the titanium-based oxide and a coating layer formed on a surface each of the fine particles of the titanium-based oxide with a hydrolysate of ethyl orthosilicate, namely, silicon dioxide. The refractive index of the silicon dioxide that formed coating layers of the metal oxide particles was 1.45 that was lower than the refractive index of the fine particles of the titanium-based oxide as described above by 0.98.

The thus obtained water dispersion sol containing the metal oxide particles was with a color of transparent milky white and had a turbidity of 5.46 $cm^{-1}$. The average particle diameter of the metal oxide particles contained in the water dispersion sol was 41 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 66.1% by weight of a titanium constituent as $TiO_2$, 8.1% by weight of a tin constituent as $SnO_2$, 25.6% by weight of a silicon constituent as $SiO_2$, and 0.2% by weight of a potassium constituent as $K_2O$. The specific gravity of the metal oxide particles, as determined from these metal contents, was 3.52.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.530, 1.565, 1.601, 1.649, 1.699 and 1.725, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000027, and also the refractive index of the fine particles exhibiting the minimum value as described above was 2.09. Accordingly, the refractive index of the metal oxide particles was regarded as 2.09. In this connection, the refractive index of the metal oxide particles, as measured by method-B for measuring a refractive index of particles (standard liquid method), was 2.09.

Of the above measurement results, main data relating to the present invention are described in Table 2.

Preparation Example 19

Preparation of Water Dispersion Sol Containing Metal Oxide Particles

To 7.50 kg of a water dispersion sol (solid content: 2.0% by weight) of fine particles of a titanium-based oxide CP-5 prepared in the same manner as in Preparation Example 5, 1.16 kg of pure water was added to thus obtained solution, and the mixture was stirred and heated to a temperature of 90° C. Thereafter, to the mixture, 22.80 kg of an aqueous solution of peroxozirconic acid and 0.30 kg of an aqueous solution of silicic acid, which had been prepared in the same manner as in Preparation Example 13 were slowly added, and after the addition was completed, the mixture was aged for 1 hour while maintaining the temperature at 90° C. and stirring.

Subsequently, this mixed solution was placed in an autoclave (manufactured by Taiatsu Techno Corporation, with a capacity of 50 liters) and treated under a temperature of 165° C. for 18 hours.

Next, the resulting mixed solution was cooled down to room temperature, and then concentrated by use of an ultrafiltration membrane (manufactured by Asahi Kasei Corporation, SIP-1013) to prepare a water dispersion sol having a solid content of 20.0% by weight.

Subsequently, the resulting water dispersion sol was mixed with 0.59 kg of an anion-exchange resin (available from Mitsubishi Chemical Corporation), and then the mixture was stirred for 15 minutes. Next, the anion-exchange resin was separated and removed from the water dispersion sol by use of a stainless steel filter having an opening size of 44 μm, and then the resulting water dispersion sol was mixed with 81.0 g of a cation-exchange resin (available from Mitsubishi Chemical Corporation), followed by stirring for 15 minutes. Then, the cation-exchange resin was separated and removed from water dispersion sol by use of a stainless steel filter having an opening size of 44 μm to obtain 1.32 kg of a water dispersion sol having a solid content of 20.0% by weight.

Thus, 1.32 kg of a water dispersion sol containing metal oxide particles (hereinafter referred to as "CSP-8") for Examples was obtained, which metal oxide particles were constituted with the fine particles of the titanium-based oxide and a coating layer formed on a surface each if the fine particles of the titanium-based oxide with a composite oxide containing silicon and zirconium.

The refractive index of the composite oxide that formed coating layers of the metal oxide particles was 2.11 that was lower than the refractive index of the fine particles of the titanium-based oxide as described above by 0.51.

The thus obtained water dispersion sol containing the metal oxide particles was with a color of transparent milky white and had a turbidity of 5.63 $cm^{-1}$. The average particle diameter of the metal oxide particles contained in the water dispersion sol was 41 nm, and the distribution frequency of coarse particles larger than 100 nm in the particle diameter contained therein was 0%.

The amounts of metal components contained in the metal oxide particles were measured and determined, and as a result, the contents of the metal components in terms of their respective metal oxides were: 66.5% by weight of a titanium constituent as $TiO_2$, 8.3% by weight of a tin constituent as $SnO_2$, 6.2% by weight of a silicon constituent as $SiO_2$, 18.8% by weight of a zirconium constituent as $ZrO_2$, and 0.2% by weight of a potassium constituent as $K_2O$. The specific gravity of the metal oxide particles, as determined from these metal contents, was 4.34.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.534, 1.573, 1.619, 1.671, 1.731 and 1.764, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000014, and also the refractive index of the fine particles exhibiting the minimum value as described above was 2.31. Accordingly, the refractive index of the metal oxide particles was regarded as 2.31. In this connection, the refractive index of the metal oxide particles, as measured by method-B for measuring a refractive index of particles (standard liquid method), was 2.30.

Of the above measurement results, main data relating to the present invention are described in Table 2.

Preparation Example 20

Preparation of Water Dispersion Sol Containing Metal Oxide Particles 7.50 kg of a water dispersion sol (solid content: 2.0% by weight) of fine particles of the titanium-based oxide RCP-1 prepared in the same manner as in Preparation Example 6 was mixed with 57.0 g of an aqueous ammonia having a concentration of 5.0% by weight. Then, the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, this mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.90 kg of a water dispersion sol containing metal oxide particles (hereinafter referred to as "RCSP-1") for Comparative Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide.

The refractive index of the silicon dioxide that formed coating layers of the metal oxide particles was 1.45 that was lower than the refractive index of the fine particles of the titanium-based oxide as described above by 0.71.

The thus obtained water dispersion sol containing the metal oxide particles was with a color of milky white and had a turbidity of 8.93 $cm^{-1}$. The average particle diameter of the metal oxide particles contained in the water dispersion sol was 99 nm, and the distribution frequency of coarse particles larger than 100 nm in the particle diameter contained therein was 59.4%.

The amounts of metal components contained in the metal oxide particles were measured and determined, and as a result, the contents of the metal components in terms of their respective metal oxides were: 66.2% by weight of a titanium constituent as $TiO_2$, 8.1% by weight of a tin constituent as $SnO_2$, 25.5% by weight of a silicon constituent as $SiO_2$, and 0.2% by weight of a potassium constituent as $K_2O$. The specific gravity of the metal oxide particles, as determined from these metal contents, was 3.52.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.522, 1.553, 1.587, 1.623, 1.661 and 1.685, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000024, and also the refractive index of the fine particles exhibiting the minimum value as described above was 1.97. Accordingly, the refractive index of the metal oxide particles was regarded as 1.97. In this connection, the refractive index of the metal oxide particles, as measured by method-B for measuring a refractive index of particles (standard liquid method), was 1.98.

Of the above measurement results, main data relating to the present invention are described in Table 2.

Preparation Example 21

Preparation of Water Dispersion Sol Containing Metal Oxide Particles 7.50 kg of a water dispersion sol (solid content: 2.0% by weight) of fine particles of a titanium-based oxide RCP-2 prepared in the same manner as in Preparation Example 7 was mixed with 57.0 g of an aqueous ammonia having a concentration of 5.0% by weight. Then the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, this mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.90 kg of a water dispersion sol containing metal oxide particles (hereinafter referred to as "RCSP-2") for Comparative Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide.

The refractive index of the silicon dioxide that formed coating layers of the metal oxide particles was 1.45 that was lower than the refractive index of the fine particles of the titanium-based oxide as described above by 0.72.

The thus obtained water dispersion sol containing the metal oxide particles was with a color of milky white and had a turbidity of 6.03 cm$^{-1}$. The average particle diameter of the metal oxide particles contained in the water dispersion sol was 73 nm, and the distribution frequency of coarse particles larger than 100 nm in the particle diameter contained therein was 49.2%.

The amounts of metal components contained in the metal oxide particles were measured and determined, and as a result, the contents of the metal components in terms of their respective metal oxides were: 66.0% by weight of a titanium constituent as $TiO_2$, 8.1% by weight of a tin constituent as $SnO_2$, 25.7% by weight of a silicon constituent as $SiO_2$, and 0.2% by weight of a potassium constituent as $K_2O$. The specific gravity of the metal oxide particles, as determined from these metal contents, was 3.52.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.522, 1.553, 1.590, 1.625, 1.670 and 1.692, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000075, and also the refractive index of the fine particles exhibiting the minimum value as described above was 1.99. Accordingly, the refractive index of the metal oxide particles was regarded as 1.99. In this connection, the refractive index of the metal oxide particles, as measured by method-B for measuring a refractive index of particles (standard liquid method), was 1.98.

Of the above measurement results, main data relating to the present invention are described in Table 2.

Preparation Example 22

Preparation of Water Dispersion Sol Containing Metal Oxide Particles 7.50 kg of a water dispersion sol (solid content: 2.0% by weight) of fine particles of a titanium-based oxide RCP-3 prepared in the same manner as in Preparation Example 8 was mixed with 57.0 g of an aqueous ammonia having a concentration of 5.0% by weight. Then, the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, the mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.88 kg of a water dispersion sol containing metal oxide particles (hereinafter referred to as "RCSP-3") for Comparative Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide.

The refractive index of the silicon dioxide that formed coating layers of the metal oxide particles was 1.45 that was lower than the refractive index of the fine particles of the titanium-based oxide as described above by 1.13.

The thus obtained water dispersion sol containing the metal oxide particles was with a color of transparent milky white and had a turbidity of 10.64 cm$^{-1}$. The average particle diameter of the metal oxide particles contained in the water dispersion sol was 116 nm, and the distribution frequency of coarse particles larger than 100 nm in the particle diameter contained therein was 77.2%.

The amounts of metal components contained in the metal oxide particles were measured and determined, and as a result, the contents of the metal components in terms of their respective metal oxides were: 66.3% by weight of a titanium constituent as $TiO_2$, 8.1% by weight of a tin constituent as $SnO_2$, 25.4% by weight of a silicon constituent as $SiO_2$, and 0.2% by weight of a potassium constituent as $K_2O$. The specific gravity of the metal oxide particles, as determined from these metal contents, was 3.53.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.535, 1.580, 1.628, 1.681, 1.742 and 1.777, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000023, and also the refractive index of the fine particles exhibiting the minimum value as described above was 2.24. Accordingly, the refractive index of the metal oxide particles was regarded as 2.24. In this connection, the refractive index of the metal oxide particles, as measured by method-B for measuring a refractive index of particles (standard liquid method), was 2.23.

Of the above measurement results, main data relating to the present invention are described in Table 2.

Preparation Example 23

Preparation of Water Dispersion Sol Containing Metal Oxide Particles 7.50 kg of a water dispersion sol (solid content: 2.0% by weight) of fine particles of a titanium-based oxide RCP-4 prepared in the same manner as in Preparation Example 9 was mixed with 57.0 g of an aqueous ammonia having a concentration of 5.0% by weight. Then, the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, the mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.87 kg of a water dispersion sol containing metal oxide particles (hereinafter referred to as "RCSP-4") for Comparative Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide.

The refractive index of the silicon dioxide that formed coating layers of the metal oxide particles was 1.45 that was lower than the refractive index of the fine particles of the titanium-based oxide as described above by 0.93.

The thus obtained water dispersion sol containing the metal oxide particles was with a color of milky white and had a turbidity of 16.21 $cm^{-1}$. The average particle diameter of the metal oxide particles contained in the water dispersion sol was 106 nm, and the distribution frequency of coarse particles larger than 100 nm in the particle diameter contained therein was 58.1%.

The amounts of metal components contained in the metal oxide particles were measured and determined, and as a result, the contents of the metal components in terms of their respective metal oxides were: 66.3% by weight of a titanium constituent as $TiO_2$, 8.1% by weight of a tin constituent as $SnO_2$, 25.4% by weight of a silicon constituent as $SiO_2$, and 0.2% by weight of a potassium constituent as $K_2O$. The specific gravity of the metal oxide particles, as determined from these metal contents, was 3.53.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.530, 1.565, 1.601, 1.649, 1.699 and 1.725, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000023, and also the refractive index of the fine particles exhibiting the minimum value as described above was 2.05. Accordingly, the refractive index of the metal oxide particles was regarded as 2.05. In this connection, the refractive index of the metal oxide particles, as measured by method-B for measuring a refractive index of particles (standard liquid method), was 2.05.

Of the above measurement results, main data relating to the present invention are described in Table 2.

Preparation Example 24

Preparation of Water Dispersion Sol Containing Metal Oxide Particles 7.50 kg of a water dispersion sol (solid content: 2.0% by weight) of fine particles of a titanium-based oxide RCP-5 prepared in the same manner as in Preparation Example 10 was mixed with 57.0 g of an aqueous ammonia having a concentration of 5.0% by weight. Then, the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, the mixed solution was heated to a temperature of 50° C. and stirred for 18 hours.

Next, the resulting mixed solution was cooled down to room temperature. Then methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.88 kg of a water dispersion sol containing metal oxide particles (hereinafter referred to as "RCSP-5") for Comparative Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide.

The refractive index of the silicon dioxide that formed coating layers of the metal oxide particles was 1.45 that was lower than the refractive index of the fine particles of the titanium-based oxide as described above by 1.25.

The thus obtained water dispersion sol containing the metal oxide particles was with a color of milky white and had a turbidity of 21.29 $cm^{-1}$. The average particle diameter of the metal oxide particles contained in the water dispersion sol was 387 nm, and the distribution frequency of coarse particles larger than 100 nm in the particle diameter contained therein was 100%.

The amounts of metal components contained in the metal oxide particles were measured and determined, and as a result, the contents of the metal components in terms of their respective metal oxides were: 79.8% by weight of a titanium constituent as $TiO_2$, and 20.2% by weight of a silicon constituent as $SiO_2$. The specific gravity of the metal oxide particles, as determined from these metal contents, was 3.58.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.527, 1.561, 1.597, 1.638, 1.684 and 1.710, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000006, and also the refractive index of the fine particles exhibiting the minimum value as described above was 2.05.

Accordingly, the refractive index of the metal oxide particles was regarded as 2.05. In this connection, the refractive index of the metal oxide particles, as measured by method-B for measuring a refractive index of particles (standard liquid method), was 2.05.

Of the above measurement results, main data relating to the present invention are described in Table 2.

Preparation Example 25

Preparation of Water Dispersion Sol Containing Metal Oxide Particles 7.50 kg of a water dispersion sol (solid content: 2.0% by weight) of fine particles of a titanium-based oxide RCP-6 prepared in the same manner as in Preparation Example 11 was mixed with 57.0 g of an aqueous ammonia having a concentration of 5.0% by weight. Then, the mixture was mixed with 144.2 g of ethyl orthosilicate (available from Tama Chemicals Co., Ltd.) containing 28% by weight of a silicon constituent in terms of $SiO_2$ and 7.30 kg of methanol (available from Hayashi Pure Chemical Ind., Ltd., methyl alcohol concentration: 99.9% by weight) in such a manner that when the weight of the fine particles of the titanium-based oxide was expressed as "C" and the weight of their coating layers was expressed as "S", the weight ratio (S/C) was 20/100 in terms of the respective metal oxides. Subsequently, the mixed solution was heated to a temperature of 50° C. and stirred for 18 hours.

Next, the resulting mixed solution was cooled down to room temperature. Then, methanol was removed by use of an ultrafiltration membrane (manufactured by Asahi Kasei Corporation, SIP-1013), and the dispersion medium was changed to water. The resulting dispersion was concentrated to prepare a water dispersion sol having a solid content of 20.0% by weight. Thus, 0.88 kg of a water dispersion sol containing metal oxide particles (hereinafter referred to as "RCSP-6") for Comparative Examples was obtained, which metal oxide particles were constituted with the fine particles of the titanium-based oxide and a coating layer formed on a surface each of the fine particles of the titanium-based oxide with a hydrolysate of ethyl orthosilicate, namely, silicon dioxide.

The refractive index of the silicon dioxide that formed coating layers of the metal oxide particles was 1.45 that was lower than the refractive index of the fine particles of the titanium-based oxide as described above by 0.52.

The thus obtained water dispersion sol containing the metal oxide particles was with a color of milky white and had a turbidity of 18.01 $cm^{-1}$. The average particle diameter of the metal oxide particles contained in the water dispersion sol was 300 nm, and the distribution frequency of coarse particles larger than 100 nm in the particle diameter contained therein was 100%.

The amounts of metal components contained in the metal oxide particles were measured and determined, and as a result, the contents of the metal components in terms of their respective metal oxides were: 64.8% by weight of a titanium constituent as $TiO_2$, 20.1% by weight of a tin constituent as $SiO_2$, and 15.1% by weight of an aluminum constituent as $Al_2O_3$. The specific gravity of the metal oxide particles, as determined from these metal contents, was 3.55.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.513, 1.531, 1.543, 1.569, 1.591 and 1.603, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000043, and also the refractive index of the fine particles exhibiting the minimum value as described above was 1.76. Accordingly, the refractive index of the metal oxide particles was regarded as 1.76. In this connection, the refractive index of the metal oxide particles, as measured by method-B for measuring a refractive index of particles (standard liquid method), was 1.75.

Of the above measurement results, main data relating to the present invention are described in Table 2.

Preparation Example 26

Preparation of Water Dispersion Sol Containing Metal Oxide Particles 7.50 kg of a water dispersion sol (solid content: 2.0% by weight) of fine particles of the titanium-based oxide CP-1 prepared in the same manner as in Preparation Example 1 was concentrated by use of an ultrafiltration membrane (manufactured by Asahi Kasei Corporation, SIP-1013) to prepare a water dispersion sol having a solid content of 20.0% by weight. Thus, 1.32 kg of a water dispersion sol containing metal oxide particles (hereinafter referred to as "RCSP-7") for Comparative Examples was obtained, which fine particles of the titanium-based oxide was not coated with a silica-based oxide or a silica-based composite oxide.

The thus obtained water dispersion sol containing the metal oxide particles (i.e., fine particles of a titanium-based oxide) was with a color of transparent milky white and had a turbidity of 6.57 $cm^{-1}$. The average particle diameter of the metal oxide particles contained in the water dispersion sol was 31 nm, and the distribution frequency of coarse particles larger than 100 nm in the particle diameter contained therein was 0%.

The amounts of metal components contained in the metal oxide particles, in terms of their respective metal oxides, were: 84.4% by weight of a titanium constituent as $TiO_2$, 9.9% by weight of a tin constituent as $SnO_2$, 5.3% by weight of a silicon constituent as $SiO_2$, and 0.4% by weight of a potassium constituent as $K_2O$, similarly to the case of the fine particles of the titanium-based oxide CP-1. The specific gravity of the metal oxide particles, as determined from these metal contents, was 4.20.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.544, 1.584, 1.630, 1.683, 1.743 and 1.775, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000167, and also the refractive index of the fine particles exhibiting the minimum value as described above was 2.35. Accordingly, the refractive index of the metal oxide particles was regarded as 2.35.

Of the above measurement results, main data relating to the present invention are described in Table 2.

Preparation Example 27

Preparation of Water Dispersion Sol Containing Metal Oxide Particles 7.50 kg of a water dispersion sol (solid content: 2.0% by weight) of fine particles of a titanium-based oxide CP-2 prepared in the same manner as in Preparation Example 2 was concentrated by use of an ultrafiltration membrane (manufactured by Asahi Kasei Corporation, SIP-1013) to prepare a water dispersion sol having a solid content of 20% by weight. Thus, 1.31 kg of a water dispersion sol containing metal oxide particles (hereinafter referred to as "RCSP-8") for Comparative Examples was obtained, which fine particles of the titanium-based oxide was not coated with a silica-based oxide or a silica-based composite oxide.

The thus obtained water dispersion sol containing the metal oxide particles (i.e., fine particles of a titanium-based oxide) was with a color of transparent milky white and had a turbidity of 6.63 cm$^{-1}$. The average particle diameter of the metal oxide particles contained in the water dispersion sol was 35 nm, and the distribution frequency of coarse particles larger than 100 nm in the particle diameter contained therein was 0%.

The amounts of metal components contained in the metal oxide particles, in terms of their respective metal oxides, were: 88.5% by weight of a titanium constituent as $TiO_2$, 11.1% by weight of a tin constituent as $SnO_2$, and 0.4% by weight of a potassium constituent as $K_2O$, similarly to the case of the fine particles of the titanium-based oxide CP-2. The specific gravity of the metal oxide particles, as determined from these metal contents, was 4.44.

When the weight fractions "m" of the fine particles contained in the coating composition were 10% by weight, 20% by weight, 30% by weight, 40% by weight, 50% by weight and 55% by weight, the refractive indexes "Nav'" of the coating films, as measured by a spectroellipsometer in accordance with the method described in the aforesaid "Method-A for measuring a refractive index of particles", were 1.532, 1.598, 1.622, 1.681, 1.746 and 1.783, respectively. The minimum value of the sum of square of deviation, as determined from the above refractive index "Nav'" and a refractive index "Nav" of the coating film, which is calculated from the conversion formula between a fraction by volume and a fraction by weight and the Maxwell-Garnett's formula, was 0.000421, and also the refractive index of the fine particles exhibiting the minimum value as described above was 2.38. Accordingly, the refractive index of the metal oxide particles was regarded as 2.38.

Of the above measurement results, main data relating to the present invention are described in Table 2.

TABLE 2

| | | | | Properties of fine particles of titanium-based oxide | | | Properties of water dispersion sol | |
|---|---|---|---|---|---|---|---|---|
| | Number of fine particles | Number of titanium-based particles | Component of coating layer | Weight ratio of coating layers/fine particles of titanium-based oxide | Refractive index of coating layer component | Refractive index of fine particles (measuring method-A) | Solid content (wt %) | Turbidity (cm$^{-1}$) |
| Prep. Ex. 12 | CSP-1 | CP-1 | $SiO_2$ | 20/100 | 1.45 | 2.04 | 20.0 | 5.36 |
| Prep. Ex. 13 | CSP-2 | CP-1 | $SiO_2/ZrO_2$ | 25/100 | 1.54 | 2.07 | 20.0 | 5.35 |
| Prep. Ex. 14 | CSP-3 | CP-1 | $SiO_2/ZrO_2$ | 25/100 | 2.11 | 2.21 | 20.0 | 5.34 |
| Prep. Ex. 15 | CSP-4 | CP-1 | $SiO_2/Al_2O_3$ | 25/100 | 1.45 | 2.07 | 20.0 | 5.35 |
| Prep. Ex. 16 | CSP-5 | CP-2 | $SiO_2$ | 20/100 | 1.45 | 2.12 | 20.0 | 5.47 |
| Prep. Ex. 17 | CSP-6 | CP-3 | $SiO_2$ | 20/100 | 1.45 | 2.01 | 20.0 | 5.25 |
| Prep. Ex. 18 | CSP-7 | CP-4 | $SiO_2$ | 20/100 | 1.45 | 2.09 | 20.0 | 5.46 |
| Prep. Ex. 19 | CSP-8 | CP-5 | $SiO_2/ZrO_2$ | 25/100 | 2.11 | 2.31 | 20.0 | 5.63 |
| Prep. Ex. 20 | RCSP-1 | RCP-1 | $SiO_2$ | 20/100 | 1.45 | 1.97 | 20.0 | 8.93 |
| Prep. Ex. 21 | RCSP-2 | RCP-2 | $SiO_2$ | 20/100 | 1.45 | 1.99 | 20.0 | 6.03 |
| Prep. Ex. 22 | RCSP-3 | RCP-3 | $SiO_2$ | 20/100 | 1.45 | 2.24 | 20.0 | 10.64 |
| Prep. Ex. 23 | RCSP-4 | RCP-4 | $SiO_2$ | 20/100 | 1.45 | 2.05 | 20.0 | 16.21 |
| Prep. Ex. 24 | RCSP-5 | RCP-5 | $SiO_2$ | 20/100 | 1.45 | 2.05 | 20.0 | 21.29 |
| Prep. Ex. 25 | RCSP-6 | RCP-6 | $SiO_2$ | 20/100 | 1.45 | 1.76 | 20.0 | 18.01 |
| Prep. Ex. 26 | RCSP-7 | CP-1 | None | 0/100 | — | 2.35 | 20.0 | 6.57 |
| Prep. Ex. 27 | RCSP-8 | CP-2 | None | 0/100 | — | 2.38 | 20.0 | 6.63 |

<Preliminary Evaluation Test 1>

Water dispersion sols containing metal oxide particles "CSP-1", "CSP-2", "CSP-3", "CSP-4", "CSP-5", "CSP-6", "CSP-7" and "CSP-8" prepared in the same manner as in Preparation Examples 12 to 19, respectively, and water dispersion sols containing metal oxide particles "RCSP-1", "RCSP-2", "RCSP-3", "RCSP-4", "RCSP-5", "RCSP-6", "RCSP-7" and "RCSP-8" prepared in the same manner as in Preparation Examples 20 to 27, respectively, were each subjected to the aforesaid "photocatalytic activity test of particles", and the degree of the photocatalytic activity of the metal oxide particles contained in these water dispersion sols was evaluated in advance by the fade change ratio of Sunset Yellow dye used in the test. The evaluation results are described in Table 3.

The results show that the metal oxide particles contained in the water dispersion sols prepared for Examples had photocatalytic activity considerably lower than that of the metal oxide particles contained in the water dispersion sols prepared for Comparative Examples. This shows that if coating compositions are prepared using the water dispersion sols prepared for Examples as starting raw materials, and are applied onto plastic substrates or the like, the coating films obtained will be excellent in weathering resistance.

TABLE 3

| | | Summary of metal oxide particles | | Photocatalytic activity test of particles | |
|---|---|---|---|---|---|
| | Number of fine particles | Number of particles of titanium-based oxide | Component of coating layer | Fade change ratio of dye (%) | Evaluation results |
| Water dispersion sol prepared for Example | CSP-1 | CP-1 | SiO$_2$ | 12 | AA |
| | CSP-2 | CP-1 | SiO$_2$/ZrO$_2$ | 10 | AA |
| | CSP-3 | CP-1 | SiO$_2$/ZrO$_2$ | 7 | AA |
| | CSP-4 | CP-1 | SiO$_2$/Al$_2$O$_3$ | 16 | AA |
| | CSP-5 | CP-2 | SiO$_2$ | 14 | AA |
| | CSP-6 | CP-3 | SiO$_2$ | 13 | AA |
| | CSP-7 | CP-4 | SiO$_2$ | 6 | AA |
| | CSP-8 | CP-5 | SiO$_2$/ZrO$_2$ | 4 | AA |
| Water dispersion sol prepared for Comparative Example | RCSP-1 | RCP-1 | SiO$_2$ | 34 | BB |
| | RCSP-2 | RCP-2 | SiO$_2$ | 28 | BB |
| | RCSP-3 | RCP-3 | SiO$_2$ | 10 | AA |
| | RCSP-4 | RCP-4 | SiO$_2$ | 11 | AA |
| | RCSP-5 | RCP-5 | SiO$_2$ | 44 | BB |
| | RCSP-6 | RCP-6 | SiO$_2$ | 48 | BB |
| | RCSP-7 | CP-1 | None | 89 | CC |
| | RCSP-8 | CP-2 | None | 93 | CC |

<Preliminary Evaluation Test 2>

Water dispersion sols containing metal oxide particles "CSP-1", "CSP-2", "CSP-3", "CSP-4", "CSP-5", "CSP-6", "CSP-7" and "CSP-8" prepared in the same manner as in Preparation Examples 12 to 19, respectively, and water dispersion sols containing metal oxide particles "RCSP-1", "RCSP-2", "RCSP-3", "RCSP-4", "RCSP-5", "RCSP-6", "RCSP-7" and "RCSP-8" prepared in the same manner as in Preparation Examples 20 to 27, respectively, were each subjected to the aforesaid "light resistance test of particles", and the degree of coloration (color change) to blue (i.e., bluing) of the metal oxide particles contained in these water dispersion sols was evaluated in advance by the relationship between the coloration (color change) and the ultraviolet irradiation time used in the test. The evaluation results are described in Table 4.

The results shows that the metal oxide particles contained in the water dispersion sols prepared for Examples hardly brought about coloration (color change) to blue as compared with the metal oxide particles contained in the water dispersion sols prepared for Comparative Examples. This shows that if coating compositions are prepared using the water dispersion sols prepared for Examples as starting raw materials, and are applied onto plastic substrates or the like, coating films obtained will be excellent in light resistance.

TABLE 4

| | | Summary of metal oxide particles | | Light resistance test of particles | |
|---|---|---|---|---|---|
| | Number of fine particles | Number of particles of titanium-based oxide | Component of coating layer | Time before coloration to blue (hr) | Evaluation results |
| Water dispersion sol prepared for Example | CSP-1 | CP-1 | SiO$_2$ | 2 | AA |
| | CSP-2 | CP-1 | SiO$_2$/ZrO$_2$ | 2 | AA |
| | CSP-3 | CP-1 | SiO$_2$/ZrO$_2$ | 3 | AA |
| | CSP-4 | CP-1 | SiO$_2$/Al$_2$O$_3$ | 1 | AA |
| | CSP-5 | CP-2 | SiO$_2$ | 1 | AA |
| | CSP-6 | CP-3 | SiO$_2$ | 1 | AA |
| | CSP-7 | CP-4 | SiO$_2$ | 3 | AA |
| | CSP-8 | CP-5 | SiO$_2$/ZrO$_2$ | 3 | AA |
| Water dispersion sol prepared for Comparative Example | RCSP-1 | RCP-1 | SiO$_2$ | 0.75 | BB |
| | RCSP-2 | RCP-2 | SiO$_2$ | 0.75 | BB |
| | RCSP-3 | RCP-3 | SiO$_2$ | 3 | AA |
| | RCSP-4 | RCP-4 | SiO$_2$ | 3 | AA |
| | RCSP-5 | RCP-5 | SiO$_2$ | 0.5 | BB |
| | RCSP-6 | RCP-6 | SiO$_2$ | 0.5 | BB |
| | RCSP-7 | CP-1 | None | 0.25 | CC |
| | RCSP-8 | CP-2 | None | 0.25 | CC |

Preparation Example 28

Preparation of Methanol Dispersion Sol Containing Metal Oxide Particles 7.00 kg of a water dispersion sol containing metal oxide particles "CSP-1", "CSP-2", "CSP-3", "CSP-4", "CSP-5", "CSP-6", "CSP-7" or "CSP-8" prepared in the same manner as in Preparation Examples 12 to 19 was added to 7.00 kg of a methanol solution in which 134.6 g of tetraethoxysilane (available from Tama Chemicals, Co., Ltd.) was dissolved as a surface treatment agent, while stirring, followed by heating at a temperature of 50° C. for 6 hours.

Next, the resulting mixed solutions were cooled down to room temperature, and then the dispersion medium in each of the solutions was changed from water to methanol (available from Hayashi Pure Chemical Ind., Ltd., methyl alcohol concentration: 99.9% by weight) by use of an ultrafiltration membrane apparatus (filtration membrane manufactured by Asahi Kasei Corporation, SIP-1013). As a result, the solid content of each of the resulting methanol dispersions was about 10.9% by weight, and the water content therein was about 0.3% by weight.

These methanol dispersions were each concentrated by use of an ultrafiltration membrane apparatus to prepare methanol dispersion sols (each amount: 0.70 kg) containing the metal oxide particles "CSP-1", "CSP-2", "CSP-3", "CSP-4", "CSP-5", "CSP-6", "CSP-7" and "CSP-8", respectively, and having a solid content of 20% by weight.

Appearance and turbidity of the thus obtained methanol dispersion sols containing metal oxide particles are described in Table 5.

Preparation Example 29

Preparation of PGM Dispersion Sol Containing Metal Oxide Particles 0.70 kg of a methanol dispersion sol containing metal oxide particles "CSP-1", "CSP-2" or "CSP-5" prepared in the same manner as in Preparation Example 28 was placed in a flask for a rotary evaporator (R-124 manufactured by BUCHI Co.), and 0.56 kg of propylene glycol monomethyl ether (PGM) was further placed in the flask.

Subsequently, the rotary evaporator was driven to rotate the flask at a rotating speed of 50 rpm under the conditions of a temperature of 60° C. and a reduced pressure of −0.035 MPa. The organic solvent (i.e., methanol) used above came to be evaporated, and then was cooled and exhausted out of the system.

This operation was continued for 1 hour to obtain PGM dispersion sols wherein methanol contained in the methanol dispersion sols was replaced with propylene glycol monomethyl ether (PGM) (solvent replacement). Moreover, the content of propylene glycol monomethyl ether (PGM) was controlled to obtain PGM dispersion sols (each amount: 0.56 kg) containing metal oxide particles "CSP-1", "CSP-2" and "CSP-5", respectively, and having a solid content of 20% by weight.

Appearance and turbidity of the thus obtained PGM dispersion sols containing metal oxide particles are described in Table 5.

Preparation Example 30

Preparation of Methanol Dispersion Sol Containing Metal Oxide Particles 7.00 kg of a water dispersion sol containing metal oxide particles "RCSP-1", "RCSP-2", "RCSP-3", "RCSP-4", "RCSP-5", "RCSP-6", "RCSP-7" or "RCSP-8" prepared in the same manner as in Preparation Examples 20 to 27 was added to 7.00 kg of a methanol solution in which 134.6 g of tetraethoxysilane (available from Tama Chemicals, Co., Ltd.) was dissolved as a surface treatment agent, while stirring, followed by heating at a temperature of 50° C. for 6 hours.

Next, the resulting mixed solutions were cooled down to room temperature, and then the dispersion medium in each of the solutions was changed from water to methanol (available from Hayashi Pure Chemical Ind., Ltd., methyl alcohol concentration: 99.9% by weight) by use of an ultrafiltration membrane apparatus (filtration membrane manufactured by Asahi Kasei Corporation, SIP-1013). As a result, the solid content of each of the resulting methanol dispersions was about 10.9% by weight, and the water content therein was about 0.3% by weight.

These methanol dispersions were each concentrated by use of an ultrafiltration membrane apparatus to prepare methanol dispersion sols (each amount: 0.70 kg) containing the metal oxide particles "RCSP-1", "RCSP-2", "RCSP-3", "RCSP-4", "RCSP-5", "RCSP-6", "RCSP-7" and "RCSP-8", respectively, and having a solid content of 20% by weight.

Appearance and turbidity of the thus obtained methanol dispersion sols containing metal oxide particles are described in Table 5.

TABLE 5

| | | Summary of metal oxide particles | | | Properties of organic solvent sol | | |
|---|---|---|---|---|---|---|---|
| | Number of fine particles | Number of particles of titanium-based oxide | Component of coating layer | Organic solvent used | Appearance | Turbidity (cm$^{-1}$) | |
| Prep. Ex. 28 | CSP-1 | CP-1 | SiO$_2$ | Methanol | Transparent milky white | 5.32 | |
| | CSP-2 | CP-1 | SiO$_2$/ZrO$_2$ | Methanol | Transparent milky white | 5.48 | |
| | CSP-3 | CP-1 | SiO$_2$/ZrO$_2$ | Methanol | Transparent milky white | 5.36 | |
| | CSP-4 | CP-1 | SiO$_2$/Al$_2$O$_3$ | Methanol | Transparent milky white | 5.31 | |
| | CSP-5 | CP-2 | SiO$_2$ | Methanol | Transparent milky white | 5.25 | |
| | CSP-6 | CP-3 | SiO$_2$ | Methanol | Transparent milky white | 5.12 | |
| | CSP-7 | CP-4 | SiO$_2$ | Methanol | Transparent milky white | 5.08 | |
| | CSP-8 | CP-5 | SiO$_2$/ZrO$_2$ | Methanol | Transparent milky white | 5.33 | |
| Prep. Ex. 29 | CSP-1 | CP-1 | SiO$_2$ | PGM | Transparent milky white | 4.64 | |
| | CSP-2 | CP-1 | SiO$_2$/ZrO$_2$ | PGM | Transparent milky white | 4.31 | |
| | CSP-5 | CP-2 | SiO$_2$ | PGM | Transparent milky white | 4.13 | |
| Prep. Ex. 30 | RCSP-1 | RCP-1 | SiO$_2$ | Methanol | Transparent milky white | 8.98 | |
| | RCSP-2 | RCP-2 | SiO$_2$ | Methanol | Transparent milky white | 6.37 | |
| | RCSP-3 | RCP-3 | SiO$_2$ | Methanol | Milky white | 10.19 | |
| | RCSP-4 | RCP-4 | SiO$_2$ | Methanol | Milky white | 15.93 | |
| | RCSP-5 | RCP-5 | SiO$_2$ | Methanol | Milky white | 20.97 | |
| | RCSP-6 | RCP-6 | SiO$_2$ | Methanol | Milky white | 17.45 | |
| | RCSP-7 | CP-1 | None | Methanol | Transparent milky white | 7.02 | |
| | RCSP-8 | CP-2 | None | Methanol | Transparent milky white | 7.31 | |

Example 1

Preparation (1) of Coating Composition for Optical Substrate (Coating Composition for Forming Film of Hard Coat Layer)

Plural containers were prepared in a state that the respective containers were charged with a mixed solution of 114 g of γ-glycidoxypropyltrimethoxysilane (Z-6040 available from Dow Corning Toray Co., Ltd.), 29 g of γ-glycidoxypropylmethyldiethoxysilane (Z-6042 available from Dow Corning Toray Co., Ltd.) and 71 g of methanol (available from Hayashi Pure Chemical Ind., Ltd., methyl alcohol concentration: 99.9% by weight). To each of these mixed solutions, 36 g of a 0.01N aqueous solution of hydrochloric acid was dropwise added while stirring. These mixed solutions were stirred for one day and night at room temperature to perform hydrolysis of the silane compounds.

Subsequently, each of these containers containing the liquid obtained after the hydrolysis was further charged with 71 g of pure water, 3 g of tris(2,4-pentanedionato)aluminum (III) (available from Tokyo Chemical Industry Co., Ltd.), 0.7 g of a silicone-based surface active agent (L-7001 available from Dow Corning Toray Co., Ltd.) as a leveling agent and any one of the methanol dispersion sol (solid content: 20% by weight) prepared in Preparation Example 28, which was used in amounts of: 490 g in the case that the methanol dispersion sol contained the metal oxide particles "CSP-1", "CSP-2", "CSP-4", "CSP-5", "CSP-6" or "CSP-7" having a refractive index of less than 2.20; and 450 g in the case that the methanol dispersion sol contained the metal oxide particles "CSP-3" or "CSP-8" having a refractive index of 2.20 or more. The respective mixtures obtained were then stirred for one day and night at room temperature. Thus, coating compositions for forming a film of a hard coat layer "HX-1(1)", "HX-2 (1)", "HX-3 (1)", "HX-4 (1)", "HX-5 (1)", "HX-6 (1)", "HX-7 (1)" and "HX-8 (1)" were prepared as coating compositions for optical substrate, and contained the metal oxide particles "CSP-1", "CSP-2", "CSP-3", "CSP-4", "CSP-5", "CSP-6", "CSP-7" and "CSP-8", respectively.

Comparative Example 1

Preparation (2) of Coating Composition for Optical Substrate (Coating Composition for Forming Film of Hard Coat Layer)

Plural containers were prepared in a state that the respective containers were charged with a mixed solution of 114 g of γ-glycidoxypropyltrimethoxysilane (Z-6040 available from Dow Corning Toray Co., Ltd.), 29 g of γ-glycidoxypropylmethyldiethoxysilane (Z-6042 available from Dow Corning Toray Co., Ltd.) and 71 g of methanol (available from Hayashi Pure Chemical Ind., Ltd., methyl alcohol concentration: 99.9% by weight). To each of these mixed solutions, 36 g of a 0.01N aqueous solution of hydrochloric acid was dropwise added while stirring. These mixed solutions were stirred for one day and night at room temperature to perform hydrolysis of the silane compounds.

Subsequently, each of these containers containing the liquid obtained after the hydrolysis was further charged with 71 g of pure water, 3 g of tris(2,4-pentanedionato)aluminum (III) (available from Tokyo Chemical Industry Co., Ltd.), 0.7 g of a silicone-based surface active agent (L-7001 available from Dow Corning Toray Co., Ltd.) as a leveling agent, and any one of the methanol dispersion sols (solid content: 20% by weight) prepared in Preparation Example 30, which was used in amounts of: 490 g in the case that the methanol dispersion sol contained the metal oxide particles "RCSP-1", "RCSP-2", "RCSP-4", "RCSP-5" or "RCSP-6" having a refractive index of less than 2.20; and 450 g in the case that the methanol dispersion sol contained the metal oxide particles "RCSP-3", "RCSP-7" or "RCSP-8" having a refractive index of 2.20 or more. The respective mixtures were then stirred for one day and night at room temperature. Thus, coating compositions for forming a film of a hard coat layer "HY-1(1)", "HY-2 (1)", "HY-3 (1)", "HY-4 (1)", "HY-5 (1)", "HY-6 (1)", "HY-7 (1)" and "HY-8 (1)" were prepared as coating compositions for optical substrate, and contained the metal oxide particles "RCSP-1", "RCSP-2", "RCSP-3", "RCSP-4", "RCSP-5", "RCSP-6", "RCSP-7" and "RCSP-8", respectively.

Example 2

Preparation (3) of Coating Composition for Optical Substrate (Coating Composition for Forming Film of Hard Coat Layer)

Plural containers were prepared in a state that the respective containers were charged with a mixed solution of 135 g of γ-glycidoxypropyl trimethoxysilane (Z-6040 available from Dow Corning Toray Co., Ltd.) and 50 g of methanol (available from Hayashi Pure Chemical Ind., Ltd., methyl alcohol concentration: 99.9% by weight). To each of these mixed solutions, 35 g of a 0.01N aqueous solution of hydrochloric acid was dropwise added while stirring. These mixed solutions were stirred for one day and night at room temperature to perform hydrolysis of the silane compound.

Subsequently, each of these containers containing the liquid obtained after the hydrolysis was further charged with 4 g of tris(2,4-pentanedionato)iron (III) (available from Tokyo Chemical Industry Co., Ltd.), 8 g of glycerol polyglycidyl ether (Denacol EX-314 available from Nagase Chemical Industry Co., Ltd., epoxy equivalent: 145), 0.5 g of a silicone-based surface active agent (L-7001 available from Dow Corning Toray Co., Ltd.) as a leveling agent, any one of the methanol dispersion sols (solid content: 20% by weight) prepared in Preparation Example 28, which was used in amounts of: 490 g in the case that the methanol dispersion sol contained the metal oxide particles "CSP-1", "CSP-2", "CSP-4", "CSP-5", "CSP-6" or "CSP-7" having a refractive index of less than 2.20; and 450 g in the case that the methanol dispersion sol contained the metal oxide particles "CSP-3" or "CSP-8" having a refractive index of 2.20 or more. The respective mixtures obtained were stirred for one day and night at room temperature. Thus, coating compositions for forming a film of a hard coat layer "HX-1(2)", "HX-2 (2)", "HX-3 (2)", "HX-4 (2)", "HX-5 (2)", "HX-6 (2)", "HX-7 (2)" and "HX-8 (2)" were prepared as coating compositions for optical substrate, and contained the metal oxide particles "CSP-1", "CSP-2", "CSP-3", "CSP-4", "CSP-5", "CSP-6", "CSP-7" and "CSP-8", respectively.

Comparative Example 2

Preparation (4) of Coating Composition for Optical Substrate (Coating Composition for Forming Film of Hard Coat Layer)

Plural containers were prepared in a state that the respective containers were charged with a mixed solution of 135 g of γ-glycidoxypropyltrimethoxysilane (Z-6040 available from Dow Corning Toray Co., Ltd.) and 50 g of methanol (available from Hayashi Pure Chemical Ind., Ltd., methyl alcohol concentration: 99.9% by weight). To each of these mixed solutions, 25 g of a 0.01N aqueous solution of hydrochloric acid was dropwise added while stirring. These mixed solutions were stirred for one day and night at room temperature to perform hydrolysis of the silane compound.

Subsequently, each of these containers containing the liquid obtained after the hydrolysis was further charged with 4 g of tris(2,4-pentanedionato)iron (III) (available from Tokyo Chemical Industry Co., Ltd.), 8 g of glycerol polyglycidyl ether (Denacol EX-314 available from Nagase Chemical Industry Co., Ltd., epoxy equivalent: 145), 0.5 g of a silicone-based surface active agent (L-7001 available from Dow Corning Toray Co., Ltd.) as a leveling agent, and any one of the methanol dispersion sols (solid content: 20% by weight) prepared in Preparation Example 30, which was used in amounts of: 490 g in the case that the methanol dispersion sol contained the metal oxide particles "RCSP-1", "RCSP-2", "RCSP-4", "RCSP-5" or "RCSP-6" having a refractive index of less than 2.20; and 450 g in the case that the methanol dispersion sol contained the metal oxide particles "RCSP-3", "RCSP-7" or "RCSP-8" having a refractive index of 2.20 or more. The respective mixtures obtained were stirred for one day and night at room temperature. Thus, coating compositions for forming a film of a hard coat layer "HY-1(2)", "HY-2 (2)", "HY-3 (2)", "HY-4 (2)", "HY-5 (2)", "HY-6 (2)", "HY-7 (2)" and "HY-8 (2)" were prepared as coating compositions for optical substrate, and contained the metal oxide particles "RCSP-1", "RCSP-2", "RCSP-3", "RCSP-4", "RCSP-5", "RCSP-6", "RCSP-7" and "RCSP-8", respectively.

Example 3

Preparation (5) of Coating Composition for Optical Substrate (Coating Composition for Film of Hard Coat Layer)

Plural containers were prepared in a state that the respective containers were charged with a mixed solution of 135 g of γ-glycidoxypropyltrimethoxysilane (Z-6040 available from Dow Corning Toray Co., Ltd.) and 71 g of methanol (available from Hayashi Pure Chemical Ind., Ltd., methyl alcohol concentration: 99.9% by weight). To each of these mixed solutions, 36 g of a 0.01N aqueous solution of hydrochloric acid was dropwise added while stirring. These mixed solutions were stirred for one day and night at room temperature to perform hydrolysis of the silane compound.

Subsequently, each of these containers containing the liquid obtained after the hydrolysis was further charged with 450 g of the propylene glycol monomethyl ether (PGM) dispersion sol (solid content: 20% by weight) containing the metal oxide particles "CSP-1", "CSP-2" or "CSP-5" prepared in Preparation Example 29, 71 g of pure water, 3 g of tris(2,4-pentanedionato)aluminum (III) (available from Tokyo Chemical Industry Co., Ltd.), 7 g of glycerol polyglycidyl ether (Denacol EX-314 available from Nagase Chemical Industry Co., Ltd., epoxy equivalent: 145) and 0.7 g of a silicone-based surface active agent (L-7001 available from Dow Corning Toray Co., Ltd.) as a leveling agent. The respective mixtures obtained were stirred for one day and night at room temperature. Thus, coating compositions for forming a film of a hard coat layer "HX-1(3)", "HX-2 (3)" and "HX-5 (3)" were prepared as coating compositions for optical substrate, and contained the metal oxide particles "CSP-1", "CSP-2" and "CSP-5", respectively.

Example 4 and Comparative Example 3

Preparation (6) of Coating Composition for Optical Substrate (Coating Composition for Forming Film of Hard Coat Layer)

Plural containers were prepared in a state that the respective containers were charged with a mixed solution of 100 g of γ-glycidoxypropyltrimethoxysilane (Z-6040 available from Dow Corning Toray Co., Ltd.) and 50 g of methanol (available from Hayashi Pure Chemical Ind., Ltd., methyl alcohol concentration: 99.9% by weight). To each of these mixed solutions, 25 g of a 0.01N aqueous solution of hydrochloric acid was dropwise added while stirring. These mixed solutions were stirred for one day and night at room temperature to perform hydrolysis of the silane compound.

Subsequently, each of these containers containing the liquid obtained after the hydrolysis was further charged with 30 g, 200 g, 600 g or 900 g of the methanol dispersion sol (solid content: 20% by weight) containing the metal oxide particles "CSP-1" prepared in Preparation Example 28, 3 g of tris(2,4-pentanedionato)iron (III) (available from Tokyo Chemical Industry Co., Ltd.) and 0.5 g of a silicone-based surface active agent (L-7001 available from Dow Corning Toray Co., Ltd.) as a leveling agent. The respective mixtures obtained were stirred for one day and night at room temperature. Thus, coating compositions for forming a film of a hard coat layer HX-1(4a), HX-1(5a), HX-1(5b) and HX-1(4b) were prepared as coating compositions for optical substrate.

The coating compositions for forming a film of a hard coat layer HX-1(5a) and HX-1(5b) were coating materials for Examples, and when the weight of a silicon constituent contained in the coating material, in terms of $SiO_2$, was expressed as "X" and the weight of the metal oxide particles with a high refractive index was expressed as "Y", the weight ratios (X/Y) in HX-1(5a) and HX-1(5b) were 64/36 and 47/53, respectively. On the other hand, the coating compositions for forming a film of a hard coat layer HX-1(4a) and HX-1(4b) were coating materials for Comparative Examples, and when the weight of a silicon constituent contained in the coating material, in terms of $SiO_2$, was expressed as "X" and the weight of the metal oxide particles with a high refractive index was expressed as "Y", the weight ratios (X/Y) in HX-1 (4a) and HX-1(4b) were 92/8 and 28/72, respectively.

Example 5

Preparation (7) of Coating Composition for Optical Substrate (Coating Composition for Forming Film of Hard Coat Layer)

Plural containers were prepared in a state that the respective containers were charged with a mixed solution of 135 g of γ-glycidoxypropyltrimethoxysilane (Z-6040 available from Dow Corning Toray Co., Ltd.) and 50 g of methanol (available from Hayashi Pure Chemical Ind., Ltd., methyl alcohol concentration: 99.9% by weight). To each of these mixed solutions, 35 g of a 0.01N aqueous solution of hydrochloric acid was dropwise added while stirring. These mixed solutions were stirred for one day and night at room temperature to perform hydrolysis of the silane compound.

Subsequently, each of these containers containing the liquid obtained after the hydrolysis was further charged with 4 g of tris(2,4-pentanedionato)iron (III) (available from Tokyo Chemical Industry Co., Ltd.), 8 g of glycerol polyglycidyl ether (Denacol EX-314 available from Nagase Chemical Industry Co., Ltd., epoxy equivalent: 145), 0.5 g of a silicone-based surface active agent (L-7001 available from Dow Corning Toray Co., Ltd.) as a leveling agent, and any one of the methanol dispersion sols (solid content: 20% by weight) prepared in Preparation Example 28, which was used in amounts of: 600 g in the case that the methanol dispersion sol contained the metal oxide particles "CSP-1", "CSP-2", "CSP-4", "CSP-5", "CSP-6" or "CSP-7" having a refractive index of less than 2.20; and 550 g in the case that the methanol dispersion sol contained the metal oxide particles "CSP-3" or "CSP-8" having a refractive index of 2.20 or more. The respective mixtures obtained were stirred for one day and night at room temperature. Thus, coating compositions for forming a film of a hard coat layer "HX-1(6)", "HX-2(6)", "HX-3(6)", "HX-4(6)", "HX-5 (6)", "HX-6 (6)", "HX-7 (6)" and "HX-8 (6)" were prepared as coating compositions for optical substrate, and contained the metal oxide particles "CSP-1", "CSP-2", "CSP-3", "CSP-4", "CSP-5", "CSP-6", "CSP-7" and "CSP-8", respectively.

Comparative Example 4

Preparation (8) of Coating Composition for Optical Substrate (Coating Composition for Forming Film of Hard Coat Layer)

Plural containers were prepared in a state that the respective containers were charged with a mixed solution of 135 g of γ-glycidoxypropyl trimethoxysilane (Z-6040 available from Dow Corning Toray Co., Ltd.) and 50 g of methanol (available from Hayashi Pure Chemical Ind., Ltd., methyl alcohol concentration: 99.9% by weight). To each of these mixed solutions, 25 g of a 0.01N aqueous solution of hydrochloric acid was dropwise added while stirring. These mixed solutions were stirred for one day and night at room temperature to perform hydrolysis of the silane compound.

Subsequently, each of these containers containing the liquid obtained after the hydrolysis was further charged with 4 g of tris(2,4-pentanedionato)iron (III) (available from Tokyo Chemical Industry Co., Ltd.), 8 g of glycerol polyglycidyl ether (Denacol EX-314 available from Nagase Chemical Industry Co., Ltd., epoxy equivalent: 145), 0.5 g of a silicone-based surface active agent (L-7001 available from Dow Corning Toray Co., Ltd.) as a leveling, and any one of the methanol dispersion sols (solid content: 20% by weight) prepared in Preparation Example 30, which was used in amounts of: 600 g in the case that the methanol dispersion sol contained the metal oxide particles "RCSP-1", "RCSP-2", "RCSP-4", "RCSP-5" or "RCSP-6" having a refractive index of less than 2.20; and 550 g in the case that the methanol dispersion sol contained the metal oxide particles "RCSP-3", "RCSP-7" or "RCSP-8" having a refractive index of 2.20 or more. The respective mixtures obtained were stirred for one day and night at room temperature. Thus, coating compositions for forming a film of a hard coat layer "HY-1(6)", "HY-2 (6)", "HY-3 (6)", "HY-4 (6)", "HY-5 (6)", "HY-6 (6)", "HY-7 (6)" and "HY-8 (6)" were prepared as coating compositions for optical substrate, and contained the metal oxide particles "RCSP-1", "RCSP-2", "RCSP-3", "RCSP-4", "RCSP-5", "RCSP-6", "RCSP-7" and "RCSP-8", respectively.

Example 6

Preparation (7) of Coating Composition for Optical Substrate (Coating Composition for Forming a Film of a Primer Layer)

Plural containers were prepared in a state that the respective containers were charged with 170 g of a polyurethane emulsion "Superflex 150" (available from DAI-ICHI KOGYO SEIYAKU CO., LTD., water dispersion type urethane elastomer, solid content: 30%) which was a commercially available thermoplastic resin. Then, each of these containers was further charged with 110 g of pure water and any one of the methanol dispersion sols (solid content: 20% by weight) prepared in Preparation Example 28, which was used in amounts of: 410 g in the case that the methanol dispersion sol containing the metal oxide particles "CSP-1", "CSP-2", "CSP-4", "CSP-5", "CSP-6" or "CSP-7" having a refractive index of less than 2.20; and 395 g in the case that the methanol dispersion sol containing the metal oxide particles "CSP-3" or "CSP-8" having a refractive index of 2.20 or more. The respective mixtures obtained were stirred for 1 hour.

Subsequently, to each of these mixed liquids, 500 g of methanol (available from Hayashi Pure Chemical Ind., Ltd., methyl alcohol concentration: 99.9% by weight) and 0.3 g of a silicone-based surface active agent (L-7604 available from Dow Corning Toray Co., Ltd.) as a leveling agent were added, and the resulting mixture was stirred for one day and night at room temperature. Thus, coating compositions for forming a film of a primer layer "PX-1(1)", "PX-2 (1)", "PX-3 (1)", "PX-4 (1)", "PX-5 (1)", "PX-6 (1)", "PX-7 (1)" and "PX-8 (1)" were prepared as coating compositions for optical substrate, and contained the metal oxide particles "CSP-1", "CSP-2", "CSP-3", "CSP-4", "CSP-5", "CSP-6", "CSP-7" and "CSP-8", respectively.

Comparative Example 5

Preparation (8) of Coating Composition for Optical Substrate (Coating Composition for Forming a Film of a Primer Layer)

Plural containers were prepared in a state that the respective containers were charged with 170 g of a polyurethane emulsion "Superflex 150" (available from DAI-ICHI KOGYO SEIYAKU CO., LTD., water dispersion type urethane elastomer, solid content: 30%) which was a commercially available thermoplastic resin. Then, each of these containers was further charged with 110 g of pure water and any one of the methanol dispersion sols (solid content: 20% by weight) prepared in Preparation Example 30, which was used in amounts of: 430 g in the case that the methanol dispersion sol contained the metal oxide particles "RCSP-1", "RCSP-2", "RCSP-4", "RCSP-5" or "RCSP-6" having a refractive index of less than 2.20; and 395 g in the case that the methanol dispersion sol contained the metal oxide particles "RCSP-3", "RCSP-7" or "RCSP-8" having a refractive index of 2.20 or more. The respective mixtures obtained were stirred for 1 hour.

Subsequently, to each of these mixed liquids, 500 g of methanol (available from Hayashi Pure Chemical Ind., Ltd., methyl alcohol concentration: 99.9% by weight) and 0.3 g of a silicone-based surface active agent (L-7604 available from Dow Corning Toray Co., Ltd.) as a leveling agent were added, and the resulting mixture was stirred for one day and night at room temperature. Thus, coating compositions for forming a film of a primer layer "PY-1(1)", "PY-2 (1)", "PY-3 (1)", "PY-4 (1)", "PY-5 (1)", "PY-6 (1)", "PY-7 (1)" and "PY-8 (1)" were prepared as coating compositions for optical substrate, and contained the metal oxide particles "RCSP-1", "RCSP-2", "RCSP-3", "RCSP-4", "RCSP-5", "RCSP-6", "RCSP-7" and "RCSP-8", respectively.

Example 7 and Comparative Example 6

Preparation (9) of Coating Composition for Optical Substrate (Coating Composition for Forming a Film of a Primer Layer)

Plural containers were prepared in a state that the respective containers were charged with 170 g of a polyurethane emulsion "Superflex 150" (available from DAI-ICHI KOGYO SEIYAKU CO., LTD., water dispersion type urethane elastomer, solid content: 30%) which was a commercially available thermoplastic resin. Then, each of these containers was further charged with 20 g, 200 g, 500 g or 900 g of the methanol dispersion sol (solid content: 20% by weight) containing the metal oxide particles "CSP-1" prepared in Preparation Example 28 and 110 g of pure water. The respective mixtures obtained were stirred for 1 hour.

Subsequently, to each of these mixed liquids, 500 g of methanol (available from Hayashi Pure Chemical Ind., Ltd., methyl alcohol concentration: 99.9% by weight) and 0.3 g of a silicone-based surface active agent (L-7604 available from Dow Corning Toray Co., Ltd.) as a leveling agent were added, and the resulting mixture was stirred for one day and night at room temperature. Thus, coating compositions for forming a film of a primer layer "PX-1(2a)", "PX-1(3a)", "PX-1(3b)" and "PX-1(2b)" were prepared as coating compositions for optical substrate.

The coating compositions for forming a film of a primer layer "PX-1(3a)" and "PX-1(3b)" were coating materials for Examples, and when the weight of the thermoplastic resin contained in the coating material was expressed as "A" and the weight of the metal oxide particles with a high refractive index was expressed as "B", the weight ratios (A/B) in "PX-1(3a)" and "PX-1(3b)" were 56/44 and 34/66, respectively. On the other hand, the coating compositions for forming a film of a primer layer "PX-1(2a)" and "PX-1(2b)" were coating materials for Comparative Examples, and when the weight of the thermoplastic resin contained in the coating material was expressed as "A" and the weight of the metal oxide particles with a high refractive index was expressed as "B", the weight ratios (A/B) in "PX-1(2a)" and "PX-1(2b)" were 93/7 and 22/78, respectively.

Example 8

Preparation (10) of Coating Composition for Optical Substrate (Coating Composition for Forming a Film of a Primer Layer)

Plural containers were prepared in a state that the respective containers were charged with 17 g of a commercially available modified melamine compound "Mirbane Resin SM850" (available from Showa Highpolymer Co., Ltd., melamine-formaldehyde polycondensate) and 650 g of propylene glycol monomethyl ether (available from Dow Chemical Japan Ltd.). To each of these containers, 43 g of commercially available polyester polyol "Niporan 131" (available from Nippon Polyurethane Industry Co., Ltd., hydroxyl value: 142 to 160 KOHmg/g) was added, and the mixture was stirred until the melamine compound and the polyester polyol were dissolved.

Subsequently, each of these containers was further charged with any one of the methanol dispersion sols (solid content: 20% by weight) prepared in Preparation Example 28, which was used in amounts of: 300 g in the case that the methanol dispersion sol contained the metal oxide particles "CSP-1", "CSP-2", "CSP-4", "CSP-5", "CSP-6" or "CSP-7" having a refractive index of less than 2.20; and 275 g in the case that the methanol dispersion sol contained the metal oxide particles "CSP-3" or "CSP-8" having a refractive index of 2.20 or more. The respective mixtures obtained were stirred for 1 hour. Then, to each of the mixed liquids, 0.5 g of paratoluenesulfonic acid and 0.3 g of a silicone-based surface active agent (L-7001 available from Dow Corning Toray Co., Ltd.) as a leveling agent were added, and the resulting mixture was stirred for one day and night at room temperature. Thus, coating compositions for forming a film of a primer layer "QX-1(1)", "QX-2(1)", "QX-3(1)", "QX-4(1)", "QX-5(1)", "QX-6(1)", "QX-7(1)" and "QX-8(1)" were prepared as coating compositions for optical substrate, and contained the metal oxide particles "CSP-1", "CSP-2", "CSP-3", "CSP-4", "CSP-5", "CSP-6", "CSP-7" and "CSP-8", respectively.

Comparative Example 7

Preparation (11) of Coating Composition for Optical Substrate (Coating Composition for Forming a Film of a Primer Layer)

Plural containers were prepared in a state that the respective containers were charged with 17 g of a commercially available modified melamine compound "Mirbane Resin SM850" (available from Showa Highpolymer Co., Ltd., melamine-formaldehyde polycondensate) and 650 g of propylene glycol monomethyl ether (available from Dow Chemical Japan Ltd.). To each of these containers, 43 g of commercially available polyester polyol "Niporan 131" (available from Nippon Polyurethane Industry Co., Ltd., hydroxyl value: 142 to 160 KOHmg/g) was added, and the mixture was stirred until the melamine compound and the polyester polyol were dissolved.

Subsequently, each of these containers was further charged with any one of the methanol dispersion sols (solid content: 20% by weight) prepared in Preparation Example 30, which was used in amounts of: 300 g in the case that the methanol dispersion sol contained the metal oxide particles "RCSP-1", "RCSP-2", "RCSP-4", "RCSP-5" or "RCSP-6" having a refractive index of less than 2.20; and 275 g in the case that the methanol dispersion sol contained the metal oxide particles "RCSP-3", "RCSP-7" or "RCSP-8" having a refractive index of 2.20 or more. The respective mixtures obtained were stirred for 1 hour. Then, to each of the mixed liquids, 0.5 g of paratoluenesulfonic acid and 0.3 of a silicone-based surface active agent (L-7001 available from Dow Corning Toray Co., Ltd.) as a leveling agent were added, and the resulting mixture was stirred for one day and night at room temperature. Thus, coating compositions for forming a film of a primer layer "QY-1(1)", "QY-2 (1)", "QY-3 (1)", "QY-4 (1)", "QY-5 (1)", "QY-6 (1)", "QY-7 (1)" and "QY-8 (1)" were prepared as coating compositions for optical substrate, and contained the metal oxide particles "RCSP-1", "RCSP-2", "RCSP-3", "RCSP-4", "RCSP-5", "RCSP-6", "RCSP-7" and "RCSP-8", respectively.

Example 9 and Comparative Example 8

Preparation (12) of Coating Composition for Optical Substrate (Coating Composition for Forming a Film of a Primer Layer)

Plural containers were prepared in a state that the respective containers were charged with 17 g of a commercially available modified melamine compound "Mirbane Resin SM850" (available from Showa Highpolymer Co., Ltd., melamine-formaldehyde polycondensate) and 650 g of propylene glycol monomethyl ether (available from Dow Chemical Japan Ltd.). To each of them, 43 g of commercially available polyester polyol "Niporan 131" (available from Nippon Polyurethane Industry Co., Ltd., hydroxyl value: 142 to 160 KOHmg/g) was added, and the mixture was stirred until the melamine compound and the polyester polyol were dissolved.

Subsequently, each of these containers was further charged with 20 g, 200 g, 400 g or 800 g of the methanol dispersion sol (solid content: 20% by weight) containing the "CSP-1". The respective mixtures obtained were stirred for 1 hour.

Subsequently, to each of these mixed liquids, 0.5 g of paratoluenesulfonic acid and 0.3 g of a silicone-based surface active agent (L-7001 available from Dow Corning Toray Co., Ltd.) as a leveling agent were added, and the resulting mixture was stirred for one day and night at room temperature. Thus, compositions for forming a film of a primer layer "QX-1(2a)", "QX-1(3a)", "QX-1(3b)" and "QX-1(2b)" were prepared as coating compositions for optical substrate.

The coating compositions for forming a film of a primer layer "QX-1(3a)" and "QX-1(3b)" were coating materials for Examples, and when the weight of the thermosetting resin contained in the coating material was expressed as "A" and the weight of the metal oxide particles with a high refractive index was expressed as "B", the weight ratios (A/B) in "QX-1(3a)" and "QX-1(3b") were 59/41 and 41/59, respectively. On the other hand, the coating compositions for forming a film of a primer layer "QX-1(2a)" and "QX-1(2b)" were coating materials for Comparative Examples, and when the weight of the thermoplastic resin contained in the coating material was expressed as "A" and the weight of the metal oxide particles with a high refractive index was expressed as "B", the weight ratios (A/B) in "QX-1(2a)" and "QX-1(2b)" were 93/7 and 26/74, respectively.

Preparation Example 31

Preparation (1) of Plastic Lens Substrate for Test (1) Pretreatment of Plastic Lens Substrate
A necessary number of commercially available plastic lens substrates were prepared for the following tests and evaluations, specifically, "MR-174 (monomer name)" (available from Mitsui Chemicals, Inc., refractive index of substrate: 1.74), "MR-7 (monomer name)" (available from Mitsui Chemicals, Inc., refractive index of substrate: 1.67) and "MR-8 (monomer name)" (available from Mitsui Chemicals, Inc., refractive index of substrate: 1.60).

Subsequently, these plastic lens substrates were immersed for 2 minutes in an aqueous solution of KOH having a concentration of 10% by weight and kept at 40° C. to perform etching treatment. Then, these substrates were taken out, washed with water, and then sufficiently dried.
(2) Formation of Film of Hard Coat Layer
To surfaces of the above plastic lens substrates, the coating compositions for forming a film of a hard coat layer (coating materials for hard coat) obtained in Examples 1 to 4 and Comparative Examples 1 to 3 were applied, respectively, to form coating films. The application of the coating compositions was carried out by a dipping method (pulling rate: 300 minutes).

Next, the coating films were dried at 90° C. for 10 minutes, and then treated under 110° C. for 2 hours to perform curing of the coating films (hard coat layers).

The thickness of each of the thus formed films of a hard coat layer after curing was approx. 2.0 to 2.8 m.

(3) Formation of Antireflection Layer Film
On the surface of each of the films of a hard coat layer, inorganic oxide components of the following constitution were deposited by vacuum deposition. Here, layers of an antireflection layer film were formed in order of laminated layers of $SiO_2$ (0.06λ), $ZrO_2$ (0.15λ), $SiO_2$ (0.04λ), $ZrO_2$ (0.25λ) and $SiO_2$ (0.25λ) from the hard coat layer side to the atmosphere side. The design wavelength λ was 520 nm.

Preparation Example 32

Preparation (2) of Plastic Lens Substrate for Test (1) Pretreatment of Plastic Lens Substrate
Pretreatment of plastic substrates was carried out under the same conditions as in Preparation Example 31.
(2) Formation of Film of Primer Layer
To surfaces of the above plastic lens substrates, the coating compositions for forming a film of a primer layer (coating materials for primer) obtained in Examples 6 to 9 and Comparative Examples 5 to 8 were applied, respectively, to form coating films. The application of the coating compositions was carried out by a dipping method (pulling rate: 150 mm/min).

Next, the coating films were treated under 100° C. for 10 minutes to perform preliminary curing of the coating films (primer layers).

The thickness of each of the thus formed primer layers after preliminary curing was approx. 0.5 to 0.8 μm.
(3) Formation of Film of Hard Coat Layer
To surfaces of the plastic lens substrates each having the primer layer formed thereon, the coating compositions for forming a film of a hard coat layer (coating materials for hard coat) obtained in Example 5 and Comparative Example 4 were applied, respectively. The application of the coating compositions was carried out by a dipping method (pulling rate: 300 minutes).

Next, the coating films were dried at 90° C. for 10 minutes, and then treated under 110° C. for 2 hours to perform curing of the coating films (hard coat layers). In this operation, curing of the primer layers was also carried out at the same time.

The thickness of each of the thus formed hard coat layers was approx. 2.0 to 2.8 μm.
(4) Formation of Antireflection Layer Film
Layers of an antireflection layer film were formed on the surface of each of the hard coat layers under the same conditions as in Preparation Example 31.

Example 10

Using the coating compositions for forming a film of a hard coat layer "HX-1(1)", "HX-2 (1)", "HX-3 (1)", "HX-4 (1)", "HX-5 (1)", "HX-6 (1)", "HX-7 (1)" and "HX-8 (1)" obtained in Example 1, hard coat layers and layers of an antireflection film were formed on plastic lens substrates in the manner shown in Preparation Example 31. In this example, the plastic lens substrate "MR-7 (monomer name)" having a refractive index of 1.67 was used for the aforesaid reason.

As for the substrates for examples "HX-1(1)", "HX-2(1)", "HX-3(1)", "HX-4(1)", "HX-5(1)", "HX-6(1)", "HX-7(1)" and "HX-8 (1)" obtained as above, appearance (interference fringes), appearance (haze), scratch resistance, adhesion properties, weathering resistance and light resistance were tested and evaluated according to the aforesaid evaluation test methods. The results are described in Table 6.

TABLE 6

| | | Substrate for Example No. | | | | | | | |
|---|---|---|---|---|---|---|---|---|---|
| | | HX-1(1) | HX-2(1) | HX-3(1) | HX-4(1) | HX-5(1) | HX-6(1) | HX-7(1) | HX-8(1) |
| Substrate | Refractive index of plastic lens substrate (MR-7) | 1.67 | 1.67 | 1.67 | 1.67 | 1.67 | 1.67 | 1.67 | 1.67 |
| Evaluation test results | Appearance (interference fringes) | B | A | S | A | S | B | A | B |
| | Appearance (haze) | A | A | A | A | A | A | A | A |
| | Scratch resistance | A | B | B | A | A | A | A | B |
| | Adhesion properties | Good | Good | Good | Good | Good | Good | Good | Good |
| Weathering resistance | Appearance | Good | Good | Good | Good | Good | Good | Good | Good |
| | Adhesion properties | Good | Good | Good | Good | Good | Good | Good | Good |
| Light resistance | Coloration of lens | AA | AA | AA | AA | AA | AA | AA | AA |

Comparative Example 9

Using the coating compositions for forming a film of a hard coat layer "HY-1(1)", "HY-2 (1)", "HY-3 (1)", "HY-4 (1)", "HY-5 (1)", "HY-6 (1)", "HY-7 (1)" and "HY-8 (1)" obtained in Comparative Example 1, hard coat layers and layers of an antireflection film were formed on plastic lens substrates in the manner shown in Preparation Example 31. In this example, the plastic lens substrate "MR-7 (monomer name)" having a refractive index of 1.67 was used for the aforesaid reason.

As for the substrates for comparative examples "HY-1(1)", "HY-2 (1)", "HY-3 (1)", "HY-4 (1)", "HY-5 (1)", "HY-6 (1)", "HY-7 (1)" and "HY-8(1)" obtained as above, appearance (interference fringes), appearance (haze), scratch resistance, adhesion properties, weathering resistance and light resistance were tested and evaluated according the aforesaid evaluation test methods. The results are described in Table 7.

TABLE 7

| | | Substrate for comparative example | | | | | | | |
|---|---|---|---|---|---|---|---|---|---|
| | | HY-1(1) | HY-2(1) | HY-3(1) | HY-4(1) | HY-5(1) | HY-6(1) | HY-7(1) | HY-8(1) |
| Substrate | Refractive index of plastic lens substrate (MR-7) | 1.67 | 1.67 | 1.67 | 1.67 | 1.67 | 1.67 | 1.67 | 1.67 |
| Evaluation test results | Appearance (interference fringes) | C | C | B | B | B | D | B | C |
| | Appearance (haze) | C | C | C | C | D | D | C | C |
| | Scratch resistance | C | C | C | C | C | C | B | C |
| | Adhesion properties | Good | Good | Good | Good | Good | Good | Good | Good |
| Weathering resistance | Appearance | Good | Good | Good | Good | Bad | Bad | Bad | Bad |
| | Adhesion properties | Good | Good | Good | Good | Bad | Bad | Bad | Bad |
| Light resistance | Coloration of lens | BB | BB | BB | BB | CC | CC | CC | CC |

Example 11

Using the coating compositions for forming a film of a hard coat layer "HX-1(2)", "HX-2 (2)", "HX-3 (2)", "HX-4 (2)", "HX-5 (2)", "HX-6 (2)", "HX-7 (2)" and "HX-8 (2)" obtained in Example 2, hard coat layers and layers of an antireflection film were formed on plastic lens substrates in the manner shown in Preparation Example 31. In this example, the plastic lens substrate "MR-7 (monomer name)" having a refractive index of 1.67 was used for the aforesaid reason.

As for the substrates for examples "HX-1(2)", "HX-2(2)", "HX-3 (2)", "HX-4 (2)", "HX-5 (2)", "HX-6 (2)", "HX-7 (2)" and "HX-8 (2)" obtained as above, appearance (interference fringes), appearance (haze), scratch resistance, adhesion properties, weathering resistance and light resistance were tested and evaluated according to the aforesaid evaluation test methods. The results are described in Table 8.

TABLE 8

| | | Substrate for example No. | | | | | | | |
|---|---|---|---|---|---|---|---|---|---|
| | | HX-1(2) | HX-2(2) | HX-3(2) | HX-4(2) | HX-5(2) | HX-6(2) | HX-7(2) | HX-8(2) |
| Substrate | Refractive index of plastic lens substrate (MR-7) | 1.67 | 1.67 | 1.67 | 1.67 | 1.67 | 1.67 | 1.67 | 1.67 |
| Evaluation test results | Appearance (interference fringes) | B | A | S | A | S | B | A | B |
| | Appearance (haze) | A | A | A | A | A | A | A | A |
| | Scratch resistance | A | B | B | A | A | A | A | B |
| | Adhesion properties | Good | Good | Good | Good | Good | Good | Good | Good |
| Weathering resistance | Appearance | Good | Good | Good | Good | Good | Good | Good | Good |
| | Adhesion properties | Good | Good | Good | Good | Good | Good | Good | Good |
| Light resistance | Coloration of lens | AA | AA | AA | AA | AA | AA | AA | AA |

Comparative Example 10

Using the coating compositions for forming a film of a hard coat layer "HY-1(2)", "HY-2 (2)", "HY-3 (2)", "HY-4 (2)", "HY-5 (2)", "HY-6 (2)", "HY-7 (2)" and "HY-8 (2)" obtained in Comparative Example 2, hard coat layers and layers of an antireflection film were formed on plastic lens substrates in the manner shown in Preparation Example 31. In this example, the plastic lens substrate "MR-7 (monomer name)" having a refractive index of 1.67 was used for the aforesaid reason.

As for the substrates for comparative examples "HY-1(2)", "HY-2 (2)", "HY-3 (2)", "HY-4 (2)", "HY-5 (2)", "HY-6 (2)", "HY-7 (2)" and "HY-8(2)" obtained as above, appearance (interference fringes), appearance (haze), scratch resistance, adhesion properties, weathering resistance and light resistance were tested and evaluated according to the aforesaid evaluation test methods. The results are described in Table 9.

TABLE 9

| | | Substrate for comparative example No. | | | | | | | |
|---|---|---|---|---|---|---|---|---|---|
| | | HY-1(2) | HY-2(2) | HY-3(2) | HY-4(2) | HY-5(2) | HY-6(2) | HY-7(2) | HY-8(2) |
| Substrate | Refractive index of plastic lens substrate (MR-7) | 1.67 | 1.67 | 1.67 | 1.67 | 1.67 | 1.67 | 1.67 | 1.67 |
| Evaluation test results | Appearance (interference fringes) | C | C | B | B | B | D | B | C |
| | Appearance (haze) | C | C | C | C | D | D | C | C |
| | Scratch resistance | C | C | C | C | C | C | B | C |
| | Adhesion properties | Good | Good | Good | Good | Good | Good | Good | Good |
| Weathering resistance | Appearance | Good | Good | Good | Good | Bad | Bad | Bad | Bad |
| | Adhesion properties | Good | Good | Good | Good | Bad | Bad | Bad | Bad |
| Light resistance | Coloration of lens | BB | BB | BB | BB | CC | CC | CC | CC |

Example 12

Using the coating compositions for forming a film of a hard coat layer "HX-1(3)", "HX-2(3)" and "HX-5(3)" obtained in Example 3, hard coat layers and layers of an antireflection film were formed on plastic lens substrates in the manner shown in Preparation Example 31. In this example, the plastic lens substrate "MR-7 (monomer name)" having a refractive index of 1.67 was used for the aforesaid reason.

As for the substrates for examples "HX-1(3)", "HX-2 (3)" and "HX-5(3)" obtained as above, appearance (interference fringes), appearance (haze), scratch resistance, adhesion properties, weathering resistance and light resistance were tested and evaluated according to the aforesaid evaluation test methods. The results are described in Table 10.

TABLE 10

|  | Substrate for example No. | HX-1 (3) | HX-2 (3) | HX-5 (3) |
|---|---|---|---|---|
| Substrate | Refractive index of plastic lens substrate (MR-7) | 1.67 | 1.67 | 1.67 |
| Evaluation test results | Appearance (interference fringes) | B | A | S |
|  | Appearance (haze) | A | A | A |
|  | Scratch resistance | A | B | A |
|  | Adhesion properties | Good | Good | Good |
|  | Weathering resistance — Appearance | Good | Good | Good |
|  | Weathering resistance — Adhesion properties | Good | Good | Good |
|  | Light resistance — Coloration of lens | AA | AA | AA |

Example 13 and Comparative Example 11

Using the coating composition for forming a film of a hard coat layer "HX-1(5a)" obtained in Example 4 and the coating composition for forming a film of a hard coat layer "HX-1 (4a)" obtained in Comparative Example 3, hard coat layers and layers of an antireflection film were formed on plastic lens substrates in the manner shown in Preparation Example 31. In these examples, the plastic lens substrate "MR-8 (monomer name)" having a refractive index of 1.60 was used.

As for the substrate for the example "HX-1(5a)" and the substrate for the comparative example "HX-1(4a)" obtained as above, appearance (interference fringes), appearance (haze), scratch resistance, adhesion properties, weathering resistance and light resistance were tested and evaluated according to the aforesaid evaluation test methods. The results are described in Table 11.

TABLE 11

|  | Substrate for example No. | HX-1 (4a) | HX-1 (5a) |
|---|---|---|---|
| Substrate | Refractive index of plastic lens substrate (MR-8) | 1.60 | 1.60 |
| Evaluation test results | Appearance (interference fringes) | D | B |
|  | Appearance (haze) | A | A |
|  | Scratch resistance | C | B |
|  | Adhesion properties | A | A |
|  | Weathering resistance — Appearance | Good | Good |
|  | Weathering resistance — Adhesion properties | Good | Good |
|  | Light resistance — Coloration of lens | Good | Good |

Example 14

Using the coating compositions for forming a film of a primer layer "PX-1(1)", "PX-2 (1)", "PX-3 (1)", "PX-4 (1)", "PX-5 (1)", "PX-6 (1)", "PX-7 (1)" and "PX-8 (1)" obtained in Example 6 and the coating compositions for forming a film of a hard coat layer "HX-1(6)", "HX-2 (6)", "HX-3 (6)", "HX-4 (6)", "HX-5 (6)", "HX-6 (6)", "HX-7 (6)" and "HX-8 (6)" obtained in Example 5, primer layers, hard coat layers and layers of an antireflection film were formed on plastic lens substrates in the manner shown in Preparation Example 32.

As for substrates for examples "PX-1(1)", "PX-2 (1)", "PX-3 (1)", "PX-4 (1)", "PX-5 (1)", "PX-6 (1)", "PX-7 (1)" and "PX-8 (1)" obtained as above, appearance (interference fringes), appearance (haze), scratch resistance, adhesion properties and weathering resistance were tested and evaluated according to the aforesaid evaluation test methods. The results are described in Table 12. The light resistance test was not carried out because the substrates for use in this test had discoloration in themselves.

TABLE 12

|  |  | Substrate for example No. | | | | | | | |
|---|---|---|---|---|---|---|---|---|---|
|  |  | PX-1(1) | PX-2(1) | PX-3(1) | PX-4(1) | PX-5(1) | PX-6(1) | PX-7(1) | PX-8(1) |
| Substrate | Refractive index of plastic lens substrate (MR-174) | 1.74 | 1.74 | 1.74 | 1.74 | 1.74 | 1.74 | 1.74 | 1.74 |
|  | Coating composition for hard coat | HX-1(6) | HX-2(6) | HX-3(6) | HX-4(6) | HX-5(6) | HX-6(6) | HX-7(6) | HX-8(6) |
| Evaluation test results | Appearance (interference fringes) | B | B | A | B | A | B | B | A |
|  | Appearance (haze) | B | B | B | B | B | B | B | B |
|  | Scratch resistance | A | B | B | A | A | A | A | B |
|  | Adhesion properties | Good | Good | Good | Good | Good | Good | Good | Good |
|  | Weathering resistance — Appearance | Good | Good | Good | Good | Good | Good | Good | Good |
|  | Weathering resistance — Adhesion properties | Good | Good | Good | Good | Good | Good | Good | Good |

Comparative Example 12

Using the coating compositions for forming a film of a primer layer "PY-1(1)", "PY-2 (1)", "PY-3 (1)", "PY-4 (1)", "PY-5 (1)", "PY-6 (1)", "PY-7 (1)" and "PY-8 (1)" obtained in Comparative Example 5 and the coating compositions for forming a film of a hard coat layer "HY-1(6)", "HY-2 (6)", "HY-3 (6)", "HY-4 (6)", "HY-5 (6)", "HY-6 (6)", "HY-7(6)" and "HY-8(6)" obtained in Comparative Example 4, primer layers, hard coat layers and layers of an antireflection film were formed on plastic lens substrates in the manner shown in Preparation Example 32.

As for the substrates for comparative examples "PY-1(1)", "PY-2(1)", "PYX-3(1)", "PY-4(1)", "PY-5(1)", "PY-6(1)", "PY-7(1)" and "PY-8(1)" obtained as above, appearance (interference fringes), appearance (haze), scratch resistance, adhesion properties and weathering resistance were tested and evaluated according to the aforesaid evaluation test methods. The results are described in Table 13. The light resistance test was not carried out because the substrates for use in this test had discoloration in themselves.

TABLE 13

| | | Substrate for comparative example No. | | | | | | | |
|---|---|---|---|---|---|---|---|---|---|
| | | PY-1(1) | PY-2(1) | PY-3(1) | PY-4(1) | PY-5(1) | PY-6(1) | PY-7(1) | PY-8(1) |
| Substrate | Refractive index of plastic lens substrate (MR-174) | 1.74 | 1.74 | 1.74 | 1.74 | 1.74 | 1.74 | 1.74 | 1.74 |
| | Coating composition for hard coat | HY-1(6) | HY-2(6) | HY-3(6) | HY-4(6) | HY-5(6) | HY-6(6) | HY-7(6) | HY-8(6) |
| Evaluation test results | Appearance (interference fringes) | C | C | A | B | B | D | A | A |
| | Appearance (haze) | D | D | D | D | D | D | D | D |
| | Scratch resistance | C | C | C | C | C | C | B | C |
| | Adhesion properties | Good | Good | Good | Good | Good | Good | Good | Good |
| Weathering resistance | Appearance | Good | Good | Good | Good | Bad | Bad | Bad | Bad |
| | Adhesion properties | Good | Good | Good | Good | Bad | Bad | Bad | Bad |

Example 15 and Comparative Example 13

Using the coating compositions for forming a film of a primer layer "PX-1(3a)" and "PX-1(3b)" obtained in Example 7 and the coating compositions for forming a film of a hard coat layer obtained in Example 4 and shown in Table 14, and further using the coating compositions for forming a film of a primer layer "PX-1(2a)" and "PX-1(2b)" obtained in Comparative Example 6 and the coating compositions for forming a film of a hard coat layer obtained in Comparative Example 3 and shown in Table 14, primer layers, hard coat layers and layers of an antireflection film were formed on plastic lens substrates in the manner shown in Preparation Example 32.

As for the substrates for examples "PX-1(3a)" and "PX-1 (3b)" and the comparative example substrates "PX-1(2a)" and "PX-1(2b)" obtained as above, appearance (interference fringes), appearance (haze), scratch resistance, adhesion properties, weathering resistance and light resistance were tested and evaluated according to the aforesaid evaluation test methods. The results are described in Table 14. The light resistance test was partially carried out because the substrates for use in this test had discoloration in themselves.

TABLE 14

| | | Substrate for example No. | | | |
|---|---|---|---|---|---|
| | | PX-1(2a) | PX-1(3a) | PX-1(3b) | PX-1(2b) |
| Substrate | Refractive index of plastic lens substrate (MR-174) | 1.60 | 1.60 | 1.74 | 1.74 |
| | Coating composition for hard coat | HX-1(4a) | HX-1(5a) | HX-1(5b) | HX-1(4b) |
| Evaluation test results | Appearance (interference fringes) | D | B | B | C |
| | Appearance (haze) | A | B | B | C |
| | Scratch resistance | C | A | A | C |
| | Adhesion properties | Good | Good | Good | Good |
| Weathering resistance | Appearance | Good | Good | Good | Good |
| | Adhesion properties | Good | Good | Good | Bad |
| Light resistance | Coloration of lens | Good | Good | — | — |

Example 16

Using the coating compositions for forming a film of a primer layer "QX-1(1)", "QX-2 (1)", "QPX-3 (1)", "QX-4 (1)", "QX-5 (1)", "QX-6 (1)", "QX-7 (1)" and "QX-8 (1)" obtained in Example 8 and the coating compositions for forming a film of a hard coat layer obtained in Example 5, which are shown in Table 15, primer layers, hard coat layers and layers of an antireflection film were formed on plastic lens substrates in the manner shown in Preparation Example 32.

As for the example substrates "QX-1(1)", "QX-2 (1)", "QX-3 (1)", "QX-4 (1)", "QX-5 (1)", "QX-6 (1)", "QX-7 (1)" and "QX-8 (1)" obtained as above, appearance (interference fringes), appearance (haze), scratch resistance, adhesion properties and weathering resistance were tested and evaluated according to the aforesaid evaluation test methods. The results are described in Table 15. The light resistance test was not carried out because the substrates for use in this test had discoloration in themselves.

TABLE 15

|  |  | Substrate for example No. | | | | | | | |
| --- | --- | --- | --- | --- | --- | --- | --- | --- | --- |
|  |  | QX-1(1) | QX-2(1) | QX-3(1) | QX-4(1) | QX-5(1) | QX-6(1) | QX-7(1) | QX-8(1) |
| Substrate | Refractive index of plastic lens substrate (MR-174) | 1.74 | 1.74 | 1.74 | 1.74 | 1.74 | 1.74 | 1.74 | 1.74 |
|  | Coating composition for hard coat | HX-1(6) | HX-2(6) | HX-3(6) | HX-4(6) | HX-5(6) | HX-6(6) | HX-7(6) | HX-8(6) |
| Evaluation test results | Appearance (interference fringes) | B | B | A | B | A | B | B | A |
|  | Appearance (haze) | B | B | B | B | B | B | B | B |
|  | Scratch resistance | A | B | B | A | A | A | A | B |
|  | Adhesion properties | Good | Good | Good | Good | Good | Good | Good | Good |
| Weathering resistance | Appearance | Good | Good | Good | Good | Good | Good | Good | Good |
|  | Adhesion properties | Good | Good | Good | Good | Good | Good | Good | Good |

Comparative Example 14

Using the coating compositions for forming a film of a primer layer "QY-1(1)", "QY-2 (1)", "QY-3 (1)", "QY-4 (1)", "QY-5 (1)", "QY-6 (1)", "QY-7 (1)" and "QY-8 (1)" obtained in Comparative Example 7 and the coating compositions for forming a film of a hard coat layer obtained in Comparative Example 4 and shown in Table 16, primer layers, hard coat layers and layers of an antireflection film were formed on plastic lens substrates in the manner shown in Preparation Example 32.

As for the substrates for comparative examples "QY-1(1)", "QY-2 (1)", "QY-3 (1)", "QY-4 (1)", "QY-5 (1)", "QY-6 (1)", "QY-7 (1)" and "QY-8(1)" obtained as above, appearance (interference fringes), appearance (haze), scratch resistance, adhesion properties and weathering resistance were tested and evaluated according to the aforesaid evaluation test methods. The results are described in Table 16. The light resistance test was not carried out because the substrates for use in this test had discoloration in themselves.

TABLE 16

|  |  | Substrate for comparative example No. | | | | | | | |
| --- | --- | --- | --- | --- | --- | --- | --- | --- | --- |
|  |  | QY-1(1) | QY-2(1) | QY-3(1) | QY-4(1) | QY-5(1) | QY-6(1) | QY-7(1) | QY-8(1) |
| Substrate | Refractive index of plastic lens substrate (MR-174) | 1.74 | 1.74 | 1.74 | 1.74 | 1.74 | 1.74 | 1.74 | 1.74 |
|  | Coating composition for hard coat | HY-1(6) | HY-2(6) | HY-3(6) | HY-4(6) | HY-5(6) | HY-6(6) | HY-7(6) | HY-8(6) |
| Evaluation test results | Appearance (interference fringes) | C | C | A | B | B | D | A | A |
|  | Appearance (haze) | D | D | D | D | D | D | D | D |
|  | Scratch resistance | C | C | C | C | C | C | B | C |
|  | Adhesion properties | Good | Good | Good | Good | Good | Good | Good | Good |
| Weathering resistance | Appearance | Good | Good | Good | Good | Bad | Bad | Bad | Bad |
|  | Adhesion properties | Good | Good | Good | Good | Bad | Bad | Bad | Bad |

Example 17 and Comparative Example 15

Using the coating compositions for forming a film of a primer layer "QX-1(3a)" and "QX-1(3b)" obtained in Example 9 and the coating compositions for forming a film of a hard coat layer obtained in Example 4 and shown in Table 17, and further using the coating compositions for forming a film of a primer layer "QX-1(2a)" and "QX-1(2b)" obtained in Comparative Example 8 and the coating compositions for forming a film of a hard coat layer obtained in Comparative Example 3 and shown in Table 17, primer layers, hard coat layers and layers of an antireflection film were formed on plastic lens substrates in the manner shown in Preparation Example 32.

As for the substrates for examples "QX-1(3a)" and "QX-1(3b)" and the substrates for comparative examples "QX-1(2a)" and "QX-1(2b)" obtained as above, appearance (interference fringes), appearance (haze), scratch resistance, adhesion properties, weathering resistance and light resistance were tested and evaluated according to the aforesaid evaluation test methods. The results are described in Table 17. The light resistance test was partially carried out because the substrates for use in this test had discoloration in themselves.

TABLE 17

|  |  | Substrate for example No. | | | |
| --- | --- | --- | --- | --- | --- |
|  |  | QX-1(2a) | QX-1(3a) | QX-1(3b) | QX-1(2b) |
| Substrate | Refractive index of plastic lens substrate (MR-174) | 1.60 | 1.60 | 1.74 | 1.74 |
|  | Coating composition for hard coat | HX-1(4a) | HX-1(5a) | HX-1(5b) | HX-1(4b) |
| Evaluation test results | Appearance (interference fringes) | D | B | B | C |
|  | Appearance (haze) | A | B | B | C |
|  | Scratch resistance | C | A | A | C |
|  | Adhesion properties | Good | Good | Good | Good |
| Weathering resistance | Appearance | Good | Good | Good | Good |
|  | Adhesion properties | Good | Good | Good | Bad |
| Light resistance | Coloration of lens | Good | Good | — | — |

The invention claimed is:

1. A coating composition comprising:
   metal oxide particles and a binder component, the metal oxide particles including
   (a) fine particles of a titanium-based oxide including titanium and at least one of tin and silicon and having an average particle diameter, as measured by dynamic light scattering, in a range from 15 to 60 nm, wherein the fine particles of the titanium-based oxide are crystalline particles and have
   a rutile-type crystal structure,
   a crystallite diameter, as determined by X-ray diffraction, in a range from 7.5 to 14.0 nm,
   a specific surface area in a range of 70 to 155 m²/g,
   a refractive index in a range from 2.2 to 2.7,
   a spacing, $d^1$, of (310) crystalline faces, as determined by X-ray diffraction, in a range from 0.1440 to 0.1460 nm, and a spacing, $d^2$, of (301) crystalline faces, as determined by X-ray diffraction, in a range from 0.1355 to 0.1370 nm, and
   a ratio of peak intensity, $P^1$, of the (310) crystalline face to peak intensity, $P^2$, of the (110) crystalline face, as determined by X-ray diffraction, in a range from 9/100 to 20/100; and
   (b) a coating layer on surfaces of the fine particles of the titanium-based oxide, the coating layer including at least one of a silica-based oxide and a silica-based composite oxide, wherein
   the coating layer has a refractive index which is lower than the refractive index of the fine particles of the titanium-based oxide by at least 0.2, and
   the titanium-based oxide particles having the coating layer have a refractive index in a range from 2.0 to 2.5.

2. The coating composition as claimed in claim 1, wherein the fine particles of the titanium-based oxide including at least one of tin and silicon are obtained by calcining particles of a composite oxide containing titanium and at least one of tin and silicon at a temperature in a range from 300° C. to 800° C., and pulverizing particles that have been calcined.

3. The coating composition as claimed in claim 1, wherein the silica-based oxide is silicon dioxide.

4. The coating composition as claimed in claim 1, wherein the silica-based composite oxide is a composite oxide containing silicon and at least one metal element selected from the group consisting of zirconium, antimony, tin, and aluminum.

5. The coating composition as claimed in claim 1, wherein the particle diameter has a distribution, obtainable when the fine particles of the titanium-based oxide are measured by dynamic light scattering, and the distribution has a frequency of relatively coarse particles of titanium-based oxide, larger than 100 nm, of not more than 1%.

6. The coating composition as claimed in claim 1, wherein the fine particles of the titanium-based oxide including titanium and at least one of tin and silicon are obtained by placing an aqueous solution containing peroxytitanic acid, and at least one of potassium stannate and a silicon compound, in an autoclave, subjecting the solution to hydrothermal treatment at a temperature of 150 to 250° C. to form a composite oxide containing titanium and at least one of tin and silicon, and, thereafter, drying and granulating the composite oxide to produce particles of the composite oxide.

7. The coating composition as claimed in claim 6, wherein the silicon compound is at least one selected from the group consisting of particulate silica, silicic acid, and a silicon alkoxide.

8. The coating composition as claimed in 6, wherein the fine particles of the titanium-based oxide including titanium and at least one of tin and silicon are obtained by, after the hydrothermal treatment, spray drying the aqueous solution containing the composite oxide and granulating at the same time to produce the particles of the composite oxide.

9. The coating composition as claimed in claim 6, wherein the fine particles of the titanium-based oxide including titanium and at least one of tin and silicon are obtained by, after the hydrothermal treatment, calcining the particles of the composite oxide at a temperature of 300° C. to 800° C. in an oxygen-containing ambient to form calcined particles of the composite oxide having a crystallite diameter, as determined by X-ray diffraction, in a range from 7.5 to 14.0 nm, and pulverizing the calcined particles to obtain pulverized particles.

10. The coating composition as claimed in claim 9, wherein the fine particles of the titanium-based oxide including titanium and at least one of tin and silicon are obtained by dispersing the pulverized particles in pure water or ultrapure water to produce a water dispersion sol, and separating and removing from the water dispersion sol coarse particles of the pulverized particles that are larger than 100 nm in particle diameter, as measured by dynamic light scattering, to obtain the fine particles of the titanium-based oxide including titanium and at least one of tin and silicon.

11. The coating composition as claimed in claim 10, wherein the water dispersion sol containing the fine particles of the titanium-based oxide including titanium and at least one of tin and silicon is mixed with at least one silicon compound, selected from a silicon alkoxide and silicic acid, and the silicon compound is hydrolyzed to coat the fine particles of the titanium-based oxide including titanium and at least one of tin and silicon with a silica-based oxide.

12. The coating composition as claimed in claim 10, wherein the water dispersion sol containing the fine particles of the titanium-based oxide including titanium and at least one of tin and silicon is mixed with at least one silicon compound, selected from a silicon alkoxide and silicic acid, and at least one metal compound, selected from the group consisting of a peroxyzirconate, an antimonate, a stannate, and an aluminate, and the silicon compound and the metal compound are hydrolyzed to coat the fine particles of the titanium-based oxide including titanium and at least one of tin and silicon with a silica-based composite oxide.

13. The coating composition as claimed in claim 7, wherein the silicon compound is a silicon alkoxide and the silicon alkoxide is selected from the group consisting of tetramethoxysilane, a hydrolysates of tetramethoxysilane, tetraethoxysilane, and a hydrolysate of tetraethoxysilane.

14. The coating composition as claimed in claim 1, wherein when the weight of the fine particles of the titanium-based oxide including titanium and at least one of tin and silicon is expressed as "C", and the weight of the coating layer is expressed as "S", the weight ratio (S/C) is in a range from 1/100 to 50/100.

15. The coating composition as claimed in claim 1, wherein the binder component is an organosilicon compound.

16. The coating composition as claimed in claim 15, wherein the organosilicon compound is a compound represented by the following formula (I) and/or a hydrolyzate thereof, $$R^1_a R^2_b Si(OR^3)_{4-(a+b)} \quad (I)$$

wherein
R$^1$ is an alkyl group having 1 to 6 carbon atoms, an organic group having 8 or less carbon atoms and containing a vinyl group, an organic group having 8 or less carbon atoms and containing an epoxy group, an organic group having 8 or less carbon atoms and containing a methacryloxy group, an organic group having 1 to 5 carbon atoms and containing a mercapto group, or an organic group having 1 to 5 carbon atoms and containing an amino group,
R$^2$ is an alkyl group having 1 to 3 carbon atoms, an alkylene group, a cycloalkyl group or a halogenated alkyl group, or an allyl group,
R$^3$ is an alkyl group having 1 to 3 carbon atoms, an alkylene group, or a cycloalkyl group, and
a is an integer of 0 or 1, and b is an integer of 0, 1, or 2.

17. The coating composition as claimed in claim 15, wherein, when the weight of the organosilicon compound is expressed as "X", and the weight of the fine titanium-based oxide particles including titanium and at least one of tin and silicon is expressed as "Y", the weight ratio (X/Y) is in a range from 30/70 to 90/10.

18. The coating composition as claimed in claim 1, wherein the binder component is a thermosetting organic resin or a thermoplastic organic resin.

19. The coating composition as claimed in claim 18, wherein the binder component is a thermosetting organic resin and the thermosetting organic resin is at least one selected from the group consisting of a urethane-based resin, an epoxy-based resin, and a melamine-based resin.

20. The coating composition as claimed in claim 18, wherein the binder component is a thermoplastic organic resin and the thermoplastic organic resin is at least one selected from the group consisting of an acrylic-based resin, a urethane-based resin, and an ester-based resin.

21. The coating composition as claimed in claim 18, wherein, when the weight of the organic resin of the binder component is expressed as "A", and the weight of the fine titanium-based oxide particles including titanium and at least one of tin and silicon is expressed as "B", the weight ratio (A/B) is in a range from 90/10 to 30/70.

* * * * *